United States Patent
Popp

(10) Patent No.: US 12,386,332 B2
(45) Date of Patent: *Aug. 12, 2025

(54) SINGLE LAYER CLOUD-BASED MANUFACTURING EXECUTION SYSTEM (CLO-CMES)

(71) Applicant: SMP Logic Systems LLC, Los Angeles, CA (US)

(72) Inventor: Shane M. Popp, Los Angeles, CA (US)

(73) Assignee: SMP Logic Systems LLC, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/445,322

(22) Filed: Jul. 10, 2023

(65) Prior Publication Data

US 2024/0012379 A1 Jan. 11, 2024

Related U.S. Application Data

(63) Continuation of application No. 16/350,284, filed on Oct. 25, 2018, now Pat. No. 11,754,991.

(60) Provisional application No. 62/707,285, filed on Oct. 27, 2017.

(51) Int. Cl.
 *G05B 19/18* (2006.01)
 *G05B 19/408* (2006.01)

(52) U.S. Cl.
 CPC ....... *G05B 19/188* (2013.01); *G05B 19/4083* (2013.01); *G05B 2219/33192* (2013.01)

(58) Field of Classification Search
 CPC . G06F 19/188; G06F 19/4083; G05B 19/188; G05B 19/4083
 See application file for complete search history.

(56) References Cited

U.S. PATENT DOCUMENTS

| | | | |
|---|---|---|---|
| 8,533,075 B1* | 9/2013 | Sayers, III | G16H 40/20 705/28 |
| 11,754,991 B2* | 9/2023 | Popp | G05B 19/056 700/97 |
| 2013/0338964 A1* | 12/2013 | Kobayashi | G06F 17/40 702/176 |
| 2014/0143006 A1* | 5/2014 | Chang | G06Q 10/06315 705/7.25 |
| 2016/0189074 A1* | 6/2016 | Gajdzinski | G06Q 10/06316 705/7.26 |
| 2017/0139393 A1* | 5/2017 | Boss | G05B 19/058 |
| 2018/0198673 A1* | 7/2018 | Hayashi | H04L 43/55 |
| 2018/0314241 A1* | 11/2018 | Park | G05B 19/41865 |
| 2018/0357334 A1* | 12/2018 | Chao | G06F 16/10 |
| 2019/0101903 A1* | 4/2019 | Katti | G05B 19/4188 |
| 2019/0313164 A1* | 10/2019 | Bragg | H04L 69/14 |

* cited by examiner

*Primary Examiner* — Mark A Connolly

(57) ABSTRACT

"Cloud" based manufacturing execution systems ("MES") and methods thereof used to control, execute, and monitor pharmaceutical or biopharmaceutical production processes and systems are disclosed herein. Consequently, the methods and systems provide a means to quality manufacturing on an integrated level whereby drug or biologic manufacturers can achieve data and product integrity and ultimately minimize cost.

17 Claims, 16 Drawing Sheets

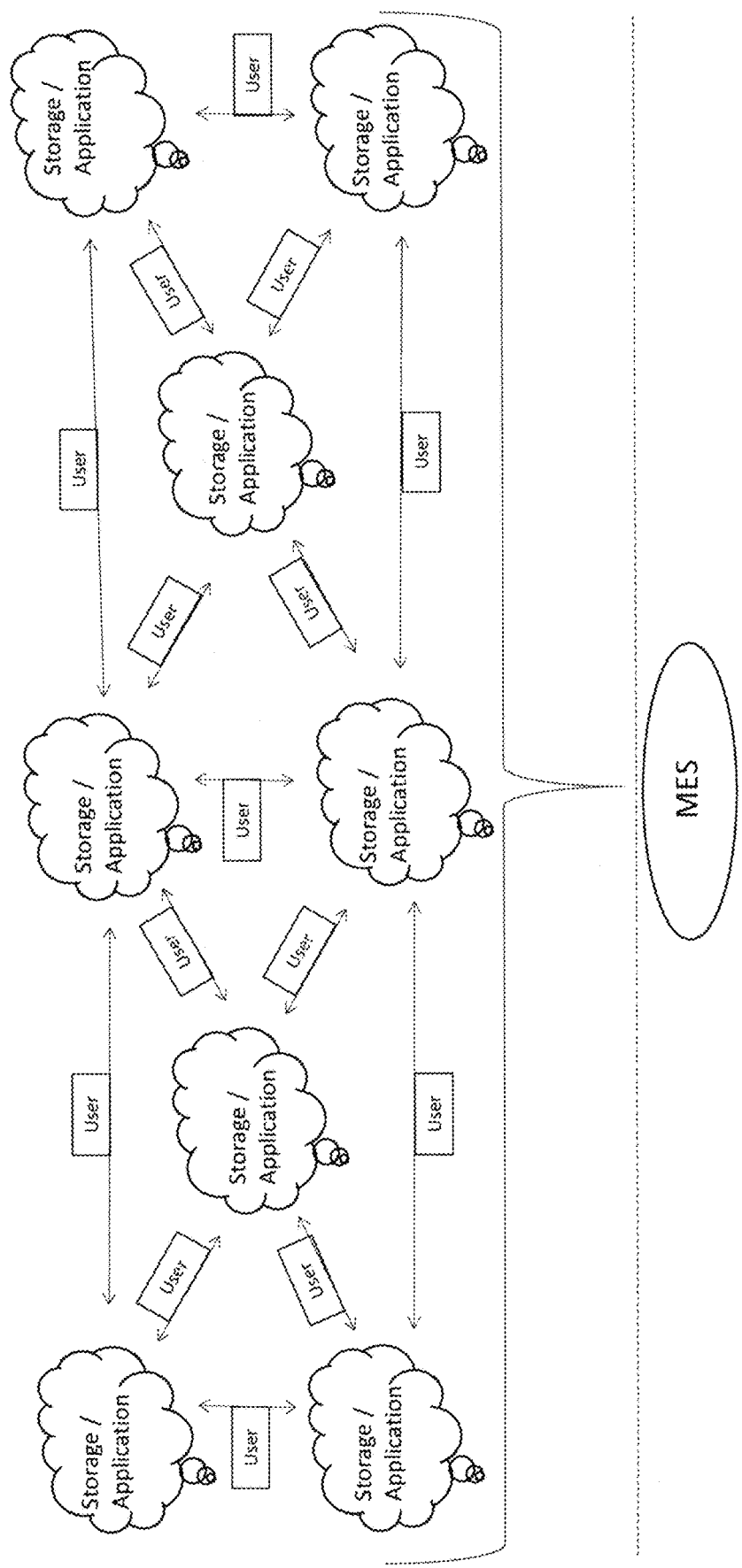
Figure 1. Schematic of Cloud Based Distributed System

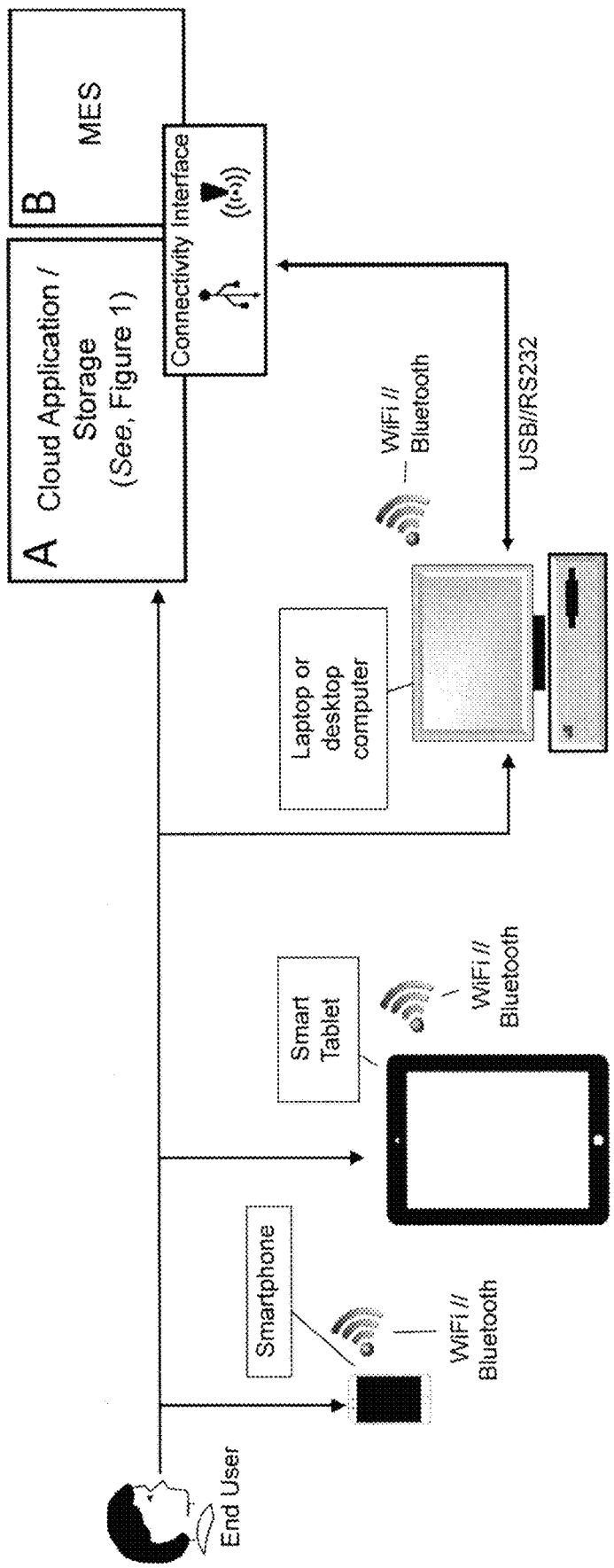
Figure 2. Exemplary Schematic of an End User Connectivity: Programmable Direct & Remote Wireless Control

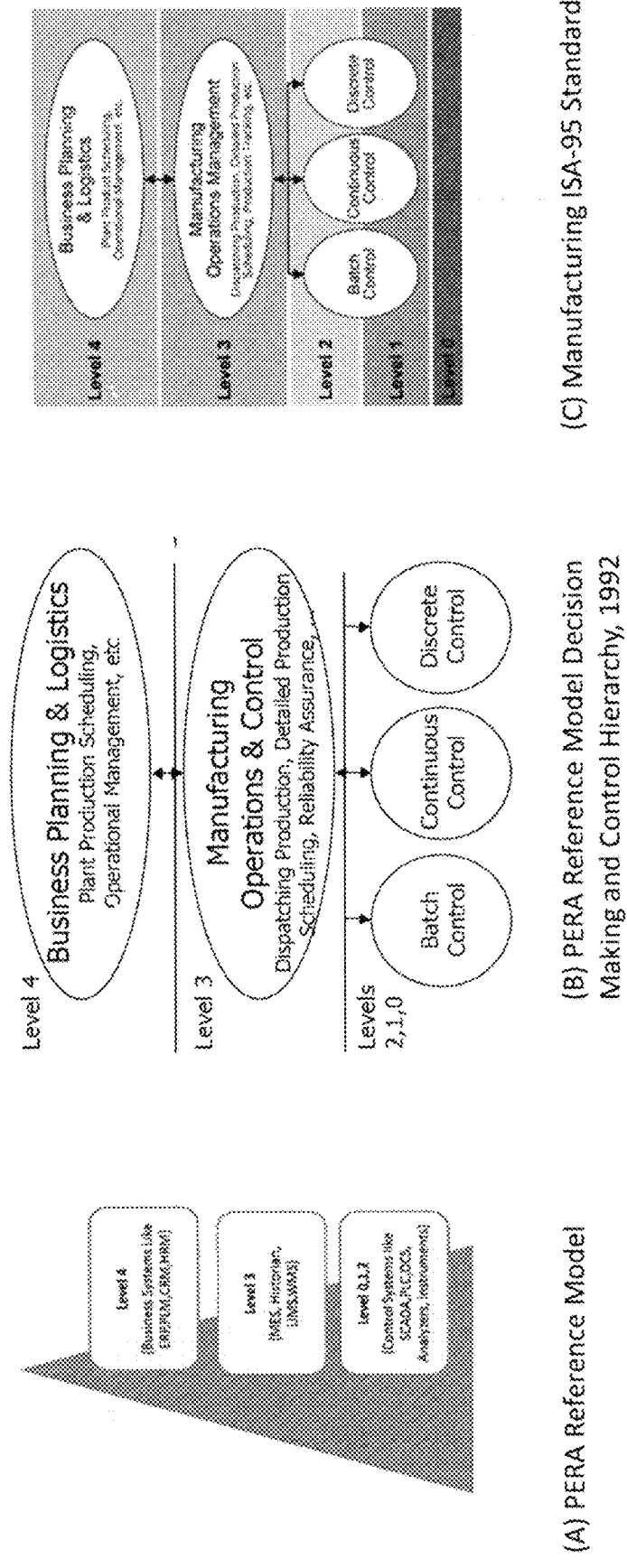
Figure 3. Prior Art. PERA Reference Model and ANSI/ISA-95 Architecture

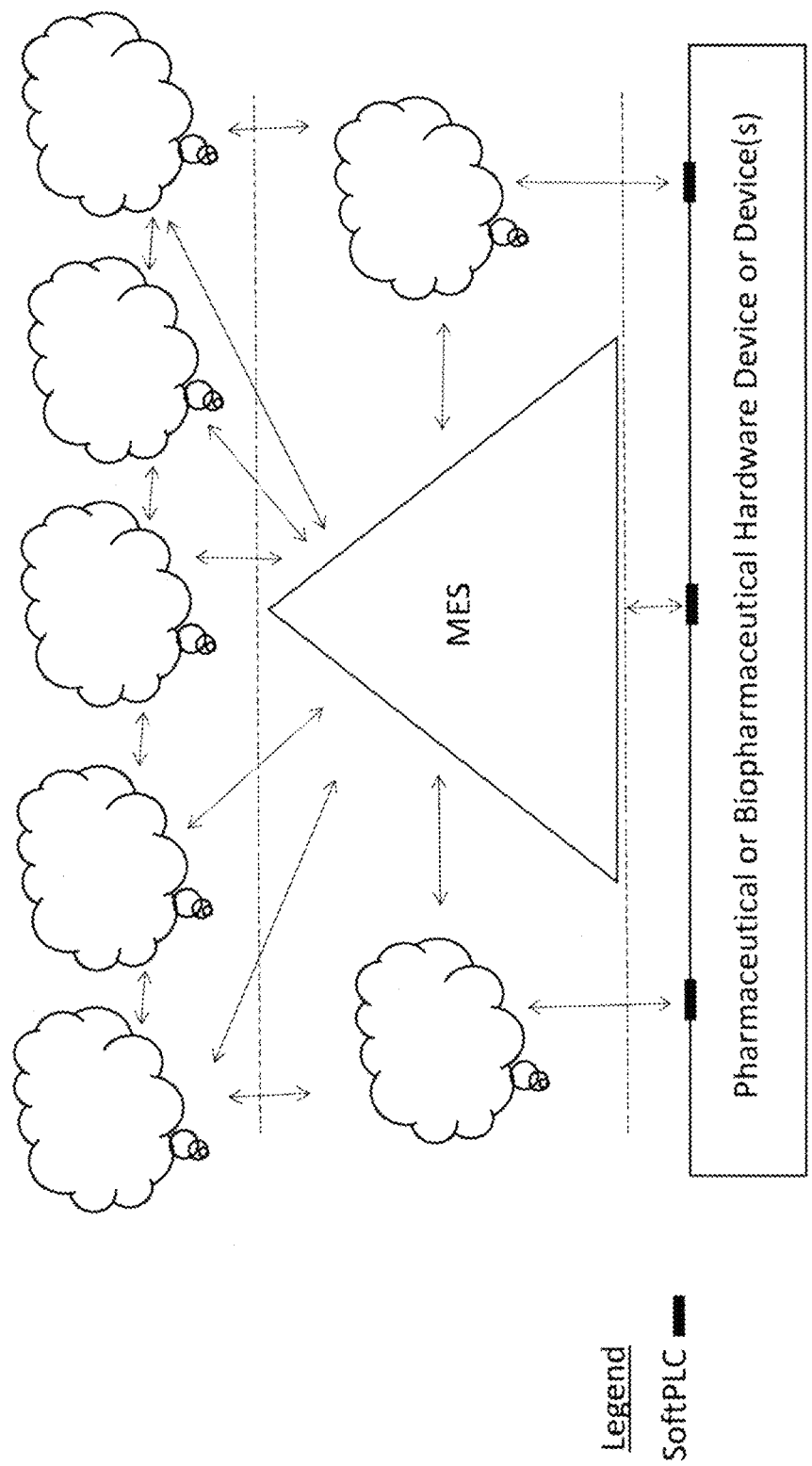

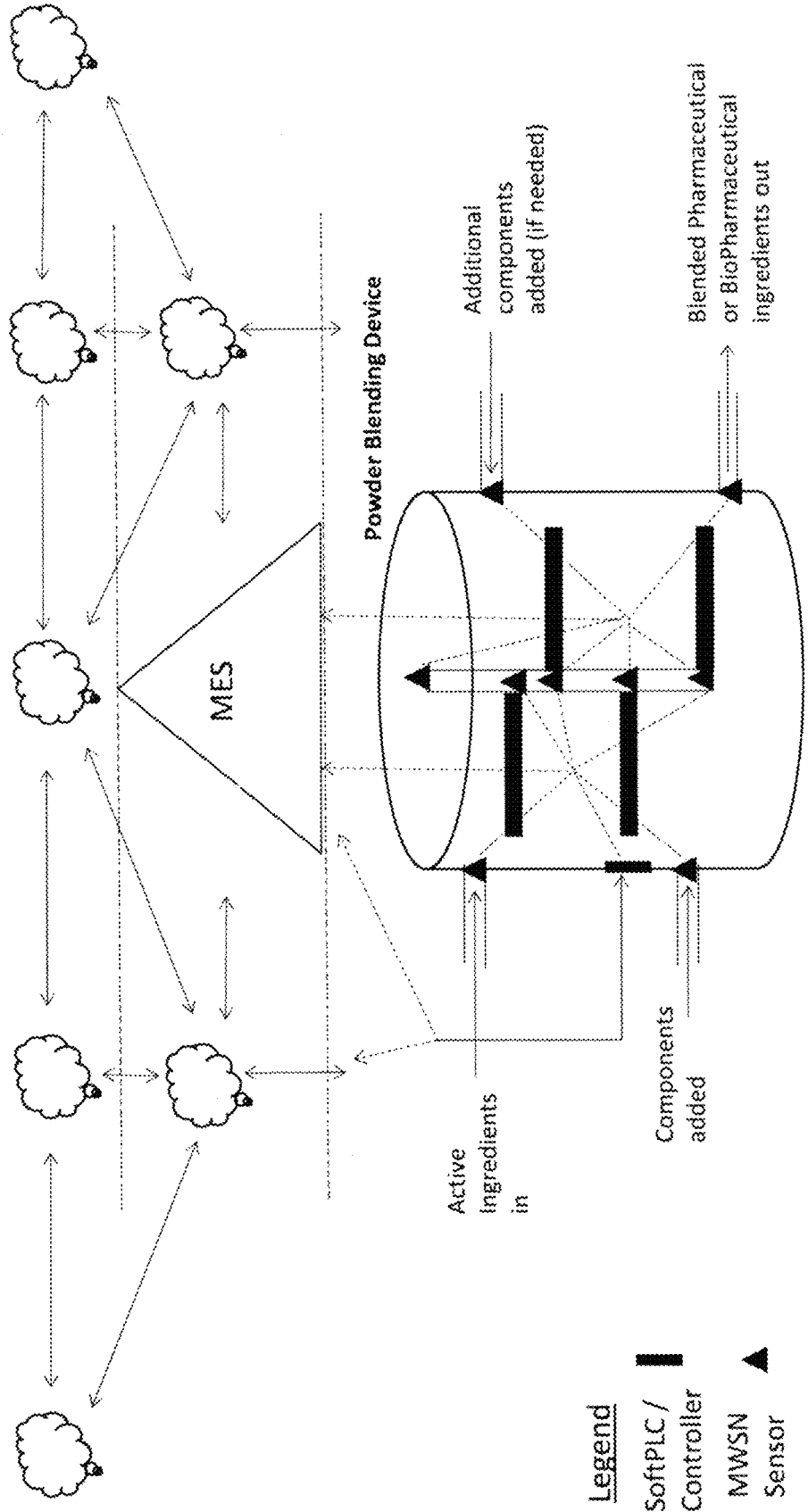
Figure 5. Cloud Based MES Integrated with a Pharmaceutical or Biopharmaceutical Powder Blending System.

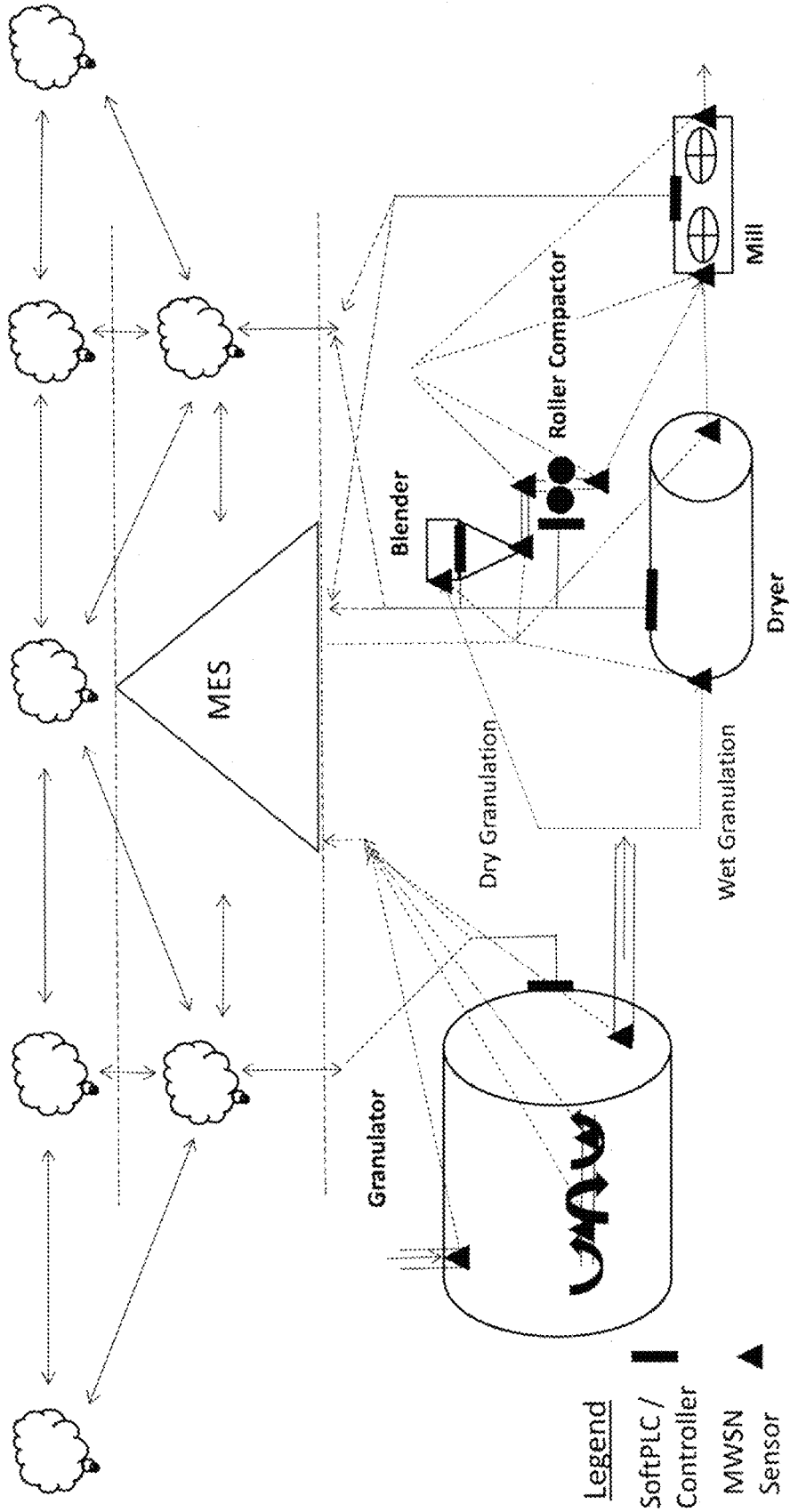
Figure 6. Cloud Based MES Integrated with a Pharmaceutical or Biopharmaceutical Granulation System.

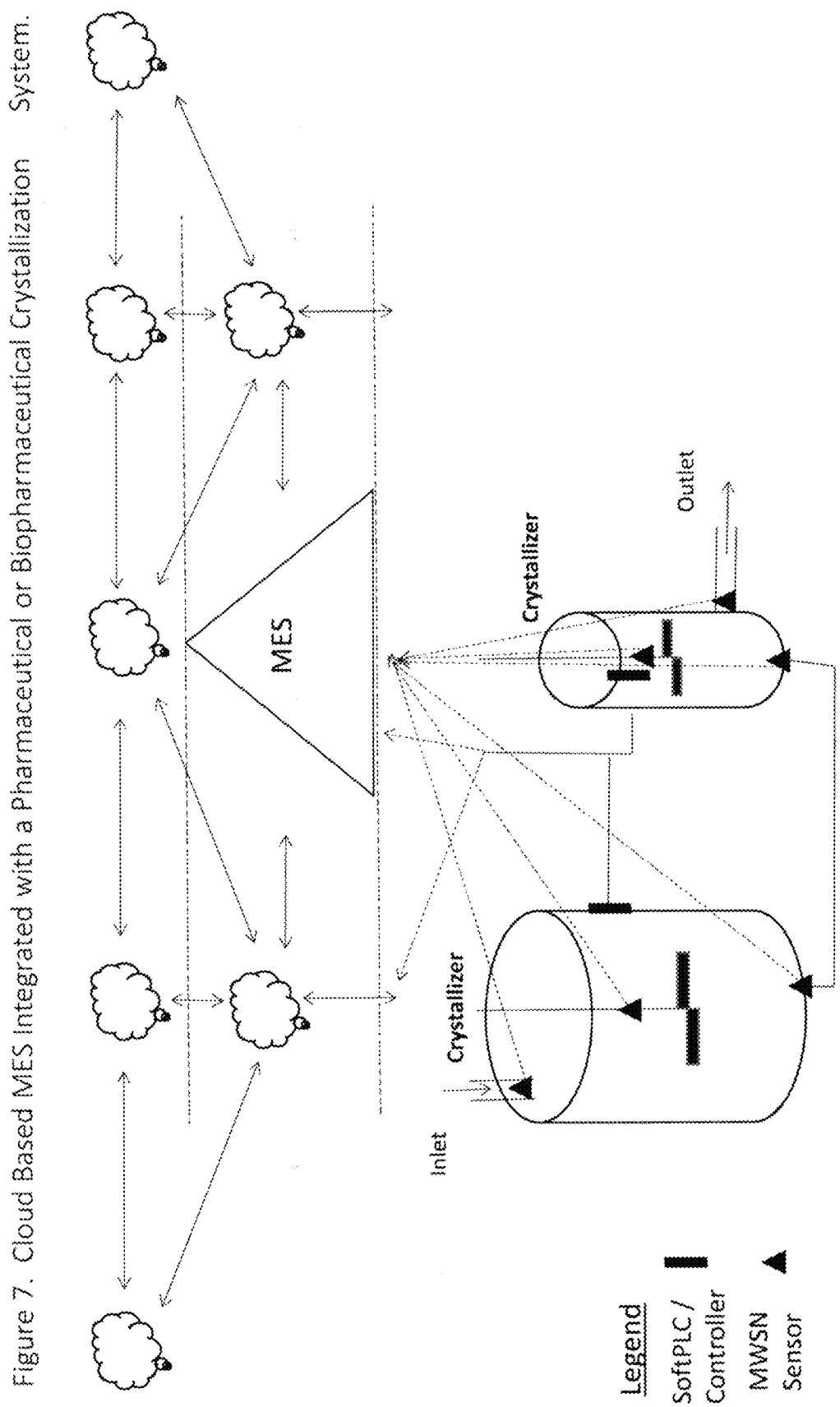

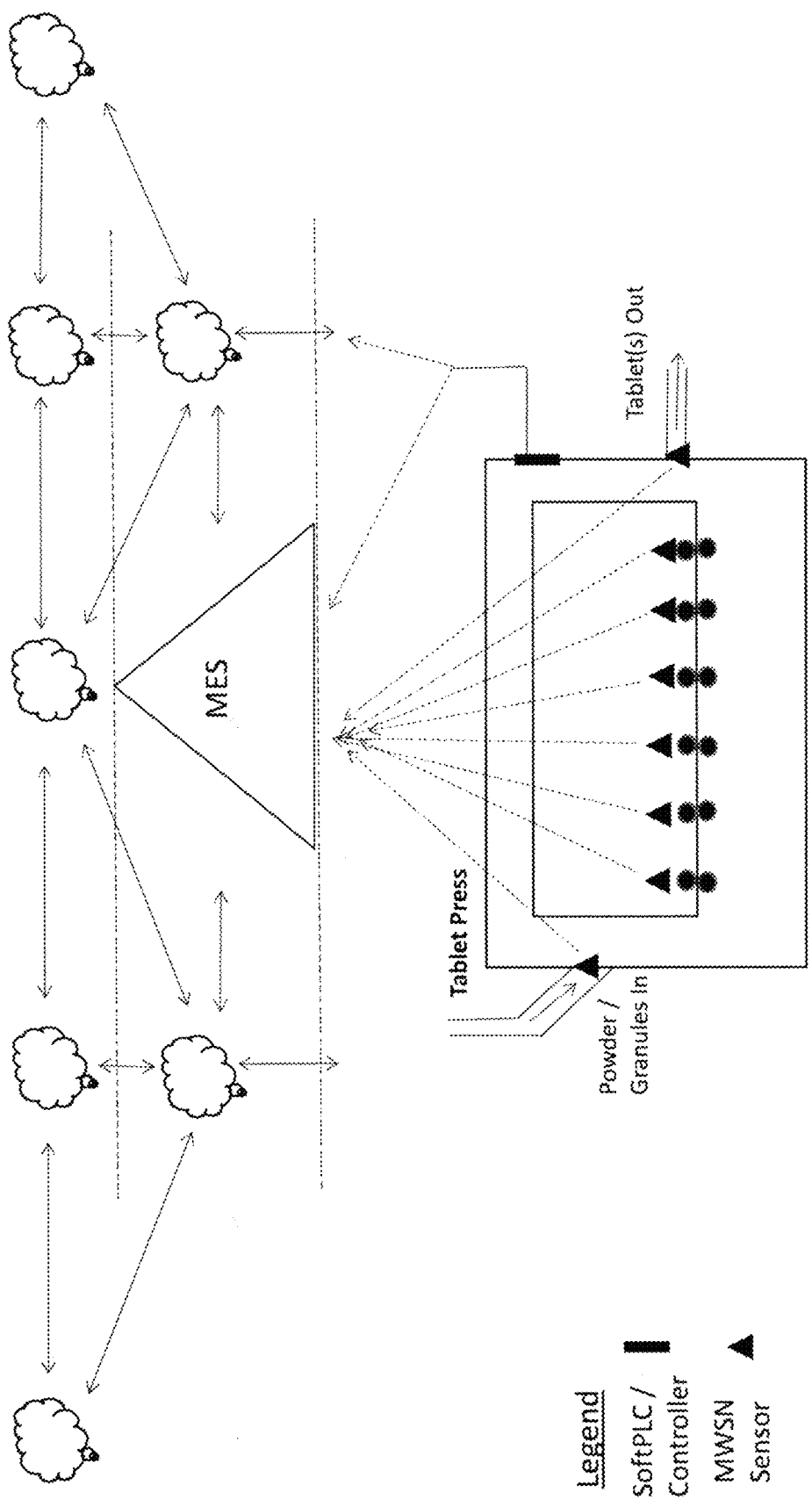

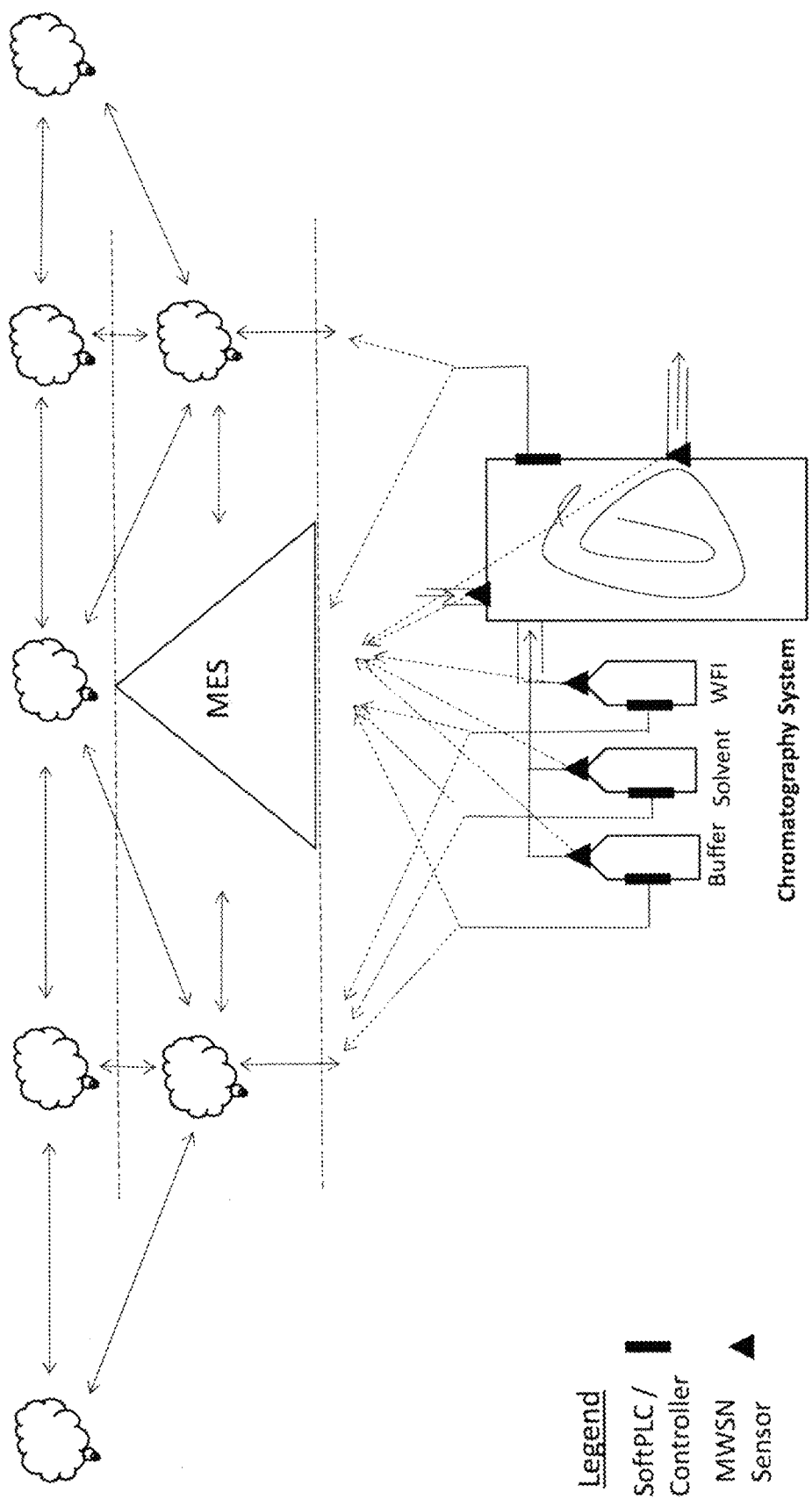
Figure 9. Cloud Based MES Integrated with a Pharmaceutical or Biopharmaceutical Chromatography System.

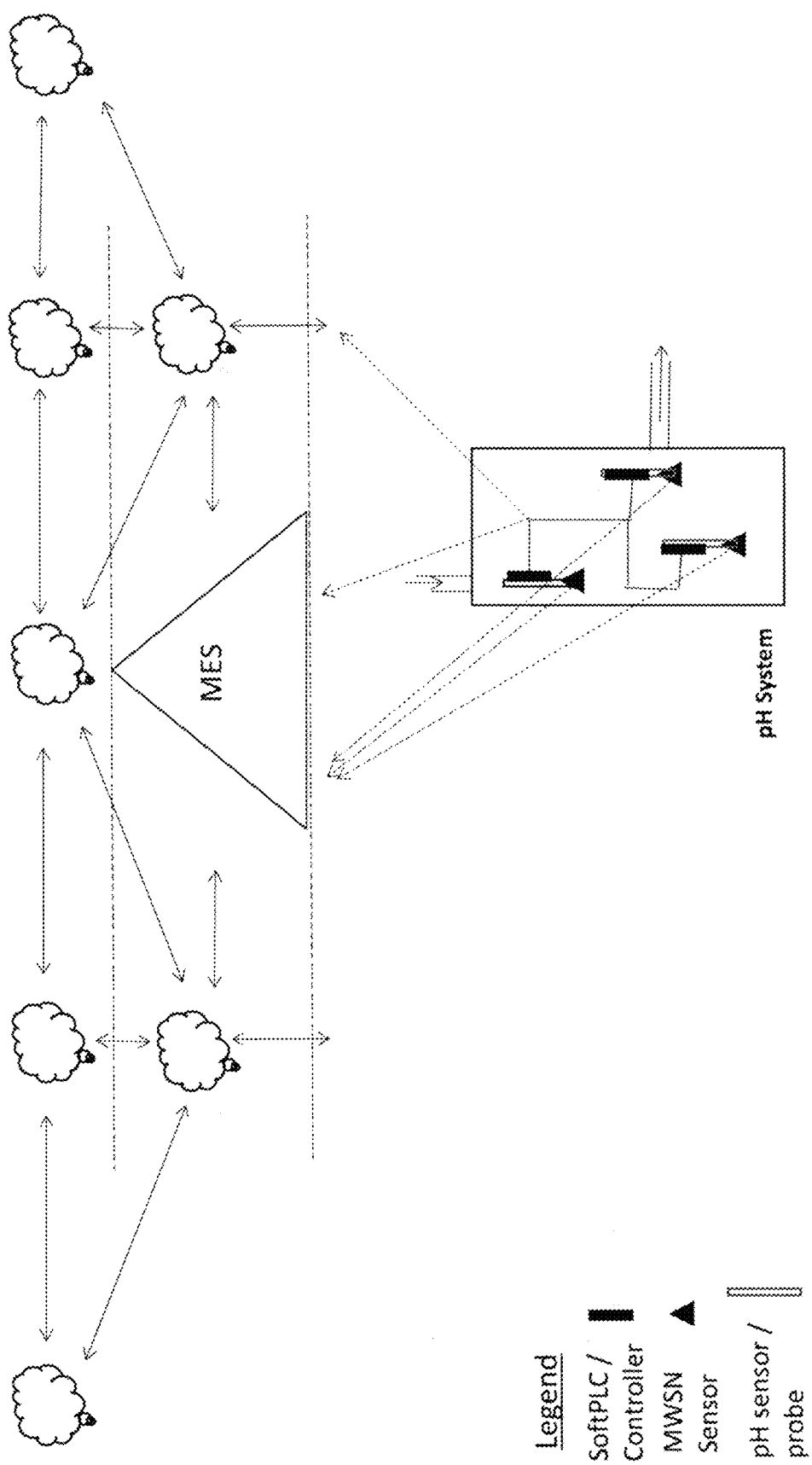
Figure 10. Cloud Based MES Integrated with a Pharmaceutical or Biopharmaceutical pH System.

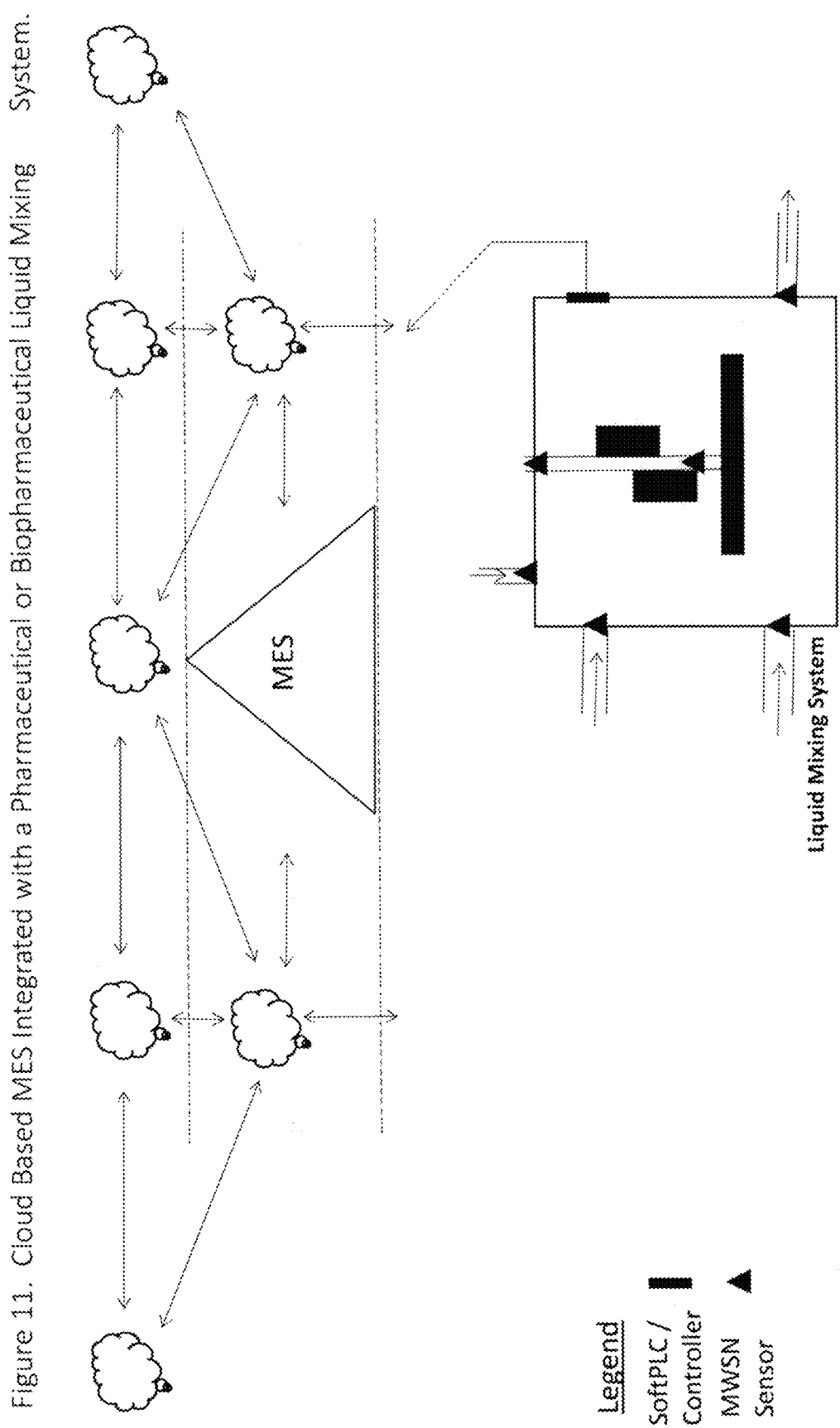
Figure 11. Cloud Based MES Integrated with a Pharmaceutical or Biopharmaceutical Liquid Mixing System.

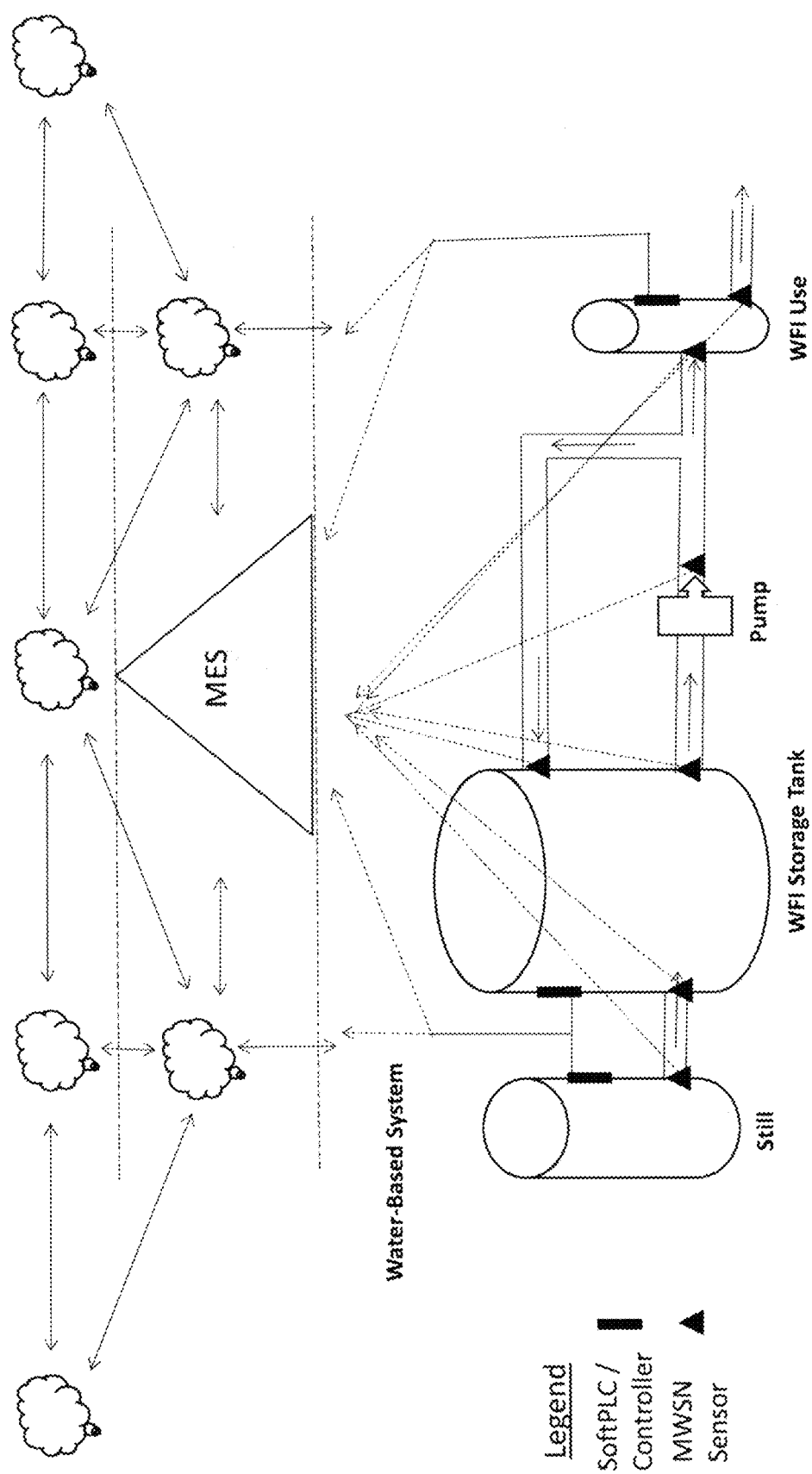

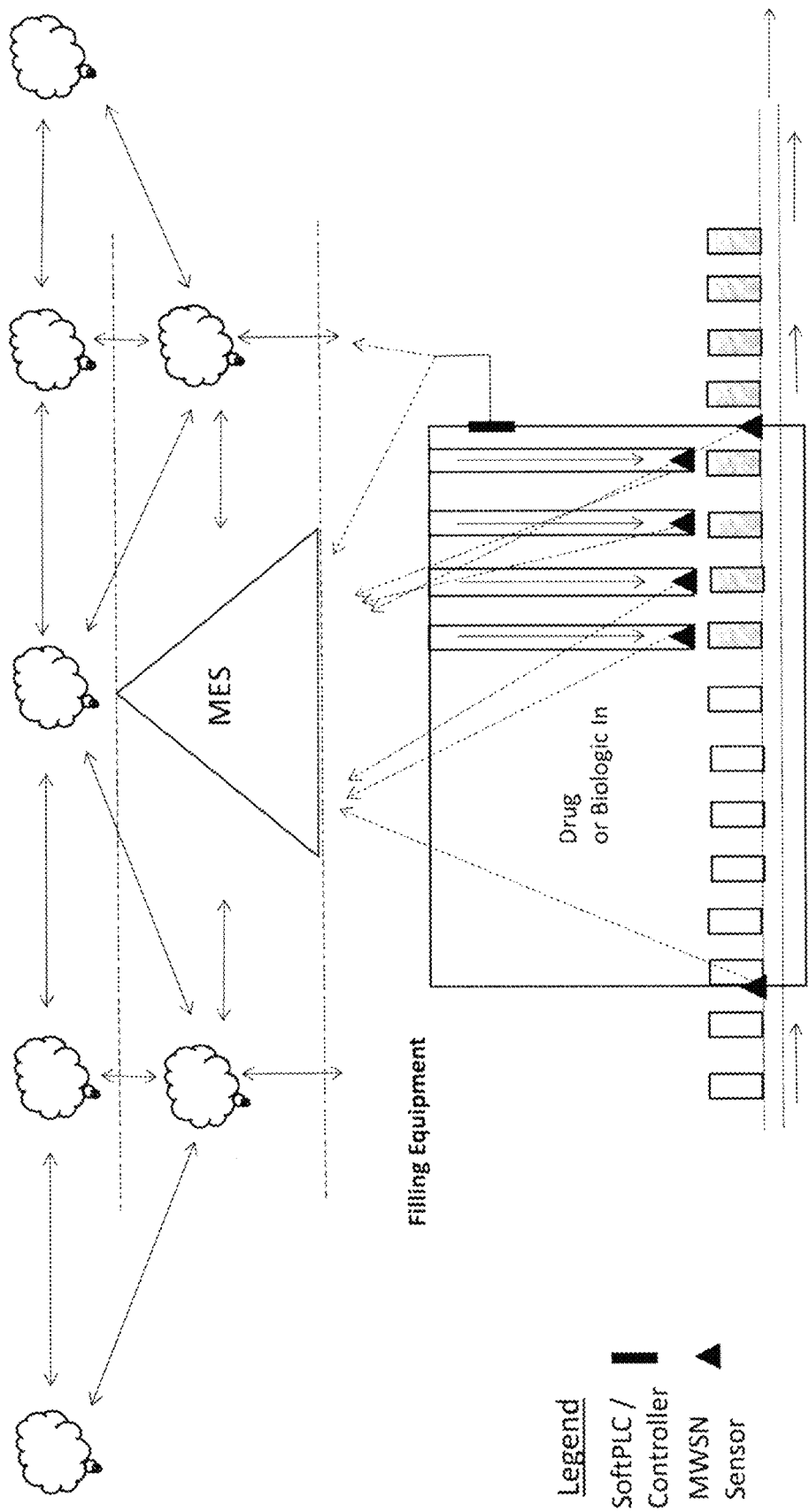
Figure 13. Cloud Based MES Integrated with a Pharmaceutical or Biopharmaceutical Finishing and Packaging System.

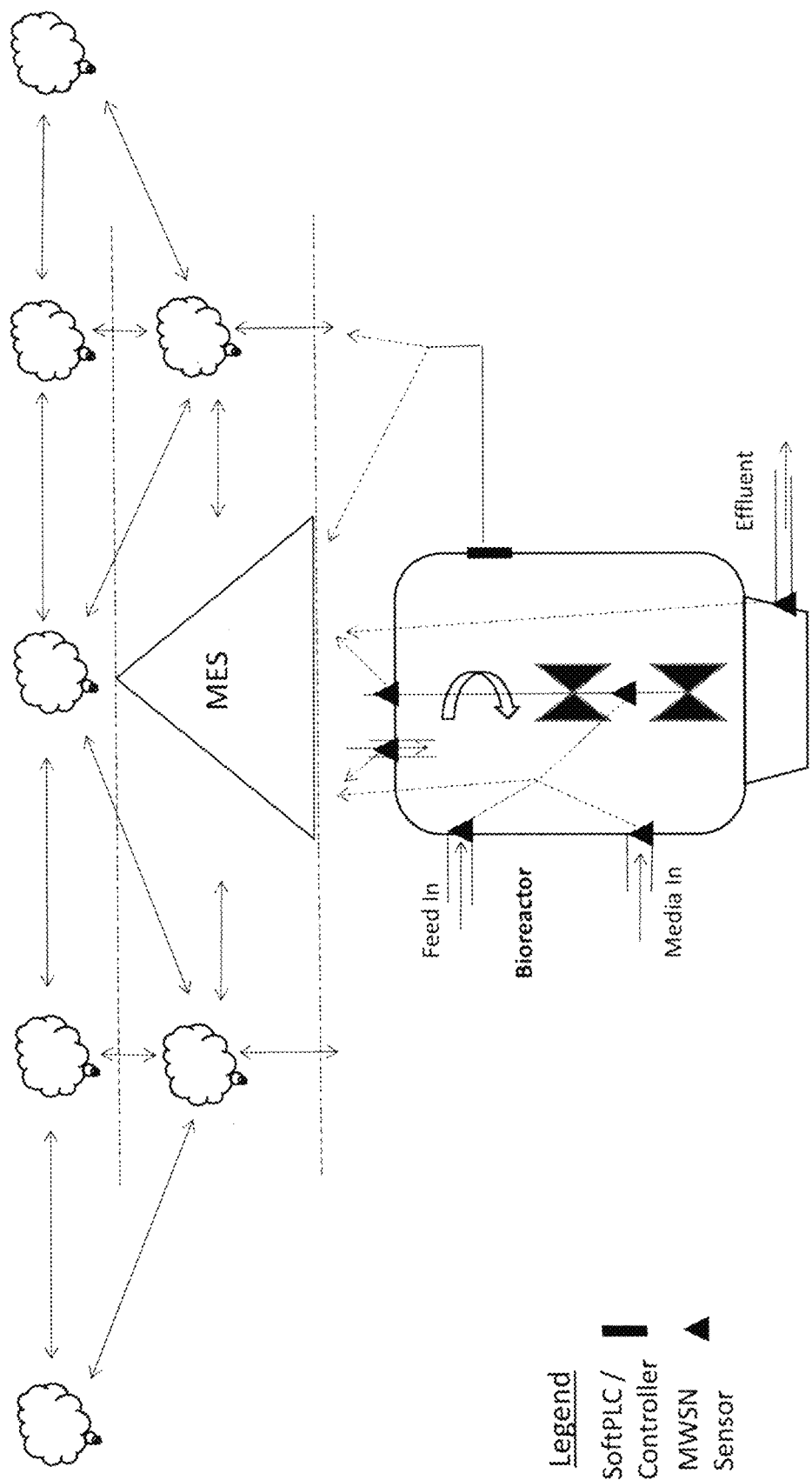
Figure 14. Cloud Based MES Integrated with a Pharmaceutical or Biopharmaceutical Cell Culture System.

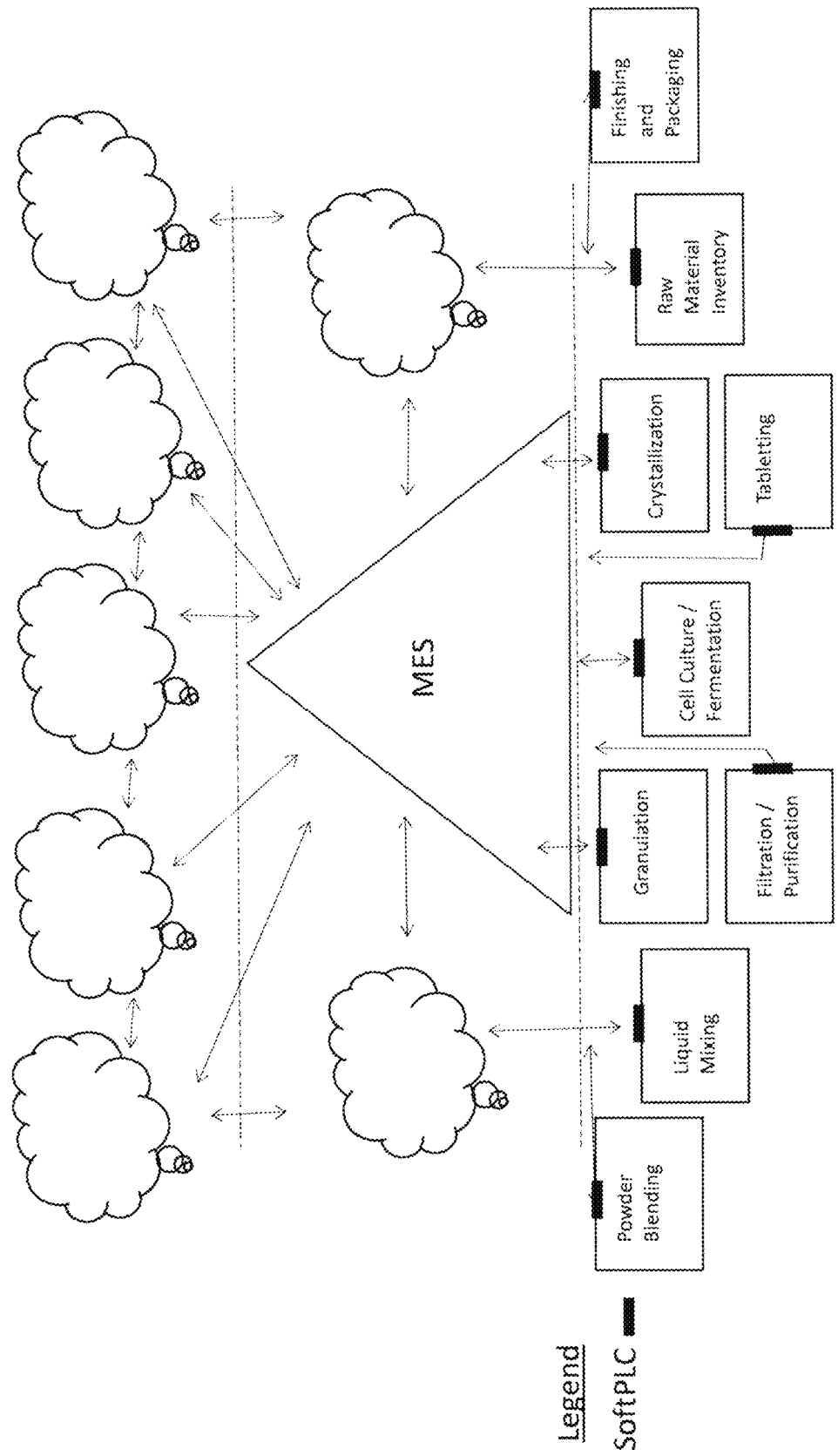
Figure 15. Schematic of a Single Layer MES Architecture Integrated into a Smart Factory.

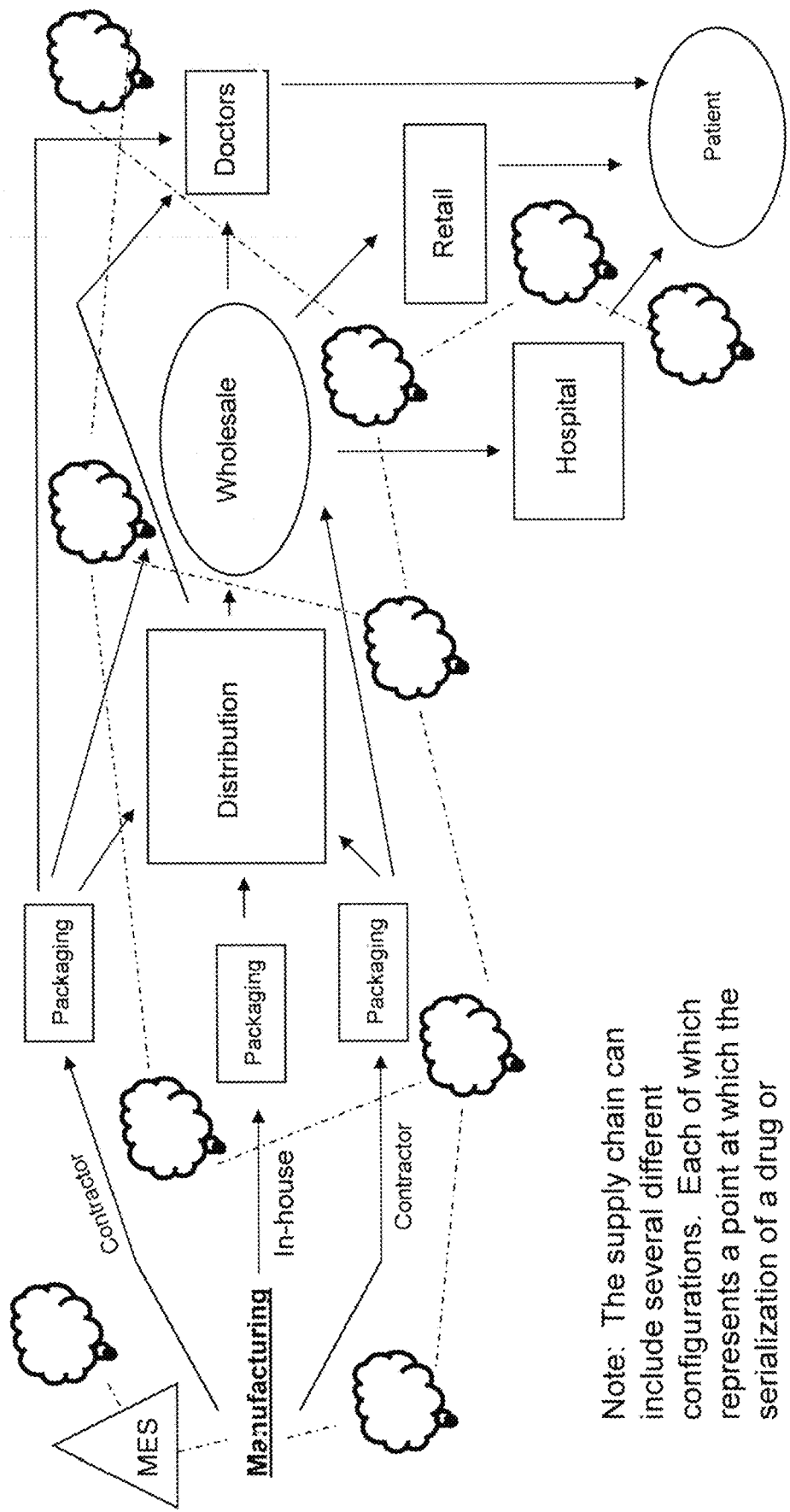
Figure 16: "Cloud" Based MES Integrated into a Supply Chain Distribution of Drug or Biologic

SINGLE LAYER CLOUD-BASED MANUFACTURING EXECUTION SYSTEM (CLO-CMES)

CROSS-REFERENCE TO RELATED APPLICATIONS

This application is a continuation of U.S. patent application Ser. No. 16/350,284, filed 25 Oct. 2018, which claims priority to U.S. Provisional Patent Application No. 62/707,285 filed 27 Oct. 2017, the contents of which are fully incorporated by reference herein.

STATEMENT OF RIGHTS TO INVENTIONS MADE UNDER FEDERALLY SPONSORED RESEARCH

Not applicable.

FIELD OF THE INVENTION

The invention described herein relates to the field of process control and automated industrial manufacturing. Specifically, cloud controlled manufacturing execution systems and methods used for the monitoring and execution of pharmaceutical manufacturing processes. The invention further relates to the enhancement of distributed network systems, embedded systems, cloud computing, and computer programming technologies to produce higher quality more efficient drugs thereby minimizing cost.

BACKGROUND OF THE INVENTION

Process control of commercial industrial plants has evolved through many stages. Initially, control paradigms would be from panels local to the manufacturing plant. However, this required a large labor resource(s) to attend to these dispersed panels, and there was no overall view of the process. The next logical development was the transmission of all plant measurements to a permanently manned central control room. Effectively, this was the centralization of all the localized panels, with the advantages of lower manning levels and easier overview of the process. Often the controllers were behind the control room panels, and all automatic and manual control outputs were individually transmitted back to plant in the form of pneumatic or electrical signals. However, while this seemingly provided a central control focus, the arrangement was inflexible as each control loop had its own controller hardware so system changes required re-configuration of signals by re-piping or re-wiring on an individual component or sub-system basis. This situation also required continual operator movement within a large control room in order to monitor the whole process. With standardization of electronic processors, high-speed electronic signaling networks, and electronic graphic displays it became possible to replace these discrete controllers with computer-based algorithms, hosted on a network of input/output racks with their own control processors. These could be distributed around the plant and would communicate with the graphic displays in the control room. The concept of "distributed control" was realized.

The introduction of distributed control allowed flexible interconnection and re-configuration of plant controls such as cascaded loops and interlocks as well as easy interfacing with other production computer systems. It enabled sophisticated alarm handling, introduced automatic event logging, removed the need for physical records such as chart recorders, allowed the control racks to be networked and thereby located locally in the plant to reduce cabling runs, and provided high level overviews of plant status and production levels. For large control systems, the general commercial name "Distributed Control System" (DCS) was coined to refer to proprietary modular systems which had high-speed networking and a full suite of displays and control racks, which all seamlessly integrated.

While the DCS was often tailored to meet the needs of large industrial continuous processes, in industries where combinatory and sequential logic was the primary requirement, the PLC (programmable logic controller) evolved out of a need to replace racks of relays and timers used for event-driven control. The old controls were difficult to re-configure and fault-find and PLC control enabled networking of signals to a central control area with electronic displays. Accordingly, PLCs were first developed for the automotive industry on vehicle production lines, where sequential logic was becoming very complex. It was soon adopted in a large number of other event-driven applications as varied as printing presses and water treatment plants.

Supervisory Control and Data Acquisition ("SCADA") platforms were then developed. SCADA's history is rooted in distribution applications, such as power, natural gas, and water pipelines, where there is a need to gather remote data through potentially unreliable or intermittent low-bandwidth and high-latency links. SCADA systems use open-loop control with sites that are widely separated geographically. A SCADA system uses RTUs (remote terminal units, also referred to as remote telemetry units) to send supervisory data back to a control center. Most RTU systems generally have limited capacity to handle local controls while the master station is not available. However, more recently RTU systems have grown more capable of handling local controls.

Currently, the boundaries between DCS and SCADA/PLC systems are blurring. The technical limits that drove the designs of these various systems are no longer an issue. Many PLC platforms can now perform quite well as a small DCS, using remote I/O and are sufficiently reliable that some SCADA systems actually manage closed loop control over long distances with a relatively high degree of consistency. With the increasing speed of today's processors, many DCS products have a full line of PLC-like subsystems that were not offered when they were initially developed.

A Manufacturing Execution System ("MES"), generally speaking, is a computerized system used in manufacturing, to track and document the transformation of raw materials to finished goods. MES provides information that assists manufacturing decision makers understand how current conditions on the plant floor can be optimized to improve production output. MES works in real-time to enable the control of multiple elements of the production process (e.g. inputs, personnel, machines and support services). MES may operate across multiple function areas, for example: management of product across the product life cycle, resource scheduling, order execution and dispatch, production analysis and downtime management for overall equipment effectiveness (OEE), product quality, or track-and-trace paradigms. MES creates the "as-built" record, capturing the data, processes, and outcomes of the manufacturing process. This can be especially important in regulated industries, such as pharmaceutical(s) or biopharmaceutical(s), where documentation and proof of processes, events, and actions may be required for compliance and regulatory purposes.

A wide variety of systems arose using collected data for a dedicated purpose(s). Further development of these systems during the 1990s introduced overlap in functionality. A functional hierarchy was defined in which MES were situated at Level 3 between ERP at Level 4 and process control at Levels 0, 1, 2. In 2000, the ANSI/ISA-95 standard merged this model with the Purdue Enterprise Reference Architecture ("PERA"). With the publication of the third part of the standard in 2005, activities in Level 3 were divided over four main operations: (i) production, (ii) quality, (iii) logistics and (iv) maintenance. In modern parlance, the idea of MES is generally seen as an intermediate step between, on the one hand, an enterprise resource planning (ERP) system, and a supervisory control and data acquisition (SCADA) or process control system on the other.

With the advent of cloud computing, the Internet of Things ("IoT") is poised to fundamentally change industrial manufacturing. Generally speaking, cloud computing is a model for enabling ubiquitous access to shared pools of configurable resources (such as computer networks, servers, storage, applications and services), which can be rapidly provisioned with minimal management effort, often over the Internet. For these reasons, cloud computing has become a significant vision for improvement in automated manufacturing industries. However, the challenges in cloud computing prevail as cloud grows in large scale in order to support huge numbers of high-performance process controllers; operating concurrently in manufacturing with zero downtime and no slowness, these challenges are impacting the decision to adopt cloud computing for process controller in manufacturing.

Finally, the globalization of pharmaceutical manufacturing requires a global approach to integration keeping in mind the overall objective of strong public health protection. To accomplish these needed goals there is a need to carry out the following actions. First, the artisan should use emerging pharmaceutical science, process control technology, computer and network programming, data analytics, and cloud computing technology to enhance commercial production, quality control, and quality assurance programs to target the highest risk areas. Second, an artisan should look to modern manufacturing techniques to integrate production at all levels and across a global scale. Third, the artisan should strive for consistency and predictability in its processes with an overall goal of production transparency from the line worker to a business unit to a regulating body (e.g. The Food and Drug Administration).

From the aforementioned, it will be readily apparent to those skilled in the art that a new manufacturing paradigm is needed in the production of pharmaceuticals and biopharmaceuticals. By using modern process control and computer programming techniques in conjunction with cloud control technologies, a new process control paradigm can be achieved with the overall goal of more efficient systems, reduced waste, and lower production costs. This, in turn, will allow higher quality drugs to be produced and offered to the patients and end users at a lower price.

Given the current deficiencies associated with cloud computing, process control, pharmaceutical and biopharmaceutical manufacturing, higher drug costs, and the fact that the demand from a public health standpoint is ever increasing, it becomes clear that providing a cloud based MES for use in pharmaceutical and biopharmaceutical manufacture is desirable. Specifically, using cloud computing to control the production of pharmaceuticals and biopharmaceuticals from a "quality by design" approach (i.e. where quality is designed into the production versus testing quality post-production) is advantageous. The present invention provides this solution.

SUMMARY OF THE INVENTION

The invention provides for cloud based manufacturing execution systems (denoted herein as manufacturing execution system or MES) and methods thereof designed for use in manufacturing pharmaceuticals and biopharmaceuticals in the cloud. As used herein, the term pharmaceutical is synonymous with "drug" and the term biopharmaceutical is synonymous with "biologic". In certain embodiments, the MES comprises software programs that monitor quality control and the quality process used in the manufacture, processing, and storing of drugs and biologics. In certain embodiments, the MES comprising software program(s) are used in a continuous manner to ensure purity and consistency of an active ingredient used in pharmaceutical and biopharmaceutical manufacture. In certain embodiments, the MES comprising software program(s) are used in a continuous manner to ensure purity and consistency of an inactive ingredient used in pharmaceutical and biopharmaceutical manufacture. In certain embodiments, the MES comprising software program(s) are used in a continuous manner to ensure purity and consistency of an in-process material used in pharmaceutical and biopharmaceutical manufacture.

In certain embodiments, the MES comprising software program(s) are used in a semi-continuous manner to ensure purity and consistency of an active ingredient, inactive ingredient, or in-process material used in pharmaceutical and biopharmaceutical manufacture.

In certain embodiments, the MES comprising software program(s) are used in a manner, which provides real-time process control to ensure product consistency of a design specification of an active ingredient, inactive ingredient, or in-process material used in pharmaceutical and biopharmaceutical manufacture.

The invention further comprises a cloud-controlled MES comprising software program(s) that is fully integrated and automated to monitor and control the entire pharmaceutical and biopharmaceutical manufacturing process.

The invention further comprises integrating a cloud-controlled manufacturing execution system into a pharmaceutical or biopharmaceutical manufacturing system whereby control of the pharmaceutical or biopharmaceutical manufacturing process is attained.

The invention further comprises a cloud-controlled MES integrated into a pharmaceutical or biopharmaceutical manufacturing system whereby control of the pharmaceutical or biopharmaceutical manufacturing process is attained and whereby the cloud is a private cloud.

The invention further comprises a cloud-controlled MES integrated into a pharmaceutical or biopharmaceutical manufacturing system whereby control of the pharmaceutical or biopharmaceutical manufacturing process is attained and whereby the cloud is a public cloud.

The invention further comprises a cloud-controlled MES integrated into a pharmaceutical or biopharmaceutical manufacturing system whereby control of the pharmaceutical or biopharmaceutical manufacturing process is attained and whereby the cloud is a hybrid cloud.

The invention further comprises a cloud-controlled MES integrated into a pharmaceutical or biopharmaceutical manufacturing system whereby control of the pharmaceutical or biopharmaceutical manufacturing process is attained and whereby the cloud is a distributed cloud.

The invention further comprises a cloud-controlled MES integrated into a pharmaceutical or biopharmaceutical manufacturing system whereby control of the pharmaceutical or biopharmaceutical manufacturing process is attained and whereby the cloud data uses endpoint protocols including but not limited to http, https, tcp, udp, tcp/ip, tls, and MQTT.

The invention further comprises a cloud-controlled MES integrated into a pharmaceutical or biopharmaceutical manufacturing system whereby control of the pharmaceutical or biopharmaceutical manufacturing process is attained and whereby the cloud data uses endpoint protocols including but not limited to an internal endpoint or customized endpoint protocol.

The invention further comprises a cloud-controlled MES integrated into a pharmaceutical or biopharmaceutical manufacturing system whereby control of the pharmaceutical or biopharmaceutical manufacturing process is attained and whereby the cloud data communicated via a Full Duplex.

The invention further comprises a cloud-controlled MES integrated into a pharmaceutical or biopharmaceutical manufacturing system whereby control of the pharmaceutical or biopharmaceutical manufacturing process is attained and whereby the cloud data communicated via a Half Duplex.

The invention further comprises a cloud-controlled MES integrated into a pharmaceutical or biopharmaceutical manufacturing system whereby control of the pharmaceutical or biopharmaceutical manufacturing process is attained and whereby the cloud data uses a plurality of data centers and whereby a data center is geographically located to reduce latency.

The invention further comprises a cloud-controlled MES integrated into a pharmaceutical or biopharmaceutical manufacturing system whereby control of the pharmaceutical or biopharmaceutical manufacturing process is attained and whereby the cloud data uses a plurality of data centers and whereby a data center comprises a buffer memory to reduce latency.

The invention further comprises a cloud-controlled MES integrated into a pharmaceutical or biopharmaceutical manufacturing system whereby control of the pharmaceutical or biopharmaceutical manufacturing process is attained and whereby the cloud data uses an embedded system.

The invention further comprises a cloud-controlled MES integrated into a pharmaceutical or biopharmaceutical manufacturing system whereby control of the pharmaceutical or biopharmaceutical manufacturing process is attained and whereby the cloud data uses a distributed control system.

The invention further comprises a cloud-controlled MES integrated into a pharmaceutical or biopharmaceutical manufacturing system whereby control of the pharmaceutical or biopharmaceutical manufacturing process is attained and whereby the cloud data uses a PLC.

The invention further comprises a cloud-controlled MES integrated into a pharmaceutical or biopharmaceutical manufacturing system whereby control of the pharmaceutical or biopharmaceutical manufacturing process is attained and whereby the cloud data uses a software based PLC.

The invention further comprises a cloud-controlled MES directly interfaced with a software based PLC to control a pharmaceutical or biopharmaceutical manufacturing system whereby control of the pharmaceutical or biopharmaceutical manufacturing process is attained.

The invention further comprises a cloud-controlled MES integrated into a pharmaceutical or biopharmaceutical manufacturing system whereby control of the pharmaceutical or biopharmaceutical manufacturing process is attained and whereby the MES is programmed using a modular programming paradigm.

The invention further comprises a cloud-controlled MES integrated into a pharmaceutical or biopharmaceutical manufacturing system whereby control of the pharmaceutical or biopharmaceutical manufacturing process is attained and whereby the MES is programmed using a dynamic programming paradigm.

The invention further comprises a cloud-controlled MES integrated into a pharmaceutical or biopharmaceutical manufacturing system whereby control of the pharmaceutical or biopharmaceutical manufacturing process is attained and whereby the MES programming is optimized using memorization.

The invention further comprises a cloud-controlled MES integrated into a pharmaceutical or biopharmaceutical manufacturing system whereby control of the pharmaceutical or biopharmaceutical manufacturing process is attained and whereby the MES is programmed using a subroutine.

The invention further comprises a cloud-controlled MES integrated into a pharmaceutical or biopharmaceutical manufacturing system whereby control of the pharmaceutical or biopharmaceutical manufacturing process is attained and whereby the MES is programmed using a subroutine and whereby the subroutine comprises a thunk.

The invention further comprises a cloud-controlled MES integrated into a pharmaceutical or biopharmaceutical manufacturing system whereby control of the pharmaceutical or biopharmaceutical manufacturing process is attained and whereby the MES is programmed using a modified dynamic programming paradigm in conjunction with a greedy algorithm paradigm.

The invention further comprises a cloud-controlled MES integrated into a pharmaceutical or biopharmaceutical manufacturing system whereby control of the pharmaceutical or biopharmaceutical manufacturing process is attained and whereby the MES is directly interfaced to a sensor, whereby the sensor is controlled by the cloud based MES.

The invention further comprises a cloud-controlled MES integrated into a pharmaceutical or biopharmaceutical manufacturing system whereby control of the pharmaceutical or biopharmaceutical manufacturing process is attained and whereby the MES is directly interfaced to a sensor, whereby the sensor is controlled by the cloud based MES and whereby the sensor is either an active sensor or a passive sensor or a plurality of active or passive sensor.

The invention further comprises a cloud-controlled MES integrated into a pharmaceutical or biopharmaceutical manufacturing system whereby control of the pharmaceutical or biopharmaceutical manufacturing process is attained and whereby the MES is directly interfaced to a mobile wireless sensor network, whereby the mobile wireless sensor network is controlled by the cloud based MES.

In certain embodiments, a cloud-controlled MES is integrated into a powder blending system modified for use in pharmaceutical or biopharmaceutical manufacture whereby the cloud-controlled MES controls the powder blending system.

In certain embodiments, a cloud-controlled MES is integrated into a granulation system modified for use in pharmaceutical or biopharmaceutical manufacture whereby the cloud-controlled MES controls the granulation system.

In certain embodiments, a cloud-controlled MES is integrated into a crystallization system modified for use in pharmaceutical or biopharmaceutical manufacture whereby the cloud-controlled MES controls the crystallization system.

In certain embodiments, a cloud-controlled MES is integrated into a tablet system modified for use in pharmaceutical or biopharmaceutical manufacture whereby the cloud-controlled MES controls the tablet press system.

In certain embodiments, a cloud-controlled MES is integrated into a chromatography system modified for use in pharmaceutical or biopharmaceutical manufacture whereby the cloud-controlled MES controls the chromatography system.

In certain embodiments, a cloud-controlled MES is integrated into a pH system modified for use in pharmaceutical or biopharmaceutical manufacture whereby the cloud-controlled MES controls the pH system.

In certain embodiments, a aloud-controlled MES is integrated into a liquid mixing system modified for use in pharmaceutical or biopharmaceutical manufacture whereby the cloud-controlled MES controls the liquid mixing system.

In certain embodiments, a cloud-controlled MES is integrated into a water-based system modified for use in pharmaceutical or biopharmaceutical manufacture whereby the cloud-controlled MES controls the water-based system.

In certain embodiments, a cloud-controlled MES is integrated into a finishing and packaging system modified for use in pharmaceutical or biopharmaceutical manufacture whereby the cloud-controlled MES controls the finishing and packaging system.

In certain embodiments, a cloud-controlled MES is integrated into a supply chain management subset of a pharmaceutical or biopharmaceutical finishing and packaging system whereby the cloud-controlled MES controls the supply chain management subset of the pharmaceutical or biopharmaceutical finishing and packaging system.

In certain embodiments, a cloud-controlled MES is integrated into a track-and-trace subset of a pharmaceutical or biopharmaceutical finishing and packaging system whereby the cloud-controlled MES controls the track-and-trace subset of the pharmaceutical or biopharmaceutical finishing and packaging system.

In certain embodiments, a cloud-controlled MES is integrated into a cell culture system modified for use in pharmaceutical or biopharmaceutical manufacture whereby the cloud-controlled MES controls the cell culture system.

In certain embodiments, a cloud-controlled MES is integrated into a bioreactor subset of a pharmaceutical or biopharmaceutical cell culture system whereby the cloud-controlled MES controls the bioreactor subset of the pharmaceutical or biopharmaceutical cell culture system.

In certain embodiments, a cloud-controlled MES is integrated into a filtration/purification system modified for use in pharmaceutical or biopharmaceutical manufacture whereby the cloud-controlled MES controls the filtration/purification system.

In certain embodiments, a cloud-controlled MES is integrated into a centrifugation system modified for use in pharmaceutical or biopharmaceutical manufacture whereby the cloud-controlled MES controls the centrifugation system.

In certain embodiments, a cloud-controlled MES is integrated into a viral inactivation system modified for use in pharmaceutical or biopharmaceutical manufacture whereby the cloud-controlled MES controls the viral inactivation system.

In certain embodiments, a cloud-controlled MES is integrated into a field instrumentation component modified for use in pharmaceutical or biopharmaceutical manufacture whereby the cloud-controlled MES controls the field instrumentation component.

In certain embodiments, a cloud-controlled MES is integrated into an operational unit modified for use in pharmaceutical or biopharmaceutical manufacture whereby the cloud-controlled MES controls the operational unit.

In certain embodiments, a cloud-controlled MES is integrated into a pharmaceutical or biopharmaceutical manufacturing system whereby the cloud-controlled MES controls the quality control function of the pharmaceutical or biopharmaceutical system.

In certain embodiments, a cloud-controlled MES is integrated into a pharmaceutical or biopharmaceutical manufacturing system whereby the cloud-controlled MES controls the quality control function of the pharmaceutical or biopharmaceutical system and whereby the quality control function is continuously monitored.

In certain embodiments, a cloud-controlled MES is integrated into a pharmaceutical or biopharmaceutical manufacturing system whereby the cloud-controlled MES controls the quality control function of the pharmaceutical or biopharmaceutical system and whereby the quality control function is continuously monitored and whereby the monitoring occurs at critical control points located throughout the pharmaceutical or biopharmaceutical system/process.

The invention further comprises an apparatus comprising (i) a distributed network, (ii) an input endpoint protocol, (iii) a manufacturing execution system, (iv) a sensor, and a (v) software based PLC, whereby said apparatus controls and monitors a pharmaceutical or biopharmaceutical manufacturing process/system.

The invention further comprises an apparatus comprising (i) a distributed network, (ii) an input endpoint protocol, (iii) a manufacturing execution system, (iv) a mobile wireless sensor network, and a (v) software based PLC, whereby said apparatus controls and monitors a pharmaceutical or biopharmaceutical manufacturing process/system.

The invention further comprises an apparatus comprising (i) a distributed network, (ii) an input endpoint protocol, (iii) a manufacturing execution system, (iv) a mobile wireless sensor network, a (v) software based PLC, and a pharmaceutical or biopharmaceutical hardware device or devices, including but not limited to powder blending systems, granulation systems, crystallization systems, tablet presses, chromatography systems, pH systems, liquid mixing systems, water-based systems, finishing and packaging systems, cell culture systems, filtration/purification systems, centrifugation systems, vial inactivation systems, field instrumentation components and operational units, blenders, bioreactors, capping machines, separation systems, chilled water/circulating systems, glycol systems, modular coldrooms, clean steam systems, clean-in-place (CIP) devices, compressed air systems, D.I./R.O. water systems, dry heat sterilizers, ovens, fermentation equipment, freezers, filling equipment, HVAC/environmental control systems, incubators, environmentally controlled chambers, labelers, lyophilizers, freeze dryers, dryers, mixing tanks, neutralization systems, plant steam and condensate systems, process tanks, pressure tanks, vessels, refrigerators, separation/purification equipment, specialty gas systems, steam generators, pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, carboys, etc.), single use bioreactors, and modular production devices whereby said apparatus controls and monitors a pharmaceutical or biopharmaceutical manufacturing process and whereby the pharmaceutical or biopharmaceutical process produces an active ingredient, an inactive ingredient, an in-process material, a N.M.E, or a drug product.

The invention further comprises a cloud-controlled manufacturing execution system (MES) adapted for use to monitor and control a pharmaceutical or biopharmaceutical process/system comprising (i) a distributed network, (ii) a connectivity application, and (iii) a non-transitory computer memory having computer executable instructions, whereby said manufacturing execution system controls and monitors a pharmaceutical or biopharmaceutical manufacturing process/system.

BRIEF DESCRIPTION OF THE FIGURES

FIG. 1. Schematic of a Cloud-Based Distributed System of the Invention. As shown in the FIGURE, the storage/application layer is housed in a wireless network "cloud" architecture. The Distributed System is fully connected and a user is connected in any one of the cloud-based servers.

FIG. 2. Exemplary Schematic of an end User Connectivity. As shown in the FIGURE, the connectivity can be either programmable direct control or remote wireless control or a combination of both.

FIG. 3. Prior Art. FIG. 3(A). Shows a standard PERA five (5) level (level 0-4) enterprise architecture. The MES is shown in level 3. FIG. 3(B). Shows the standard PERA reference model decision making and control hierarchy (1992). FIG. 3(C). Shows the current manufacturing ISA-95 standard.

FIG. 4. Shows a Schematic of a Single Layer MES Architecture.

FIG. 5. Schematic of a Cloud Based MES Integrated with a Pharmaceutical or Biopharmaceutical Powder Blending System. As shown in the FIGURE, the entire pharmaceutical or biopharmaceutical powder blending system is integrated into a "Cloud" based MES and wireless distributed control system. Data is monitored at critical control points to ensure quality parameters are being achieved. The data is monitored and analyzed in real-time, near real-time, or live.

FIG. 6. Schematic of a Cloud Based MES Integrated with a Pharmaceutical or Biopharmaceutical Granulation System. As shown in the FIGURE, the entire pharmaceutical or biopharmaceutical granulation (exemplified either wet or dry) system is integrated into a "Cloud" based MES and wireless distributed control system. Data is monitored at critical control points to ensure quality parameters are being achieved. The data is monitored and analyzed in real-time, near real-time, or live.

FIG. 7. Schematic of a Cloud Based MES Integrated with a Pharmaceutical or Biopharmaceutical Crystallization System. As shown in the FIGURE, the entire pharmaceutical or biopharmaceutical crystallization system is integrated into a "Cloud" based MES and wireless distributed control system. Data is monitored at critical control points to ensure quality parameters are being achieved. The data is monitored and analyzed in real-time, near real-time, or live.

FIG. 8. Schematic of a Cloud Based MES Integrated with a Pharmaceutical or Biopharmaceutical Tablet Press System. As shown in the FIGURE, the entire pharmaceutical or biopharmaceutical tablet press system is integrated into a "Cloud" based MES and wireless distributed control system. Data is monitored at critical control points to ensure quality parameters are being achieved. The data is monitored and analyzed in real-time, near real-time, or live.

FIG. 9. Schematic of a Cloud Based MES Integrated with a Pharmaceutical or Biopharmaceutical Chromatography System. As shown in the FIGURE, the entire pharmaceutical or biopharmaceutical chromatography system is integrated into a "Cloud" based MES and wireless distributed control system. Data is monitored at critical control points to ensure quality parameters are being achieved. The data is monitored and analyzed in real-time, near real-time, or live.

FIG. 10. Schematic of a Cloud Based MES Integrated with a Pharmaceutical or Biopharmaceutical pH System. As shown in the FIGURE, the entire pharmaceutical or biopharmaceutical pH system is integrated into a "Cloud" based MES and wireless distributed control system. Data is monitored at critical control points to ensure quality parameters are being achieved. The data is monitored and analyzed in real-time, near real-time, or live.

FIG. 11. Schematic of a Cloud Based MES Integrated with a Pharmaceutical or Biopharmaceutical Liquid Mixing System. As shown in the FIGURE, the entire pharmaceutical or biopharmaceutical Liquid Mixing system is integrated into a "Cloud" based MES and wireless distributed control system. Data is monitored at critical control points to ensure quality parameters are being achieved. The data is monitored and analyzed in real-time, near real-time, or live.

FIG. 12. Schematic of a Cloud Based MES Integrated with a Pharmaceutical or Biopharmaceutical Water-Based System. As shown in the FIGURE, the entire pharmaceutical or biopharmaceutical Water-Based system is integrated into a "Cloud" based MES and wireless distributed control system. Data is monitored at critical control points to ensure quality parameters are being achieved. The data is monitored and analyzed in real-time, near real-time, or live.

FIG. 13. Schematic of a Cloud Based MES Integrated with a Pharmaceutical or Biopharmaceutical Finishing and Packaging System. As shown in the FIGURE, the entire pharmaceutical or biopharmaceutical Finishing and Packaging system is integrated into a "Cloud" based MES and wireless distributed control system. Data is monitored at critical control points to ensure quality parameters are being achieved. The data is monitored and analyzed in real-time, near real-time, or live.

FIG. 14. Schematic of a Cloud Based MES Integrated with a Pharmaceutical or Biopharmaceutical Cell Culture System. As shown in the FIGURE, the entire pharmaceutical or biopharmaceutical Cell Culture system is integrated into a "Cloud" based MES and wireless distributed control system. Data is monitored at critical control points to ensure quality parameters are being achieved. The data is monitored and analyzed in real-time, near real-time, or live.

FIG. 15. Shows a Schematic of a Single Layer MES Architecture Integrated into a Smart Factory.

FIG. 16. Shows a Schematic of a Cloud Based MES Integrated into a Supply Chain Distribution of a Drug or Biologic.

DETAILED DESCRIPTION OF THE INVENTION

Outline of Sections
I.) Definitions
II.) Cloud Based Distributed Systems
III.) Programmable Logic Controller(s) (PLC) and Embedded System(s)
IV.) Algorithms, Software Program, and Computer Product(s)
V.) Data and Process Analytics
VI.) Manufacturing execution system(s)
VII.) Sensor(s)
VIII.) Pharmaceutical Manufacturing Processes and Systems
   a. Powder Blending Processes/Systems
   b. Granulation
      a. Wet Granulation
      b. Dry Granulation
   c. Crystallization Processes/Systems
   d. Tablet Press Processes/Systems
   e. Chromatography Processes/Systems
   f. pH Processes/Systems
   g. Liquid Mixing Processes/Systems
      a. Liquid-Liquid Mixing
      b. Liquid-Solid Mixing
      c. Liquid-Gas Mixing
   h. Water-Based Processes/Systems
      a. Chilled Water Systems
      b. Clean-In-Place (CIP) Systems
      c. Clean Steam Systems
      d. Water-For-Injection (WFI) Systems
   i. Finishing and Packaging Processes/Systems
      a. Filling Systems
      b. Dry Heat Sterilizers
      c. Lypholizers
      d. Vial Inspection Systems
      e. Supply Chain Management
      f. Track and Trace Systems
   j. Cell Culture Processes/Systems
      a. Cell Banking
      b. Bioreactor(s)
   k. Filtration/Purification
   l. Field Instrumentation Components
   m. Operational Units
IX.) KITS/Articles of Manufacture
X.) MES System Security

I.) Definitions

Unless otherwise defined, all terms of art, notations and other scientific terms or terminology used herein are intended to have the meanings commonly understood by those of skill in the art to which this invention pertains unless the context clearly indicates otherwise. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art, such as, for example, the widely utilized current Good Manufacturing Practice guidelines.

"interface" means the communication boundary between two or more entities, such as a piece of software, a hardware device, or a user. It generally refers to an abstraction that an entity provides of itself to the outside. This separates the methods of external communication from internal operation, and allows it to be internally modified without affecting the way outside entities interact with it, as well as provide multiple abstractions of itself. It may also provide a means of translation between entities which do not speak the same language, such as between a human and a computer. The interface between a human and a computer is called a user interface. Interfaces between hardware components are physical interfaces. Interfaces between software exist between separate software components and provide a programmatic mechanism by which these components can communicate.

"abstraction" means the separation of the logical properties of data or function from its implementation in a computer program.

"algorithm" means any sequence of operations for performing a specific task.

"analog device" means a device that operates with variables represented by continuously measured quantities such as pressures, resistances, rotations, temperatures, and voltages.

"analog-to-digital converter" means input related devices, which translate an input device's [sensor] analog signals to the corresponding digital signals needed by the computer.

"analysis" means a course of reasoning showing that a certain result is a consequence of assumed premises.

"analytics" means the discovery, interpretation, and communication of meaningful patterns in data.

"application software" means software designed to fill specific needs of a user.

"aspect oriented programming" means a programming paradigm that aims to increase modularity.

"bandwidth" means the amount of data that can be transferred from one point to another (normally measure in seconds).

"bar code" means a code representing characters by sets of parallel bars of varying thickness and separation that are read optically by transverse scanning.

"battery backup" means a battery that allows the memory to retain its values when the PLC or software based PLC is turned off.

"benchmark" means a standard against which measurements or comparisons can be made.

"bootstrap" means a short computer program that is permanently resident or easily loaded into a computer and whose execution brings a larger program, such an operating system or its loader, into memory.

"buffer memory" means a register or group of registers used for temporary storage of data. Most often used in communications to compensate for different transmission rates and reception of data.

"calibration" means ensuring continuous adequate performance of sensing, measurement, and actuating equipment with regard to specified accuracy and precision requirements.

"cloud computing" means the practice of using a network of remote servers hosted on the Internet to store, manage, and process data, rather than a local server or a personal computer.

"closed loop" means a system that measures the output and adjusts operation based on conditions. This is also known as feedback.

"computer hardware latency" means is the delay between the process instruction commanding the transition and the hardware actually transitioning the voltage from high to low or low to high.

"configurable, off-the-shelf software" means application software, sometimes general purpose, written for a variety of industries or users in a manner that permits users to modify the program to meet their individual needs.

"control system security" means the prevention of intentional or unintentional interference with the proper operation of industrial automation and control systems. Generally, these control systems manage essential services including pharmaceuticals, medicine, electricity, petroleum production, water, transportation, manufacturing, and communications. They rely on computers, networks, operating systems, applications, and programmable controllers, each of which could contain security vulnerabilities.

"controller" means hardware that controls peripheral devices such as a disk or display screen. It performs the physical data transfers between main memory and the peripheral device.

"critical control point" means a function or an area in a manufacturing process or procedure, the failure of which, or loss of control over, may have an adverse affect on the quality of the finished product and may result in an unacceptable health risk.

"data packet" means a unit of data made into a single package that travels along a given network path. Data packets are used in Internet Protocol (IP) transmissions for data that navigates the Web, and in other kinds of distributed systems.

"distributed system" means a model in which components located on networked computers communicate and coordinate their actions by passing messages. The components interact with each other in order to achieve a common goal. Three significant characteristics of distributed systems are: (i) concurrency of components, (ii) lack of a global clock, and (iii) independent failure of components.

"distributed control system" ("DCS") means a system interconnecting sensors, controllers, operator terminals and actuators to a computer for process automation control.

"domain specific language" ("DSL") means a computer language specialized to a particular application domain. This is in contrast to a general-purpose language (GPL), which is broadly applicable across domains. There is a wide variety of DSLs, ranging from widely used languages for common domains, such as HTML for web pages, down to languages used by only one or a few pieces of software, such as Emacs Lisp for GNU Emacs and XEmacs.

"dynamic programming" (a.k.a. dynamic optimization) means a method for solving a complex problem by breaking it down into a collection of simpler sub-problems, solving each of those sub-problems just once, and storing their solutions. The next time the same sub-problem occurs, instead of re-computing its solution, one simply looks up the previously computed solution, thereby saving computation time at the expense of an expenditure in storage space. Generally, each of the sub-problem solutions is indexed in some way, typically based on the values of its input parameters, so as to facilitate its lookup.

"embedded system" means a computer system with a dedicated function within a larger mechanical or electrical system, often with real-time computing constraints. It is embedded as part of a complete device often including hardware and mechanical parts.

"encryption" means the process of encoding a message or information in such a way that only authorized parties can access it.

"end user" means a person, device, program, or computer system that uses an information system for the purpose of data processing in information exchange.

"enterprise resource planning" ("ERP") means the integrated management of core business processes, often in real-time and mediated by software and technology. These business activities can include: product planning, purchase, production, manufacturing or service delivery, marketing and sales, materials management, inventory management, shipping, and finance (AP and AR). ERP is usually referred to as a category of business management software, typically a suite of integrated applications, that an organization can use to collect, store, manage and interpret data from these many business activities.

"fieldbus" means a system for serial data transfer in the field area (i.e. the installation, sensor/actuator and controller level).

"Fifth Generation programming language" (5GL") means a programming language based on solving using constraints given to the program, rather than using an algorithm written by a programmer Most constraint-based and logic programming languages and some other declarative languages are fifth-generation languages.

"Fourth Generation Programming Language" ("4GL") means any computer programming language that belongs to a class of languages envisioned as an advancement upon third-generation programming languages (3GL). Each of the programming language generations aims to provide a higher level of abstraction of the internal computer hardware details, making the language more programmer-friendly, powerful and versatile.

"full duplex" means a bidirectional mode of communication where data may be transmitted and received simultaneously.

"granulation" means the act or process in which primary powder particles are made to adhere to form larger, multiparticle entities called granules. It is the process of collecting particles together by creating bonds between them. Bonds are formed by compression or by using a binding agent. Granulation is extensively used in the manufacturing of tablets and pellets.

"Greedy Algorithm" means an algorithmic paradigm that follows the problem solving heuristic of making the locally optimal choice at each stage.

"half duplex" means a communication link in which data transmission is limited to one direction at a time.

"hypertext Transfer Protocol" ("HTTP") means an application protocol for distributed, collaborative, and hypermedia information systems. HTTP is the foundation of data communication for the World Wide Web.

"hypertext Text Transfer Protocol Secure" ("HTTPS") means the secure version of HTTP, the protocol over which data is sent between your browser and the website that you are connected to. The 'S' at the end of HTTPS stands for 'Secure'. It means all communications between your browser and the website are encrypted.

"high level programming language" means a programming language with strong abstraction from the details of the computer. In comparison to low-level programming languages, it may use natural language elements, be easier to use, or may automate (or even hide entirely) significant areas of computing systems (e.g. memory management), making the process of developing a program simpler and more understandable relative to a lower-level language.

"Industrial Control System" ("ICS") means a general term that encompasses several types of control systems and associated instrumentation used for industrial process control. Such systems can range from a few modular panel-mounted controllers to large interconnected and interactive distributed control systems with many thousands of field connections. All systems receive data received from remote sensors measuring process variables (PVs), compare these with desired set points (SPs) and derive command functions which are used to control a process though the final control elements (FCEs), such as control valves. The larger systems are usually implemented by Supervisory Control and Data Acquisition (SCADA) systems, or distributed control systems (DCS), and programmable logic controllers (PLCs), though SCADA and PLC systems are scalable down to small systems with few control loops.

"Internet of Things" ("IoT") means the interconnection via the Internet of computing devices embedded in everyday objects, enabling them to send and receive data. The IoT allows objects to be sensed or controlled remotely across existing network infrastructure, creating opportunities for more direct integration of the physical world into computer-based systems, and resulting in improved efficiency, accuracy and economic benefit in addition to reduced human intervention.

"Industrial Internet of Things" ("IIoT") means the interconnection via the Internet of computing devices embedded in industrial production equipment, enabling them to send and receive data. The IIoT allows production objects to be sensed or controlled remotely across existing network infrastructure, creating opportunities for more direct integration of the physical world into computer-based systems, and resulting in improved efficiency, accuracy and economic benefit in addition to reduced human intervention.

"Internet Protocol Suite" means the conceptual model and set of communications protocols used on the Internet and similar computer networks. It is commonly known as TCP/IP because the original protocols in the suite are the Transmission Control Protocol (TCP) and the Internet Protocol (IP). It is occasionally known as the Department of Defense (DoD) model, because the development of the networking method was funded by the United States Department of Defense through DARPA.

"low-level language" means a programming language that provides little or no abstraction from a computers instruction set architecture, commands or functions in the language map closely to processor instructions. Generally this refers to either machine code or assembly language. The word "low" refers to the small or nonexistent amount of abstraction between the language and machine language; because of this, low-level languages are sometimes described as being "close to the hardware". Programs written in low-level languages tend to be relatively non-portable, mainly because of the close relationship between the language and the hardware architecture.

"memorization" means an optimization technique used primarily to speed up computer programs by storing the results of expensive function calls and returning the cached result when the same inputs occur again.

"microcontroller" means a small computer on a single integrated circuit. In modern terminology, it is similar to, but less sophisticated than, a system on a chip or SoC; an SoC may include a microcontroller as one of its components. A microcontroller contains one or more CPUs (processor cores) along with memory and programmable input/output peripherals. Program memory in the form of Ferroelectric RAM, NOR flash or OTP ROM is also often included on chip, as well as a small amount of RAM. Microcontrollers are designed for embedded applications, in contrast to the microprocessors used in personal computers or other general purpose applications consisting of various discrete chips.

"Mobile Wireless Sensor Network") ("MWSN") means mobile spatially distributed autonomous sensors to monitor physical or environmental conditions, such as temperature, sound, pressure, pH, concentration, DO, pressure, magnetic, moisture, flow, fluid velocity, density, temperature, heat, etc. and to cooperatively pass their data through the network to other locations. The more modern networks are bi-directional, also enabling control of sensor activity.

"modbus" means a communication protocol used to share data between controllers. It was originally designed for Modicon PLCs but was adopted by many other manufacturers since it is an open architecture and thus has become an industry standard.

"Modular Programming" means a software design technique that emphasizes separating the functionality of a program into independent, interchangeable modules, such that each contains everything necessary to execute only one aspect of the desired functionality.

"MQ Telemetry Transport" means The IBM MQ Telemetry Transport (MQTT) v3 protocol is designed for exchanging messages between small devices on low bandwidth, or expensive connections, and to send messages reliably. It uses TCP/IP.

"multi-paradigm programming" means a programming language that supports more than one programming paradigm. The design goal is to allow programmers to use the best tool for the job. The concept is to provide a framework in which programmers can work in a variety of styles. This is common in complex systems architecture.

"Network latency" means time interval between the stimulation and response, or, from a more general point of view, a time delay between the cause and the effect of some physical change in the system being observed. Network latency in a packet-switched network is measured either one-way (the time from the source sending a packet to the destination receiving it), or round-trip delay time (the one-way latency from source to destination plus the one-way latency from the destination back to the source). Round-trip latency is more often quoted, because it can be measured from a single point. Note that round trip latency excludes the amount of time that a destination system spends processing the packet.

"OPC" means a set of standards that specify the communication of data between software applications and automation hardware. The acronym OPC originally stood for OLE for Process Control because it was based upon the Microsoft OLE (Object Linking and Embedding) technology. In fact, it was meant as the automation industries version of OLE but with the changes in Microsoft technology the term OLE has been dropped from the acronym. OPC now stands as a phrase to describe a set of standards for open connectivity in automation and process control.

"open Loop" means a system that does not monitor the output to adjust control. This is typically used on well behaved systems.

"paradigm" means a typical example or pattern; a model.

"process automation system" means a system interconnecting sensors, controllers, operator terminals and actuators to a computer for process automation control. A PAS is based on open standards in contrast to a DCS (distributed control system), which is traditionally proprietary.

"product specification" means a statement (usually in documentary form) of how a drug or biologic is made. Specifications for active ingredients are essential for product quality and patient safety. The goal of a product specification is to determine appropriate and safe limits or quantitative ranges during drug or biologic production.

"programmable logic controller" ("PLC") means a specialized industrial digital computer which has been adapted for the control of machines and processes.

"PLC central processing unit" ("CPU") means the part of the PLC that runs and interprets the software code. The CPU is also known as the processor.

"Proportional, Integral, Derivative" ("PID") means a control algorithm that is used to closely control processes such as temperature, mixture, position, and velocity. The proportional portion takes care of the magnitude of the error. The derivative compensates for the rate of error change. The integral takes care of small errors over time.

"Purdue Enterprise Reference Architecture" ("PERA") means an 1990s reference model for enterprise architecture, developed by Theodore J. Williams and members of the Industry-Purdue University Consortium for Computer Integrated Manufacturing. PERA is a reference architecture that can model the enterprise in multiple layers and in multiple stages of the architectural life cycle.

"quality control" means the operational techniques and procedures used to achieve quality requirements.

"register" means a quickly accessible location available to a computers central processing unit (CPU). Registers usually consist of a small amount of fast storage, although some registers have specific hardware functions, and may be read-only or write-only.

"sensor" means a data capture apparatus used by wireless sensor nodes to capture data from its environment. Sensors are hardware devices that produce a measurable response to a change in a physical condition like temperature or pressure.

"sensor node" (a.k.a. mote) means a node in a sensor network that is capable of performing some processing, gathering sensory information and communicating with other connected nodes in the network.

"Soft PLC" means software used on a personal computer or embedded system that emulates the functions of a PLC.

"Subroutine" means a sequence of program instructions that perform a specific task, packaged as a unit. This unit can then be used in programs wherever that particular task should be performed.

"Supervisory Control and Data Acquisition" ("SCADA") means the monitoring and control of processes using a computer.

"system administrator" means the person that is charged with the overall administration, and operation of a computer system. The System Administrator is normally an employee or a member of the establishment.

"synchronous programming" means a computer programming language optimized for programming reactive systems.

"third generation programming language" ("3GL") means a high level programming language 3GLs are much more machine independent and more programmer-friendly. This includes features like improved support for aggregate data types, and expressing concepts in a way that favors the programmer, not the computer.

"transport layer security" ("TLS") means cryptographic protocols that provide communications security over a computer network. Several versions of the protocols find widespread use in applications such as web browsing, email, Internet faxing, instant messaging, and voice-over-IP (VoIP). Websites are able to use TLS to secure all communications between their servers and web browsers. The Transport Layer Security protocol aims primarily to provide privacy and data integrity between two communicating computer applications.

"transmission control protocol" ("TCP") means a set of rules that governs the delivery of data over the Internet or other network that uses the Internet Protocol, and sets up a connection between the sending and receiving computers. It originated in the initial network implementation in which it complemented the Internet Protocol (IP). Therefore, the entire suite is commonly referred to as TCP/IP. TCP provides reliable, ordered, and error-checked delivery of a stream of octets between applications running on hosts communicating by an IP network. Major Internet applications such as the World Wide Web, email, remote administration, and file transfer rely on TCP.

"transmission rate" means the number of bits which can be extracted from a medium. The maximum transmission rate describes the fundamental limitation of a network medium.

"thunk" means a subroutine used to inject an additional calculation into another subroutine. Thunks are primarily used to delay a calculation until it is needed, or to insert operations at the beginning or end of the other subroutine.

"user datagram protocol" ("UDP") means an alternative communications protocol to transmission control protocol (TCP) used primarily for establishing low-latency and loss tolerating connections between applications on the Internet.

"batch" means a specific quantity of an active ingredient, inactive ingredient, component, in-process material, and/or drug product, as the case may be, that is intended to have uniform character and quality, within a specified product specification, and is produced according to a single manufacturing order during the same cycle of manufacture. The manufacturing cycle can be discreet or continuous so long as the same product specification is used.

"component" means any ingredient intended for use in the manufacture of a pharmaceutical or biopharmaceutical, including those that may not appear in such drug or biologic product.

"drug product" means a finished dosage form, for example, tablet, capsule, solution, powder etc. that contains an active ingredient generally, but not necessarily, in association with inactive ingredients.

"active ingredient" means any component that is intended to furnish pharmacological activity or other direct effect in the diagnosis, cure, mitigation, treatment, or prevention of disease, or to affect the structure or any function of the body of man or other animals. The term includes those components that may undergo chemical change in the manufacture of the drug product and be present in the drug product in a modified form intended to furnish the specified activity or effect.

"inactive ingredient" (a.k.a. excipient) means a substance used as a carrier for the active ingredients of a drug or biologic. In addition, excipients can be used to aid the process by which a drug or biologic is manufactured. The active drug or biologic ingredient is then dissolved or mixed with an excipient. Excipients are also sometimes used to bulk up formulations with active drugs or biologics ingredients, to allow for convenient and accurate dosage. Examples of excipients, include but are not limited to, thickeners, binders, starches, gums, diluents, flavors, colors, emulsifiers, and preservatives.

"in-process material" means any material fabricated, compounded, blended, or derived by chemical reaction that is produced for, and used in, the preparation of a drug product.

"lot number, control number, or batch number" means any distinctive combination of letters, numbers, or symbols, or any combination thereof, from which the complete history of the manufacture, processing, packing, holding, and distribution of a batch or lot of a drug product or active ingredient or other material can be determined.

"quality control unit" means any person or organizational element designated by the firm to be responsible for the duties relating to quality control.

"acceptance criteria" means the product specifications and acceptance/rejection criteria, such as acceptable quality level and unacceptable quality level, with an associated sampling plan, that are necessary for making a decision to accept or reject a lot or batch.

"manufacturing execution system" ("MES") means an integrated hardware and software solution designed to measure and control activities in the production areas of pharmaceutical and biopharmaceutical manufacturing organizations to increase productivity and improve quality.

"crystallization" means the (natural or artificial) process by which a solid forms, where the atoms or molecules are highly organized into a structure known as a crystal. Some of the ways by which crystals form are precipitating from a solution, melting, or more rarely deposition directly from a gas.

"chromatography" means a technique for the separation of mixtures. The mixture is dissolved in a fluid called the mobile phase, which carries it through a structure holding another material called the stationary phase. The various constituents of the mixture travel at different speeds, causing them to separate. The separation is based on differential partitioning between the mobile and stationary phases. Subtle differences in a compound's partition coefficient result in differential retention on the stationary phase and thus affect the separation. Chromatography may be preparative or analytical. The purpose of preparative chromatography is to separate the components of a mixture for later use, and is thus a form of purification. Analytical chromatography is done normally with smaller amounts of material and is for establishing the presence or measuring the relative proportions of analytes in a mixture. The two are not mutually exclusive.

"pH" means a numeric scale used to specify the acidity or basicity of an aqueous solution.

"cell culture" means the process by which cells are grown under controlled conditions, generally outside of their natural environment.

"lyophilization" means a dehydration process typically used to preserve a perishable material or make the material more convenient for transport.

"cold chain" means a temperature-controlled supply chain. An unbroken cold chain is an uninterrupted series of refrigerated production, storage and distribution activities, along with associated equipment and logistics, which maintain a desired low-temperature range.

"serialization" means a comprehensive system to track and trace the passage of drugs through the entire supply chain. Examples of information used to achieve drug product serialization include but are not limited to, the name of the drug, its quantity, dosage form, and strength, lot number, batch number, and control number, expiration date, recall information, and detailed supply chain ownership information.

"e-pedigree" means an electronic document which satisfies the serialization requirement(s).

II.) Cloud Based Distributed Systems

One aspect of the present invention relates to improved distributed systems and enhanced distributed systems used in pharmaceutical or biopharmaceutical production. Specifically distributed systems utilizing cloud computing whereby end users have access to shared pools of configurable resources that can be provisioned over the Internet. In the context of the present disclosure, the distributed system(s) disclosed herein are utilized to control a pharmaceutical or biopharmaceutical manufacturing process. It will be appreciated by one of ordinary skill in the art that the networked systems will control a pharmaceutical or biopharmaceutical process by a centralized hub or by a fragmented cloud architecture depending on several factors, including but not limited to, (i) the geographic distance between manufacturing sites, (ii) the type of drug or biologic being produced, (iii) the quality control specification of the drug or biologic, (iv) the supply chain of the drug or biologic, (v) the amount of sensors used in the pharmaceutical or biopharmaceutical production process, and (vi) the network communication architecture used to communicate between end users in the pharmaceutical or biopharmaceutical production process.

As will be apparent to one of skill in the art that various types of network topography can be utilized in the present disclosure. In one embodiment, the network topography comprises point-to-point, bus, linear bus, star, extended star, distributed star, ring, mesh, hybrid, and daisy chain.

In one embodiment, the invention comprises a distributed system utilizing a partially connected network. One of skill in the art will appreciate that a partially connected network will allow for redundancy in case of failure.

In a preferred embodiment, the invention comprises a distributed system utilizing a fully connected network. One of ordinary skill will appreciate that the use of a fully connected network will reduce network latency.

Additionally, the distributed system of the present invention comprises the utilization of a wireless network, which include but are not limited to wireless PAN, wireless LAN, wireless WAN and other wireless networks known in the art, including cellular networks. In a preferred embodiment, the invention comprises a fully connected network topography utilizing a wireless network architecture.

In yet another aspect of the present invention, the distributed system comprises the use of remote servers to store, manage, execute, and process data in the wireless network architecture. Examples of this "cloud" server paradigm include AWS (Seattle, WA), Predix (Schenectady, NY), Azure (Redmond, WA), Softlogix (Milwaukee, WI), and 42Q (San Jose, CA).

In yet another aspect of the present invention, a distributed system comprises transmission of a data packet over a wireless network to control, execute, and monitor a pharmaceutical or biopharmaceutical manufacturing process. Generally speaking, a data packet of the invention will contain several aspects to ensure accurate and safe transmission. In addition, the data packet(s) may include a level of encryption to secure the data from unauthorized users. One of ordinary skill in the art will appreciate that several protocols for the transmission of data over the distributed system may be used, with the end goal being to optimize the transmission rate of the data packet. For example, depending on the desired distributed system, an Internet Suite Protocol (a.k.a. TCP/IP) may be used. In addition, other protocols such as a Hypertext Transfer Protocol ("HTTP"), Hypertext Transfer Protocol Secure ("HTTPS"), User Datagram Protocol ("UDP"), Simple, Network Management Protocol ("SNMP"), and MQ Telemetry Transport Protocol ("MQTT") may be used. One of ordinary skill in the art will appreciate that the transmission protocol used will be determined by a plurality of factors including but not limited to network latency, bandwidth, network topography, and the type of manufacturing process that is being used. An exemplary schematic of a distributed system of the disclosure is shown in FIG. 1. In addition, an exemplary schematic of an end user connectivity of the present invention is shown in FIG. 2.

As will be appreciated by one of ordinary skill in the art and which presents one advantage of the current disclosure, the distributed system will allow for a plurality of "cloud" based application servers and storage databases that can be connected either directly or remotely by a plurality of users and end users. In the context of this disclosure, an end user and user are used interchangeably and are specifically defined herein. In addition, one of ordinary skill in the art will appreciate that the advantages of the preferred embodiment of the disclosure will allow for reduced network latency, reduced computer hardware latency, and will allow for accurate and speedy transmission of data which will enable real-time monitoring and control of the pharmaceutical or biopharmaceutical processes of the disclosure. Additionally, one of ordinary skill in the art will appreciate and be enabled to make variations and modifications to the disclosed embodiment without altering the function and purpose of the invention disclosed herein. Such variations and modifications are intended within the scope of the present disclosure.

III. Programmable Logic Controller(s) (PLC) and Embedded System(s)

Another aspect of the present invention relates to improved PLCs and Embedded System(s). Specifically, the enhancement of software based PLCs ("Soft PLC") and embedded systems that will allow for optimized process automation system(s) ("PAS") and distributed control system(s) ("DCS") and whereby said PAS or DCS, as the case may be, can be executed in a "cloud" based application server and whereby the "cloud" based application server is interfaced with an MES of the invention to control a pharmaceutical or biopharmaceutical manufacturing process and whereby the data generated during said pharmaceutical or biopharmaceutical manufacturing processes is stored in a "cloud" based database and analyzed via several data analytics methods known in the art. The preferred embodiment of this disclosure attains IIoT capability.

Generally speaking and as defined herein, a Soft PLC is a subsystem of a DCS (or PAS) whereby a DCS is used for process automation and process control. It is well understood that a DCS is a further subset if an ICS. However, with the advent of advanced computing and network architecture, Soft PLCs are becoming more powerful and housing a variety of Soft PLC subsystems into a DCS is more ubiquitous than ever. Accordingly, it is an advantage of the present invention to provide an MES which connects directly to a plurality of Soft PLCs, which control and execute a pharmaceutical or biopharmaceutical manufacturing process. The advantage of the embodiment is that the traditional SCADA layer is not necessary since the Soft PLCs are executed via an MES in a "cloud" based application layer.

In one embodiment, the invention comprises a plurality of Soft PLCs interfaced with a pharmaceutical or biopharmaceutical manufacturing process/system hardware device or device(s) whereby the hardware device or device(s) is used to execute the actual production of a pharmaceutical or biopharmaceutical manufacturing process. In the context of the present disclosure, the hardware device or devices include but are not limited to powder blending systems, granulation systems, crystallization systems, tablet presses, chromatography systems, pH systems, liquid mixing systems, water-based systems, finishing and packaging systems, cell culture systems, filtration/purification systems, centrifugation systems, vial inactivation systems, field instrumentation components and operational units, blenders, bioreactors, capping machines, separation systems, chilled water/circulating systems, glycol systems, modular coldrooms, clean steam systems, clean-in-place (CIP) devices, compressed air systems, D.I./R.O. water systems, dry heat sterilizers, ovens, fermentation equipment, freezers, filling equipment, HVAC/environmental control systems, incubators, environmentally controlled chambers, labelers, lyophilizers, freeze dryers, dryers, mixing tanks, neutralization systems, plant steam and condensate systems, process tanks, pressure tanks, vessels, refrigerators, separation/purification equipment, specialty gas systems, steam generators, pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, carboys, etc.), single use bioreactors, and modular production devices. One of ordinary skill in the art will appreciate that several hardware device(s) or a single device may be used depending on the type of pharmaceutical or biopharmaceutical being produced.

One of ordinary skill in the art will understand that a number of Soft PLCs may be used. For example, Softlogix (Milwaukee, WI), SIMATIC (Munich, Germany), CX-One (Kyoto, Japan), etc. However, one of ordinary skill in the art will understand and appreciate that any Soft PLC will need to be modified according to the teachings of the present disclosure in order to execute, control, and monitor a pharmaceutical or biopharmaceutical process of the instant invention.

In one embodiment, the invention comprises an embedded system designed to perform one or a few dedicated functions, with real-time, near real-time, or live computing constraints. It is usually embedded as part of a complete device including hardware and mechanical parts. In a preferred embodiment, the embedded system of the invention comprises a Soft PLC and a microcontroller embedded in pharmaceutical or biopharmaceutical manufacturing hardware device or device(s) or systems and mechanical parts, including operational units and field instrumentation components.

In one embodiment, a Soft PLC is modified and interfaced with a microcontroller embedded in a hardware device or device(s), as the case may be, in order to execute, monitor, and control a pharmaceutical or biopharmaceutical manufacturing process. In one embodiment, the communication protocol between the hardware device or device(s) may be a Modbus or Fieldbus or OPC. However, in another embodiment, the communication protocol will transmit over a wireless network using a MQTT protocol. In a preferred embodiment, the communication protocol may be a modification and combination of a plurality of several protocols. One of ordinary skill will understand that specific protocols may be necessary in order to optimize network latency and network topography.

In another embodiment, one of ordinary skill in the art will utilize a closed loop system whereby said feedback is transmitted to an MES of the instant disclosure. In addition, one of ordinary skill in the art will appreciate that either a half duplex or full duplex communication mode will be necessary depending on the type of manufacturing process being controlled. In another embodiment, the Soft PLC comprises a battery backup.

As will be appreciated by one of ordinary skill in the art and which presents one advantage of the current disclosure, the Soft PLCs interfaced with a hardware device or device(s) of the present invention will allow for a plurality hardware device(s) to be connected and controlled in a synergistic manner. One of ordinary skill in the art will understand that data generated by a device or device(s) during pharmaceutical or biopharmaceutical manufacture can be stored on one or several "cloud" based databases depending on the geographical location of a specific process and the user access protocol put in place by the quality control unit. In addition, one of ordinary skill in the art will appreciate that the advantages of the preferred embodiment of the disclosure will allow for reduced network latency and will allow for accurate and speedy transmission of data which will enable real-time monitoring and control of the pharmaceutical or biopharmaceutical processes in a "cloud" based architecture. Additionally, one of ordinary skill in the art will appreciate and be enabled to make variations and modifications to the disclosed embodiment without altering the function and purpose of the invention disclosed herein. Such variations and modifications are intended within the scope of the present disclosure.

IV.) Algorithms, Software Program, and Computer Product(s)

The invention provides for a software program that is programmed using a multitude of programming techniques. One of ordinary skill in the art will appreciate that the complexity of the instant invention in multiple system environments will require a multitude of programming paradigms. For example, one of ordinary skill will understand that a combination of modular programming, dynamic programming, synchronous programming, and aspect-oriented programming is preferred.

One of ordinary skill in the art will understand that the program language utilized in each of the aforementioned programming paradigm can be a high-level or low-level programming language, preferably a multi-paradigm programming language that will allow the artisan to use the best program for the function being programmed. Examples of program languages in a modular programming paradigm include, but are not limited to, Languages that formally support the module concept include Ada, Algol, BlitzMax, C#, Clojure, COBOL, D, Dart, eC, Erlang, Elixir, F, F #, Fortran, Go, Haskell, IBM/3 60 Assembler, IBM i Control Language (CL), IBM PG, Java, MATLAB, ML, Modula, Modula-2, Modula-3, orpho, NEWP, Oberon, Oberon-2, Objective-C, OCaml, Pascal, Perl, PL/I, PureBasic, Python, Ruby, Rust, JavaScript, Visual Basic .NET and WebDNA.

Furthermore, examples of programming languages used in a dynamic programming paradigm include, but are not limited to JavaScript, Python, Ruby, PHP, Lua, and Perl.

Furthermore, examples of programming languages used in a synchronous programming paradigm include, but are not limited to Argus, Averest, Esterel, Lustre, SyncCharts, Atom, and SIGNAL.

Furthermore, examples of programming languages used in an aspect-oriented programming paradigm (a.k.a. reflective language) include, but are not limited to C#, Cobra, ECMAScript, Java, Lisp, Perl, Python, Prolog, XL, etc.

Finally, examples of programming languages used in a multiparadigm language programming paradigm include, but are not limited to Ada, Beta, C++, C#/.Net, Cobra, Common Lisp, Curl, Delphi, Mercury, Pike, and Python.

One of ordinary skill in the art will understand that a programming language that can be used in a Soft PLC of the invention is used to execute a pharmaceutical or biopharmaceutical manufacturing process in real-time, near real-time, or live signal processing will be preferred. However, one of ordinary skill in the art will understand that network latency is unavoidable. Accordingly, in one embodiment, the invention comprises network latency or two (2) to twenty-five (25) milliseconds. In a preferred embodiment, the invention comprises a network latency of between six (6) to twenty (20) milliseconds.

In addition, one of ordinary skill will appreciate that one aspect of the present invention will allow for a software program of the present invention to be bootstrapped or interfaced with an already existing program or a database.

In addition, the invention provides for a fifth-generation programming language ("5GL") based around solving problems using constraints given to the program, rather than using an algorithm written by a computer programmer. Essentially, a 5GL of the present invention is designed to make the computer solve the problem (i.e. higher quality more efficient pharmaceutical or biopharmaceutical production). This way, a programmer only needs to worry about what problems need to be solved and what conditions need to be met, without worrying about how to implement a routine or algorithm to solve them. In one embodiment, a 5GL of the present invention uses Prolog, OPS5, STRIPS, POP-11, C++, Perl, or Mercury programming language.

It will be readily apparent to one of skill in the art that the preferred embodiment will be a software program that can be easily modified to conform to numerous software-engineering environments. One of ordinary skill in the art will understand and will be enabled to utilize the advantages of the invention by designing the system with a combination of modular, dynamic, and synchronous design. The level of abstraction necessary to achieve the desired result will be a direct function of the level of complexity of the pharmaceutical or biopharmaceutical process that is being monitored.

The invention further comprises computer software which comprises three (3) layers. It will be appreciated by one of ordinary skill in the art that the three (3) layers may overlap and may or may not be distinct layers. The invention comprises a system software layer, which helps run the computer system. The system software layer of the invention comprises, operating systems, device drivers, diagnostic tools, servers, windowing systems, and other utilities. The purpose of systems software is to insulate the applications programmer as much as possible from the details of the particular computer complex being used, especially memory and other hardware features, and such as accessory devices as communications, printers, readers, displays, keyboards, etc.

The invention comprises computer software containing a programming software layer, which provides tools to assist a programmer to use programming languages in a more convenient way. These tools include but are not limited to, text editors, compilers, interpreters, linkers, debuggers, and so forth. An Integrated development environment (IDE) merges those tools into a software bundle, and a programmer may not need to type, multiple commands for compiling, interpreting, debugging, tracing, and etc., especially if the IDE has an advanced graphical user interface.

The invention comprises computer software containing an application software layer which allows end users to accomplish one or more specific (non-computer related) tasks.

One of ordinary skill will appreciate that to maximize results the ability to amend the algorithm needed to conform to the execution, control, validation and quality control standards set forth by the quality control unit on each step during pharmaceutical or biopharmaceutical production will be preferred. This differential approach to programming will provide the greatest level of data analysis leading to the highest standard of data integrity. Furthermore, the invention comprises the use of a modified "greedy" algorithm paradigm to make the locally optimal choice. In addition, one embodiment of the present invention comprises the use of a Proportional, Integral, Derivative ("PID") control algorithm.

In addition, one of ordinary skill in the art will appreciate that optimization of the current system will be preferred. This is because, given the complexity of the data being generated for the control, execution, and monitoring of pharmaceutical or biopharmaceutical production many subroutines are necessary for the execution of the invention. Accordingly, the invention comprises a computer program utilizing a modified dynamic and greedy algorithm paradigm, further comprising a plurality of subroutines and whereby said subroutines utilize a plurality of thunks. One of ordinary skill in the art will appreciate that the number of thunks is related to the number of subroutines used during the pharmaceutical or biopharmaceutical production. This, of course, will depend on the specific process which is being controlled.

Additionally, as previously disclosed, in order to reduce network latency and allow for more efficient transmission into a "cloud" based distributed system, optimization techniques are within the scope of the present invention. Specifically, one of ordinary skill in the art will appreciate that a memorization technique is preferred. One of ordinary skill in the art will appreciate that utilizing a modified dynamic programming technique along with a thunk and memorization optimization will allow for operating with less memory storage which will allow for more efficient transmission in a "cloud" based distributed system of the invention.

The preferred embodiments of the disclosure may be implemented as a method, system, or program using standard software programming and/or engineering techniques to produce software, firmware, hardware, or any combination thereof. The term "computer product" as used herein is intended to encompass one or more computer programs and data files accessible from one or more computer-readable devices, firmware, programmable logic, memory devices (e.g. EEPROM's, ROM's, PROM's, RAM's, SRAM's, etc.) hardware, electronic devices, a readable storage diskette, CD-ROM, a file server providing access to programs via a network transmission line, wireless transmission media, signals propagating through space, radio waves, infrared signals, etc.

The invention further provides articles (e.g., computer products) comprising a machine-readable medium including machine-executable instructions, computer systems and computer implemented methods to practice the methods of the invention. Accordingly, the invention provides computers, computer systems, computer readable mediums, computer programs products, microcontrollers and the like having recorded or stored thereon machine-executable instructions to practice the methods of the invention. As used herein, the words "recorded" and "stored" refer to a process for storing information on a computer medium. A skilled artisan can readily adopt any known methods for recording information on a computer to practice the methods of the invention.

In addition, the invention comprises a non-transitory computer readable medium storing a program causing a computer to execute a pharmaceutical or biopharmaceutical manufacturing process, whereby the pharmaceutical or biopharmaceutical manufacturing process, as the case may be, comprises: initiating the activation of a Soft PLC, whereby the Soft PLC comprises an embedded system, wherein said embedded system is integrated into a pharmaceutical or biopharmaceutical manufacturing hardware device or device(s); compiling real-time data during said pharmaceutical or biopharmaceutical product; transmitting said data to a "cloud" based system whereby control of said pharmaceutical or biopharmaceutical manufacturing process is achieved.

The invention further comprises an apparatus comprising a non-transitory computer readable medium storing a program causing a computer to execute a pharmaceutical or biopharmaceutical manufacturing process The invention further comprises a method of controlling pharmaceutical or biopharmaceutical production comprising a non-transitory computer readable medium storing a program causing a computer to execute a pharmaceutical or biopharmaceutical manufacturing process.

The computer processor used to practice the methods of the invention can be a conventional general-purpose digital computer, e.g., a personal workstation computer, including conventional elements such as microprocessor and data transfer bus, laptop, or other portable device (e.g. a smart phone) in addition to microcontrollers as used in embedded systems.

Preferably, the program will be initiated in parallel with the pharmaceutical or biopharmaceutical manufacturing process or quality control specification. This will allow the ability to control, execute, and monitor the pharmaceutical or biopharmaceutical manufacturing and quality control specification from its inception. However, in some instances the program can be bootstrapped into an already existing program that will allow control, execution, and monitoring from the time of execution (i.e. bootstrapped to configurable off-the-shelf software).

For example, the critical control point for controlling and monitoring an active pharmaceutical or biopharmaceutical ingredient versus an inactive ingredient, component, or in-process material may not be equivalent. Similarly, the critical control point for controlling and monitoring an in-process material may vary from component to component and often from batch to batch.

In one embodiment, the invention provides for methods of interfacing a software program with a pharmaceutical or biopharmaceutical manufacturing system whereby the software program is integrated into the pharmaceutical or biopharmaceutical manufacturing process and control of the pharmaceutical or biopharmaceutical manufacturing process is attained. The integration can be used for routine monitoring, quality control, maintenance, hazard mitigation, validation, etc.

The invention further comprises implementing and executing the software program in a Soft PLC integrated to multiple devices used in pharmaceutical or biopharmaceutical manufacture to create a "cloud" based DCS comprising a manufacturing execution system (MES) used to monitor and control the entire pharmaceutical or biopharmaceutical manufacturing process.

The invention further comprises interfacing and implementing the manufacturing execution system into multiple pharmaceutical and biopharmaceutical product lines whereby simultaneous pharmaceutical and biopharmaceutical production lines are controlled and monitored using the same system.

The invention further comprises implementation of the manufacturing execution system and software program described herein into the subset of the pharmaceutical or biopharmaceutical manufacturing process whereby the data compiled by the powder blending, granulation, crystallization, tablet press, chromatography, pH, liquid mixing, water-based system(s), finishing and packaging, cell culture, cell banking, bioreactor(s), filtration and purification, centrifugation, viral inactivation, field instrumentation components, and operational unit(s) subset processes are controlled and tracked continuously overtime and said data is used to analyze a subset processes and whereby said data is integrated and used to analyze the quality control process of the pharmaceutical or biopharmaceutical process at-large.

It will also be appreciated by those skilled in the art that the various steps herein for pharmaceutical or biopharmaceutical production are not required to be all performed or exist in the same production series. Thus, while in some embodiments, all steps and/or software programs and/or manufacturing execution systems described or mentioned herein are performed or exist, in other embodiments, one or more steps are optional (e.g., omitted, changed (in scope, order, placement, etc.) or the like. Accordingly, those of skill in the art will recognize that many modifications may be made without departing from the scope of the present invention.

V.) Data and Process Analytics

The invention provides for a method of analyzing data that is compiled as a result of the manufacturing pharmaceuticals or biopharmaceuticals. Further, the invention provides for the analysis of data that is compiled as a result of a QA program used to monitor the manufacture of a pharmaceutical or biopharmaceutical in order to maintain the highest level of data integrity. In another embodiment, the invention comprises the analysis of a quality control specification used to manufacture a pharmaceutical or biopharmaceutical. In one embodiment, the parameters of the data will be defined by the quality control unit. Generally, the quality control unit will provide endpoints (generally predetermined) that need to be achieved to conform to cGMP regulations and pass a product specification or in some instances an internal endpoint that is more restrictive to the minimum levels that need to be achieved.

In a preferred embodiment, the invention provides for data analysis using boundary value analysis. The boundary value will be set forth by the quality control unit. Using the boundary values set forth for a particular phase or process of pharmaceutical or biopharmaceutical manufacture the algorithm is defined. Once the algorithm is defined, an algorithm analysis (i.e. logic analysis) takes place. One of skill in the art will appreciate that a wide variety of tools are used to confirm algorithm analysis such as an accuracy study processor.

One of ordinary skill will appreciate that different types of data will require different types of analysis. In a further embodiment, the program provides a method of analyzing block data via a block check. If the block check renders an affirmative analysis, the benchmark has been met and the analysis continues to the next component. If the block check renders a negative, the data is flagged via standard recognition files known in the art and a hazard analysis and hazard mitigation occurs.

In a further embodiment, the invention provides for data analysis using branch analysis. The test cases will be set forth by the quality control unit.

In a further embodiment, the invention provides for data analysis using control flow analysis. The control flow analysis will calibrate the design level set forth by the quality control unit, which is generated in the design phase.

In a further embodiment, the invention provides for data analysis using failure analysis. The failure analysis is initiated using the failure benchmark set forth by the quality control unit and then using standard techniques to come to error detection. The preferred technique will be top-down. For example, error guessing based on quality control group parameters, which are confirmed by error seeding.

In a further embodiment, the invention provides for data analysis using path analysis. The path analysis will be initiated after the design phase and will be used to confirm the design level. On of ordinary skill in the art will appreciate that the path analysis will be a dynamic analysis depending on the complexity of the program modification. For example, the path analysis on the output of a drug product will be inherently more complex that the path analysis for the validation of an in-process material. However, one of ordinary skill will understand that the analysis is the same, but the parameters set forth by the quality control unit will differ.

In a further embodiment, the invention provides for data analysis using failure modes and effects analysis. The analysis of actual or potential failure modes within a pharmaceutical or biopharmaceutical manufacturing system on a component-by-component and process-by-process level is analyzed for classification or determination of a failure upon the pharmaceutical or biopharmaceutical manufacturing system. Failures which cause any error or defects in a pharmaceutical or biopharmaceutical process, design, manufacture, or product are analyzed and corrective action is taken during pharmaceutical or biopharmaceutical manufacture. The corrective action of the invention comprises modifying or stopping pharmaceutical or biopharmaceutical manufacture to obviate a failure.

In a further embodiment, the invention provides for data analysis using root cause analysis. The analysis occurs by identifying a root cause of a failure or hazard with the intention of eliminating the root cause thereby reducing its frequency on future pharmaceutical or biopharmaceutical batches.

In a further embodiment, the invention provides for data analysis using hazard analysis and critical control points. The analysis occurs in a systematic preventive approach to pharmaceutical or biopharmaceutical manufacturing that addresses physical, chemical, and biological hazards of a drug or biologic as a means of prevention rather than finished drug product inspection. The analysis is used in pharmaceutical or biopharmaceutical manufacture to identify hazards, so that key actions and locations within a pharmaceutical or biopharmaceutical manufacturing process, known as critical control points can be taken to reduce or eliminate the risk of the hazards being realized. The analysis is used at all stages of pharmaceutical or biopharmaceutical production including powder blending processes, granulation processes, crystallization processes, tablet pressing, chromatography processing, pH measurement, liquid mixing processes, water-based processes, finishing and packaging processes, cell culture processes, filtration/purification processes, centrifugation processes, viral inactivation processes, field instrumentation component(s) operation and assessment and operational unit(s) operation and assessment(s). Failures which cause any error or defects in a pharmaceutical or biopharmaceutical-process, design, manufacture, or product are analyzed and corrective action is taken during pharmaceutical or biopharmaceutical manufacture. The corrective action of the invention comprises initiating, modifying, halting, temporarily halting, or stopping pharmaceutical or biopharmaceutical manufacture to obviate a failure.

In a further embodiment, the invention provides for data analysis using hazard analysis and risk-based preventative controls. The analysis occurs in a systematic preventive approach to pharmaceutical or biopharmaceutical manufacturing that addresses physical, chemical, and biological hazards of a drug or biologic as a means of preventative detection rather than after they occur. The analysis is used in pharmaceutical or biopharmaceutical manufacture to identify hazards. The analysis is used at all stages of pharmaceutical or biopharmaceutical production including powder blending processes, granulation processes, crystallization processes, tablet pressing, chromatography processing, pH measurement, liquid mixing processes, water-based processes, finishing and packaging processes, cell culture processes, filtration/purification processes, centrifugation processes, viral inactivation processes, field instrumentation component(s) operation and assessment and operational unit(s) operation and assessment(s). Failures which cause any error or defects in a pharmaceutical or biopharmaceutical process, design, manufacture, or product are analyzed and corrective action is taken during pharmaceutical or biopharmaceutical manufacture. The corrective action of the invention comprises initiating, modifying, halting, temporarily halting, or stopping pharmaceutical or biopharmaceutical manufacture to obviate a failure.

The invention provides for a top-down design to software analysis. This preferred embodiment is advantageous because the parameters of analysis will be fixed for any given process and will be set forth by the quality control unit. Thus, performing software safety code analysis then software safety design analysis, then software safety requirements analysis, and then software safety test analysis will be preferred.

Another aspect of the invention relates to taking the data compiled during pharmaceutical or biopharmaceutical manufacture and using the analyzed data to create a historic record of the pharmaceutical or biopharmaceutical manufacture. The historic record is them transmitted via wireless distributed system of the invention and stored in one or a plurality of "cloud" based databases. One of ordinary skill in the art will appreciate that the historic data is used by a plurality of quality control units or business units in a continuous analytics process. One ordinary skill in the art will appreciate that a continuous analytics process is preferred since it will enable real-time interactions and immediate insights into the historic record for different purposes. In one embodiment, the continuous analytics are used in an Enterprise Resource Planning ("ERP") system or in a preferred embodiment; continuous analytics are used in an MES, which possesses attributes of an ERP system.

In another aspect of the present invention, predictive analytics are disclosed herein. One of ordinary skill in the art will appreciate that utilizing the historic record of the pharmaceutical or biopharmaceutical manufacturing processes will allow for more efficient manufacturing in subsequent production runs through the use of predictive analytics modeling on each pharmaceutical or biopharmaceutical sub-process as well as the entire pharmaceutical or biopharmaceutical manufacturing system at-large. In one aspect of the invention, usage of predictive analytics occurs on a specific pharmaceutical or biopharmaceutical manufacturing sub-process including but not limited to powder blending processes, granulation processes, crystallization processes, tablet pressing, chromatography processing, pH measurement, liquid mixing processes, water-based processes, finishing and packaging processes, cell culture processes, filtration/purification processes, centrifugation processes, viral inactivation processes, field instrumentation component(s) operation and assessment and operational unit(s) operation and assessment(s).

In another aspect of the present invention, predictive analytics is used in a pharmaceutical or biopharmaceutical process or system on a device-by-device basis. The device(s) include but are not limited to powder blending systems, granulation systems, crystallization systems, tablet presses, chromatography systems, pH systems, liquid mixing systems, water-based systems, finishing and packaging systems, cell culture systems, filtration/purification systems, centrifugation systems, vial inactivation systems, field instrumentation components and operational units, blenders, bioreactors, capping machines, separation systems, chilled water/circulating systems, glycol systems, modular coldrooms, clean steam systems, clean-in-place (CIP) devices, compressed air systems, D.I./R.O. water systems, dry heat sterilizers, ovens, fermentation equipment, freezers, filling equipment, HVAC/environmental control systems, incubators, environmentally controlled chambers, labelers, lyophilizers, freeze dryers, dryers, mixing tanks, neutralization systems, plant steam and condensate systems, process tanks, pressure tanks, vessels, refrigerators, separation/purification equipment, specialty gas systems, steam generators, pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, carboys, etc.), single use bioreactors, and modular production devices.

In one aspect of the present invention, the predictive and continuous analytics are programmed using the following programming languages, R, Python, SAS, Spark, Apache Storm, and SQL.

The invention comprises storage of the historic data into one or a plurality of "cloud" based databases. One of ordinary skill in the art will appreciate that certain type of data can be stored in distinct databases and accessed by specific authorized users for specific reasons. An artisan will understand that the location of the historic record will be based on the geographic location of the end user and will also depend on the specific use of the historic record. By way of non-limiting example, financial data relating to Cost of Goods sold for a particular batch of pharmaceutical or biopharmaceutical may be housed in near proximity with the financial/accounting function of the business whereas a historic record of the quality control specification data and the production variables may be housed in close proximity to the actual end users overseeing production at the manufacturing facility. One of ordinary skill will understand that by separating the historic data will provide for greater data integrity since only those end users will a relevant need for the data will be able to access the data. In addition, more efficient transmission of data will occur over the wireless distributed system of the invention since the data can be partitioned and segregated.

The aforementioned analysis and analytics methods are used for several non-limiting embodiments, including but not limited to, control and execution of pharmaceutical manufacturing, biopharmaceutical manufacturing, validating QA software, validating pharmaceutical or biopharmaceutical manufacturing processes and systems, and validating process designs wherein the integration of the system design and/or design space will allow for more efficient determination of acceptance criteria in a batch, in-process material, component, batch number, control number, and lot number and allow for increased access time thus achieving a more efficient cost-saving pharmaceutical or biopharmaceutical manufacturing process.

VI. Manufacturing Execution System(s)

In one embodiment, the software program or computer product, as the case may be, is integrated into a manufacturing execution system that controls a pharmaceutical or biopharmaceutical manufacturing process. The tools of the manufacturing execution system of the invention focus on less variance, higher volumes, tighter control, and traceable supply chain logistics of drug or biologic manufacturing. One of ordinary skill in the art will understand that a MES of the invention possesses attributes to increase traceability, productivity, and quality of a drug product or biologic product.

By utilizing a "cloud" based distributed system, a DCS, and a Soft PLC of the invention, one of ordinary skill in the art will appreciate that a new process control paradigm is contemplated by this disclosure. The process control paradigm eliminates several layers and allows for a more efficient production process and also allows for a plurality of end users to be involved and analyze the data compiled by a pharmaceutical or biopharmaceutical manufacturing system thereby allowing pharmaceutical manufacturing organizations make more intelligent manufacturing decisions.

By way of brief background, the Purdue Enterprise Reference Architecture (PERA) is a 1990s reference model for enterprise architecture developed by Dr. Theodore J. Williams and other members of the Industry-Purdue University Consortium for Computer Integrated Manufacturing. Generally speaking, the Purdue Reference Model, "95" provides a model for enterprise control, which end users, integrators, and vendors can share in integrating applications at key layers in the enterprise. The standard 5 level (Levels 0-4) structure was modified by the Manufacturing Enterprise Solutions Association ("MESA"). MESA introduced some structure into an MES by defining eleven (11) functions that set the scope of MES. In 2000, the ANSI/ISA-95 standard merged the MESA model with the Purdue Reference Model ("PRM"). From 2005-2013, additional or revised parts of the ANSI/ISA-95 standard defined the architecture of an MES into more detail, covering how to internally distribute functionality and what information to exchange internally as well as externally. Currently, the ANSI/ISA-95 is the global international standard for developing an automated interface between enterprise and control systems. For a graphical representation of the PERA reference model and the ANSI/ISA-95 standard, see FIG. 3.

From the aforementioned background, it will be apparent to the artisan that the architecture in FIG. 3 has substantial limitations and shortcomings. For the sake of an example, the standard ISA-95 standard cannot handle all types of data. This is an important aspect of the present invention, see the Section entitled "Cloud Based Distributed Systems" and "Programmable Logic Controller(s) (PLC) and Embedded System(s)" whereby the transmission of data from a DCS into a "cloud" based distributed system and the bi-directional transmission of data from a MWSN, DCS, and Soft PLC to a pharmaceutical or biopharmaceutical manufacturing process/system is critical. Second, the current standard has limited analysis/analytics tools and thereby does not allow for the most efficient use of historic data. In effect, it treats each manufacturing run as a newly distinct event (run) and does not account for the teachings of previous manufacturing events (runs) to be utilized. Third, it is generally manufacture site centric and ignores the reminder of the supply chain (both internal and external).

One aspect of the present invention comprises a single layer MES which is interfaced with a pharmaceutical or biopharmaceutical hardware device or devices via a Soft PLC architecture as previously disclosed. In addition, the MES comprises and is interfaced with a plurality of "cloud" based application and storage databases whereby a suite of analysis and analytics tools are used to monitor, control, and analyze a pharmaceutical or biopharmaceutical manufacturing process or sub-process to a plurality of end users. In addition, the MES comprises and is interfaced with a MWSN which is active for a pharmaceutical or biopharmaceutical manufacturing environment. It should be appreciated that the end users can be at the manufacturing location or located in another geographical location and connected via user device via the World Wide Web.

In one embodiment, the MES architecture paradigm comprises a single layer as shown in FIG. 4. The artisan will appreciate several advantages of a MES of the invention. First, by utilizing a single layer, the MES of the invention is highly customizable and will allow for interoperability with a plurality of third party systems and/or the MES can be easily bootstrapped to an existing system. Second, by utilizing a single layer the ERP and SCADA layers are eliminated, thereby reducing costs and reducing integration problems from serving multiple vendors. For example, there is no need to harmonize an ERP system since an MES of the present invention performs all of the traditional ERP functions (and many more including analytics). In addition, by eliminating the SCADA layer, there is an elimination of the typical one (1) to one (1) mapping layer which allows for a disparate mix of sensors, microcontrollers, Soft PLCs, and embedded systems to be used in a synergistic manner. One present advantage is that a MES of the invention allows for more seamless integration from the component (hardware device(s)) and give real-time, near real-time, or live control, execution, and monitoring capability. In addition, by creating a single layer MES of the invention, the overall system is more secure and possesses fewer gaps for cyber threat vectors to exploit.

In one embodiment, a MES of the invention interfaces with a hardware device or device(s) used in a pharmaceutical or biopharmaceutical manufacturing process including but not limited to powder blending systems, granulation systems, crystallization systems, tablet presses, chromatography systems, pH systems, liquid mixing systems, water-based systems, finishing and packaging systems, cell culture systems, filtration/purification systems, centrifugation systems, vial inactivation systems, field instrumentation components and operational units, blenders, bioreactors, capping machines, separation systems, chilled water/circulating systems, glycol systems, modular coldrooms, clean steam systems, clean-in-place (CIP) devices, compressed air systems, D.I./R.O. water systems, dry heat sterilizers, ovens, fermentation equipment, freezers, filling equipment, HVAC/environmental control systems, incubators, environmentally controlled chambers, labelers, lyophilizers, freeze dryers, dryers, mixing tanks, neutralization systems, plant steam and condensate systems, process tanks, pressure tanks, vessels, refrigerators, separation/purification equipment, specialty gas systems, steam generators, pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, carboys, etc.), single use bioreactors, and modular production devices.

In another embodiment, a MES of the invention interfaces with a pharmaceutical or biopharmaceutical software system including but not limited to user-independent audit trails, time-stamped audit trails, data security systems, confidentiality systems, limited authorized system access, electronic signatures, bar codes scanners/readers, dedicated systems, add-on systems, control files, "cloud" based application servers, "cloud" based storage servers, WAN's, LAN's, Graphical User Interface ("GUI"), downloadable smart device applications (Apps), product serialization systems (i.e. track and trace systems), and e-pedigree systems, etc.

One of ordinary skill in the art will understand that the aforementioned attributes are achieved by controlling, executing, and monitoring such pharmaceutical or biopharmaceutical manufacturing functions including, for example, equipment tracking, product genealogy, labor and item tracking, costing, electronic signature capture, defect and resolution monitoring, executive dashboards, and other various reporting functions. One of skill in the art will appreciate that many functions traditionally performed by an ERP will be included.

It will be understood by one of skill in the art that the software programs or computer products integrates the hardware via generally understood devices in the art (i.e. Soft PLCs, or attached to the analog device via an analog to digital converter).

The software program or computer product is integrated into the manufacturing execution system on a device-by-device basis. As previously set forth, the acceptance criteria of all devices used in pharmaceutical or biopharmaceutical manufacture for the purposes of the manufacturing execution system are determined by the quality control unit. The analysis and analytics of the pharmaceutical or biopharmaceutical manufacturing occurs using any of the methods disclosed herein. (See, section V entitled "Data and Process Analytics"). The program executes, controls, and monitors and processes the data and stores the data in a using methods disclosed herein (See, section II entitled "Cloud Based Distributed Systems"). The data is provided to an end user or a plurality of end users for assessing the quality of data generated by the device or devices. Furthermore, the data is stored for comparative analysis to previous batches to provide a risk-based assessment in case of failure. Accordingly, in one embodiment of the invention, the comparative analysis comprises the use of continuous analytics to enable real-time, near real-time, or live assessment of the data generated by a pharmaceutical or biopharmaceutical manufacturing process. In another embodiment, the invention comprises a comparative analysis comprising predictive analytics to enable predicting future results from pharmaceutical or biopharmaceutical manufacturing processes. Using the historical analysis will provide a more streamlined pharmaceutical or biopharmaceutical manufacturing process and will monitor to ensure that product quality is maximized and hardware or software device(s) are optimized. Utilizing the historical record will provide pharmaceutical or biopharmaceutical manufacturers an "Intelligent" perspective to manufacturing. Over time, the manufacturing execution system will teach itself and modify the pharmaceutical or biopharmaceutical manufacturing process in a way to obviate previous failures while at the same time continuously monitoring for new or potential failures. In addition, the invention comprises monitoring the data from initial pharmaceutical process, monitoring the data at the end of the pharmaceutical process, and monitoring the data from a routine maintenance schedule to ensure the system maintain data integrity and validation standards predetermined by the quality control unit.

Yet another aspect of the invention provides for the control and execution of a pharmaceutical or biopharmaceutical manufacturing process from a MES of the invention whereby the MES controls and executes a start/stop paradigm and a corrective action paradigm. In one embodiment, an end-user with access to the "cloud" based DCS of the invention will access the "cloud" based application server and control the pharmaceutical or biopharmaceutical manufacturing process from the MES. Examples of a start/stop paradigm of the invention include, Test, Go, Stop, Delay, Relay, etc. One of ordinary skill will understand that the start/stop paradigm can occur in a open or closed loop control. Examples, of a corrective action paradigm of the invention include, modifying, modifying by adding, modifying by deleting, and modifying by prevention.

An artisan will appreciate that a MES of the invention will improve efficiency, accuracy, and economic benefit of a pharmaceutical or biopharmaceutical manufacturing process. In addition, a pharmaceutical or biopharmaceutical manufacturer will produce consistency higher quality drug or biologics, which will benefit the public health community at-large. Accordingly, in one embodiment, a MES of the current disclosure attains IIoT capability.

VII. Sensor(s)

In one embodiment, a MES of the present disclosure interfaces via a Soft PLC and/or a sensor note (a.k.a. a mote) to a sensor used to produce a measurable response to a change in physical condition in a pharmaceutical or biopharmaceutical manufacturing system, device or devices. One of ordinary skill understands that generally sensory are classified into three categories: (i) passive omni-directional sensors; (ii) passive narrow-beam sensors; and (iii) active sensors. Passive sensors sense the data without actually manipulating the environment by active probing. They are self powered; that is, energy is needed only to amplify their analog signal. Whereas, active sensors actively probe the environment, for example, a sonar or radar sensor, and they require continuous energy from a power source. Narrow-beam sensors have a well-defined, notion of direction of measurement, similar to a camera. Omni-directional sensors have no notion of direction involved in their measurements. In one embodiment, the sensor(s) of the present invention can be passive or active. In a preferred embodiment, the sensor(s) of the invention are active to a pharmaceutical or biopharmaceutical manufacturing environment.

It will be appreciated by one of skill in the art that the type of sensor needed will be a direct function to the pharmaceutical or biopharmaceutical manufacturing process being controlled, executed, and/or monitored. For example, monitoring the potency of a vaccine will require different monitoring parameters that monitoring the pH of an antibiotic, which in turn will require, different monitoring parameters that monitoring the temperature of a biologic product. In these situations, it will be appreciated by one of ordinary skill that either (i) the same sensors can be used with different detecting criteria or (ii) different types of sensors can be used to achieve the best level of monitoring for a specific pharmaceutical or biopharmaceutical manufacturing process.

Accordingly, sensors of the present invention comprise thermal, electromagnetic, mechanical, chemical, optical, radiation, acoustic, and biological sensors. In one embodiment, thermal sensors include but are not limited to thermometers, thermocouples, temperature sensitive resistors, bolometers, and calorimeter.

In a further embodiment, electromagnetic sensors include but are not limited to ohmmeters, multimeters, galvanometers, ammeters, leaf electroscopes, watt-hour meters, magnetic compasses, fluxgate compasses, magnetometers, and metal detectors.

In a further embodiment, mechanical sensors include but are not limited to barometers, barographs, pressure gauges, air speed indicators, rate of change sensors, flow sensors, anemometers, flow meters, gas meters, water meters, mass flow sensors, acceleration sensors, whisker sensors, Quadrature wheels, and positions switches.

In a further embodiment, chemical sensors include but are not limited to oxygen sensors (a.k.a. λ sensors), ion-selective electrodes, pH glass electrodes, and redox electrodes.

In a further embodiment, optical and radiation sensors include but are not limited to RADAR, LIDAR, dosimeters, particle detectors, scintillators, wire chambers, cloud chambers, bubble chambers, infrared sensors, photocells, photodiodes, phototransistors, image sensors; vacuum tube devices, and proximity sensors.

In a further embodiment, acoustic sensors include but are not limited to ultrasounds and SONAR.

In a further embodiment, biological sensors include but are not limited to biosensors that can detect physical aspects of the external environment such as light, motion, temperature, magnetic fields, gravity, humidity, vibration, pressure, electrical fields, and sound. Additionally, biosensors that can detect environmental molecules such as toxins, nutrients, and pheromones are within the scope of the invention. Additionally, biosensors that can detect metabolic parameters such as glucose level and oxygen level are within the scope of the invention.

In a preferred embodiment, a mobile wireless sensor network ("MWSN") is interfaced to an MES of the invention. In this preferred embodiment, a MWSN is integrated with a pharmaceutical or biopharmaceutical hardware device or devices and placed to monitor a critical control point within a pharmaceutical or biopharmaceutical process. The data compiled from the sensor readings are transmitted to the MES and "cloud" based application servers and "cloud" based storage databases in real-time, near real-time, or live for analysis and analytics on the pharmaceutical or biopharmaceutical manufacturing process (See, section entitled "Data and Process Analytics"). In one embodiment of the present invention, a MWSN is integrated with a pharmaceutical hardware device or device(s) including but not limited to: powder blending systems, granulation systems, crystallization systems, tablet presses, chromatography systems, pH systems, liquid mixing systems, water-based systems, finishing and packaging systems, cell culture systems, filtration/purification systems, centrifugation systems, vial inactivation systems, field instrumentation components and operational units, blenders, bioreactors, capping machines, separation systems, chilled water/circulating systems, glycol systems, modular coldrooms, clean steam systems, clean-in-place (CIP) devices, compressed air systems, D.I./R.O. water systems, dry heat sterilizers, ovens, fermentation equipment, freezers, filling equipment, HVAC/environmental control systems, incubators, environmentally controlled chambers, labelers, lyophilizers, freeze dryers, dryers, mixing tanks, neutralization systems, plant steam and condensate systems, process tanks, pressure tanks, vessels, refrigerators, separation/purification equipment, specialty gas systems, steam generators, pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, carboys, etc.), single use bioreactors, and modular production devices.

In another preferred embodiment, a MWSN of the present invention is integrated with a pharmaceutical or biopharmaceutical software system including but not limited to: user-independent audit trails, time-stamped audit trails, data security systems, confidentiality systems, limited authorized system access, electronic signatures, bar codes scanners/readers, dedicated systems, add-on systems, control files, "cloud" based application servers, "cloud" based storage servers, WAN's, LAN's, Graphical User Interface ("GUI"), downloadable smart device applications (Apps), product serialization systems (i.e. track and trace systems), and e-pedigree systems, etc.

One of ordinary skill in the art will understand and will prefer that the MWSN of the invention will be optimized to utilize bi-directional, closed-loop, full duplex architecture. It will be understood that by integrating the MWSN into the pharmaceutical or biopharmaceutical manufacturing process using the preferred embodiments, control of the sensing activity will be achieved. The artisan will appreciate the advantages of having more control over the pharmaceutical or biopharmaceutical manufacturing process.

VIII. Pharmaceutical/Biopharmaceutical Manufacturing Processes and System(s)

As previously disclosed, the pharmaceutical or biopharmaceutical manufacturing processes comprise various types of system for the production of drugs or biologics. In one embodiment, the systems comprise various hard ware and software device or device(s) in combination with the purpose of producing a drug or biologic in conformance with regulatory and product specification. In one embodiment, a hardware device or device(s) comprise powder blending systems, granulation systems, crystallization systems, tablet presses, chromatography systems, pH systems, liquid mixing systems, water-based systems, finishing and packaging systems, cell culture systems, filtration/purification systems, centrifugation systems, vial inactivation systems, field instrumentation components and operational units, blenders, bioreactors, capping machines, separation systems, chilled water/circulating systems, glycol systems, modular cold-rooms, clean steam systems, clean-in-place (CIP) devices, compressed air systems, D.I./R.O. water systems, dry heat sterilizers, ovens, fermentation equipment, freezers, filling equipment, HVAC/environmental control systems, incubators, environmentally controlled chambers, labelers, lyophilizers, freeze dryers, dryers, mixing tanks, neutralization systems, plant steam and condensate systems, process tanks, pressure tanks, vessels, refrigerators, separation/purification equipment, specialty gas systems, steam generators, pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, carboys, etc.), single use bioreactors, and modular production devices.

In another embodiment, a software device or device(s) comprise user-independent audit trails, time-stamped audit trails, data security systems, confidentiality systems, limited authorized system access, electronic signatures, bar codes scanners/readers, dedicated systems, add-on systems, control files, "cloud" based application servers, "cloud" based storage servers, WAN's, LAN's, Graphical User Interface ("GUI"), downloadable smart device applications (Apps), product serialization systems (i.e. track and trace systems), and e-pedigree systems, etc.

A.) Powder Blending Processes/Systems

The mixing of free-flowing powders is a necessity in pharmaceutical or biopharmaceutical production. An effective mixing geometry is the starting point for many of these processes. Some geometries mix well; others do not. Particle properties generally include size distribution, shape, particle density, composition and internal structure. Bulk properties include flowability, bulk density, mixture quality, segregation tendency, dustiness and rheology. Fluctuations in raw material composition, feed rate, and process variables will also impact particle properties which can lead to off-specification drug product, active ingredients, inactive ingredients, components, in-process materials and equipment downtime. Furthermore, in a continuous manufacturing process of an active ingredient the last step whereby a variance, can be introduced, mitigated, or managing effectively is the blending step. Accordingly, one of skill in the art, will understand that an MES of the present disclosure will be an advantage, since a variance in the active ingredient will obviate a production run. Accordingly, controlling, executing, and monitoring a powder blending system in a pharmaceutical or biopharmaceutical manufacturing process utilizing a "cloud" based MES of the present disclosure will be advantageous.

B.) Granulation Processes/Systems

Granulation is the process in which primary powder particles are made to adhere to form larger, multiparticle entities called granules. It is generally occurs prior to tableting or pelleting. The granulation process combines one or more powder particles and forms a granule that will allow tabletting or the spheronization process to be within required limits. This way predictable and repeatable process is possible and quality tablets or pellets can be produced using tabletting or spheronization equipment.

One of skill in the art understands that granulation is carried out for various reasons, one of which is to prevent the segregation of the constituents of powder mix. Segregation is due to differences in the size or density of the component(s) of the mix. Normally, the smaller and/or denser particles tend to concentrate at the base of the container with the larger and/or less dense ones on the top. An ideal granulation will contain all the constituents of the mix in the correct proportion in each granule and segregation of granules will not occur. Many powders, because of their small size, irregular shape or surface characteristics, are cohesive and do not flow well. Granules produced from such a cohesive system will be larger and more isodiametric, both factors contributing to improved flow properties.

Additionally, some powders are difficult to compact even if a readily compactable adhesive is included in the mix, but granules of the same powders are often more easily compacted. This is associated with the distribution of the adhesive within the granule and is a function of the method employed to produce the granule.

For example, if one were to make tablets from granulated sugar versus powdered sugar, powdered sugar would be difficult to compress into a tablet and granulated sugar would be easy to compress. Powdered sugar's small particles have poor flow and compression characteristics. These small particles would have to be compressed very slowly for a long period of time to make a worthwhile tablet. Unless the powdered sugar is granulated, it could not efficiently be made into a tablet that has good tablet characteristics such as uniform content or consistent hardness.

In pharmaceutical or biopharmaceutical production, there are generally two (2) types of granulation. Wet granulation and dry granulation.

(i) Granulation Processes/Systems

In wet granulation, granules are formed by the addition of a granulation liquid onto a powder bed which is under the influence of an impeller (e.g. high-shear granulator), screws (e.g. twin screw granulator) or air (e.g. a fluidized bed granulator). The agitation resulting in the system along with the wetting of the components within the formulation results in the aggregation of the primary powder particles to produce wet granules. The granulation liquid contains a solvent which must be volatile so that it can be removed by drying, and be non-toxic. Typical liquids include water (WFI or pure water), ethanol, and isopropanol either alone or in combination. The liquid solution can be either aqueous based or solvent-based. Aqueous solutions have the advantage of being safer to deal with than solvents.

Water mixed into the powders can form bonds between powder particles that are strong enough to lock them together. However, once the water dries, the powders may fall apart. Therefore, water may not be strong enough to create and hold a bond. In such instances, a liquid solution that includes a binder is required. polyvinyl pyrrolidone (PVP), is one of the most commonly used pharmaceutical binders. PVP is dissolved in water or solvent and added to the process. When PVP and a solvent/water are mixed with powders, PVP forms a bond with the powders during the process, and the solvent/water evaporates (dries). Once the solvent/water has been dried and the powders have formed a more densely held mass, then the granulation is milled. This process results in the formation of granules. The process can be very simple or very complex depending on the characteristics of the powders, the final objective of tablet making, and the equipment that is available. In the traditional wet granulation method the wet mass is forced through a sieve to produce wet granules which is subsequently dried. Wet granulation is traditionally a batch process in the pharmaceutical production, however, the batch type wet granulations are not as efficient as continuous wet granulation. Accordingly, controlling, executing, and monitoring a wet granulation system in a pharmaceutical or biopharmaceutical manufacturing process utilizing a "cloud" based MES of the present disclosure will be advantageous.

(ii) Granulation Processes/System

In contrast, dry granulation is used to form granules without using a liquid solution because the product granulated may be sensitive to moisture and heat. Forming granules without moisture requires compacting and densifying the powders. In this process the primary powder particles are aggregated under high pressure. Sweying granulator or a roll compactor can be used for dry granulation. Generally, an artisan understands that dry granulation can be conducted under two processes; either a large tablet (slug) is produced in a heavy-duty tabletting press or the powder is squeezed between two counter-rotating rollers to produce a continuous sheet or ribbon of materials (roller compactor). When a tablet press is used for dry granulation, the powders may not possess enough natural flow to feed the product uniformly into the die cavity, resulting in varying degrees of densification. The roller compactor (granulator-compactor) uses an auger-feed system that will consistently deliver powder uniformly between two pressure rollers. The powders are compacted into a ribbon or small pellets between these rollers and milled through a low-shear mill. When the product is compacted properly, then it can be passed through a mill and final blend before tablet compression. Typical roller compaction processes consist of the following steps: (i) convey powdered material to the compaction area; (ii) compact powder between two counter-rotating rolls with applied forces; (iii) mill resulting compact to desired particle size distribution. Accordingly, in one embodiment, the invention comprises controlling, executing, and monitoring a dry granulation system in a pharmaceutical or biopharmaceutical manufacturing process utilizing a "cloud" based MES of the present disclosure.

C.) Crystallization Processes/Systems

Generally speaking, crystallization is the process by which a solid forms, where the atoms or molecules are highly organized into a structure known as a crystal. Attributes of the resulting crystal depend largely on factors such as temperature, air pressure, and in the case of liquid crystals, time of fluid evaporation. Crystallization occurs in two major steps. The first is nucleation, the appearance of a crystalline phase from either a super cooled liquid or a supersaturated solvent. The second step is known as crystal growth, which is the increase in the size of particles and leads to a crystal state. An important feature of this step is that loose particles form layers at the crystal's surface lodge themselves into open inconsistencies such as pores, cracks, etc.

Crystallization is a key component of almost all processes in the manufacturing of pharmaceuticals. Whether for purification of intermediates, formation of a drug product, or prevention of crystallization in amorphous products, crystallization is essential in both processing and development. One of ordinary skill in the art will appreciate that several types of crystallizers are within the scope of the invention. For example, tubular crystallizers and mixed-suspension mixed-product removal (MSMPR) crystallizers. One of ordinary skill will appreciate that to effectively control the crystallization process in a pharmaceutical or biopharmaceutical environment, one needs to control time points and crystal mass to obtain optimum conditions. Accordingly, in one embodiment, the invention comprises controlling, executing, and monitoring a crystallization system in a pharmaceutical or biopharmaceutical manufacturing process utilizing a "cloud" based MES of the present disclosure.

D.) Table Press Processes/Systems

The manufacture of oral solid pharmaceutical or biopharmaceutical dosage forms such as tablets is a complex multi-stage process under which the starting materials change their physical characteristics a number of times before the final pharmaceutical or biopharmaceutical dosage form is produced. Traditionally, tablets have been made by granulation (discussed supra), a process that imparts two primary requisites to formulate: (i) compatibility and (ii) fluidity. Both wet granulation and dry granulation (slugging and roll compaction) are used. Regardless of whether tablets are made by direct compression or granulation, the first step, milling and mixing, is the same; subsequent steps differ. Numerous unit processes are involved in making tablets, including (i) particle size reduction and sizing, (ii) blending, (iii) granulation, (iv) drying, (v) compaction, and (vi) coating. One of ordinary skill in the art will appreciate that various factors associated with these processes can seriously affect content uniformity, bioavailability, or stability.

Dispensing is the first step in many pharmaceutical manufacturing processes. Dispensing is one of the most critical steps in pharmaceutical manufacturing; as during this step, the weight of each ingredient in the mixture is determined according to dose. Dispensing may be done purely manual by hand scooping from primary containers and weighing each ingredient by hand on a weigh scale, manual weighing with material lifting assistance like vacuum transfer and bag lifters, manual or assisted transfer with automated weighing on weigh table, manual or assisted filling of loss-in weight dispensing system, automated dispensaries with mechanical devices such as vacuum loading system and screw feed system. Issues like weighing accuracy, dust control (LAF booths, glove boxes), during manual handling, lot control of each ingredient, material movement into and out of dispensary should be considered during dispensing. In order to mitigate and potential adverse event, fully automated dispensing is a preferred embodiment of the instant disclosure.

The sizing (size reduction, milling, crushing, grinding, pulverization) is another critical step in the process of pharmaceutical tablet manufacturing. In manufacturing of compressed tablets, the mixing or blending of several solid pharmaceutical ingredients is easier and more uniform if the ingredients are about the same size. This provides a greater uniformity of dose. A fine particle size is essential in case of lubricant mixing with granules for its proper function. Potential failures exist if the tablet press process is not controlled properly. These include but are not limited to (i) a possible change in polymorphic form of the active ingredient, rendering it less or totally inactive compared to the product specification; (ii) a decrease in bulk density of active compound and/or excipients, which may cause flow problem and segregation in the mix; and/or (iii) an increase in surface area from size reduction may promote the adsorption of air, which may inhibit wettability of the drug to the extent that it becomes the limiting factor in dissolution rate. One of ordinary skill in the art will appreciate that several embodiments of mill(s) and drying equipment is utilized and within the scope of the disclosure. For example, fluid energy mills, colloidal mills, ball mills, hammer mills, cutting mills, roller mills, and conical mills are within the scope of the disclosure.

After the preparation of granules (in case of wet granulation) or sized slugs (in case of dry granulation) (See the Section entitled "Granulation") or mixing of ingredients (in case of direct compression), they are compressed to get a drug product. The compression is done either by single punch machine (stamping press) or by multi-station machine (rotary press). The tablet press is a high-speed mechanical device. It 'squeezes' the ingredients into the required tablet shape with extreme precision. It can make the tablet in many shapes, although they are usually round or oval. Also, it can press the name of the manufacturer or the product into the top of the tablet.

Each tablet is made by pressing the granules inside a die, made up of hardened steel. The die is a disc shape with a hole cut through its center. The powder is compressed in the center of the die by two hardened steel punches that fit into the top and bottom of the die. The punches and dies are fixed to a turret that spins round. As it spins, the punches are driven together by two fixed cams—an upper cam and lower cam. The top of the upper punch (the punch head) sits on the upper cam edge. The bottom of the lower punch sits on the lower cam edge.

The shapes of the two cams determine the sequence of movements of the two punches. This sequence is repeated over and over because the turret is spinning round. The force exerted on the ingredients in the dies must be carefully controlled. This ensures that each tablet is perfectly formed. Because of the high speeds, they need very sophisticated lubrication systems. The lubricating oil is recycled and filtered to ensure a continuous supply. Common stages occurring during compression include (i) top punch is withdrawn from the die by the upper cam bottom punch is low in the die so powder falls in through the hole and fills the die; (ii) bottom punch moves up to adjust the powder weight-it raises and expels some powder; (iii) top punch is driven into the die by upper cam Bottom punch is raised by lower cam Both punch heads pass between heavy rollers to compress the powder; (iv) top punch is withdrawn by the upper cam Lower punch is pushed up and expels the tablet is removed from the die surface by surface plate; (v) Repeat beginning at stage (i).

An artisan will appreciate that within the scope of the instant disclosure, several ancillary steps/unit processes can be included within a pharmaceutical or biopharmaceutical tablet press system of the invention. For example, tablet coating, tablet dedusting (removal of excess powder), tablet weighting, vision inspection systems/unit operations, granulation feeding devices (to carry materials from the granulation process to the tablet press process (especially in the instance of continuous manufacturing.

Accordingly, in one embodiment, the invention comprises controlling, executing, and monitoring a tablet press system (and ancillary unit operations) in a pharmaceutical or biopharmaceutical manufacturing process utilizing a "cloud" based MES of the present disclosure.

E.) Chromatography Processes/Systems

Chromatography is a laboratory technique for the separation of a mixture. The mixture is dissolved in a fluid called the mobile phase, which carries it through a structure holding another material called the stationary phase. The various constituents of the mixture travel at different speeds, causing them to separate. The separation is based on differential partitioning between the mobile and stationary phases. Subtle differences in a compound's partition coefficient result in differential retention on the stationary phase and thus affect the separation. Chromatography may be preparative or analytical. The purpose of preparative chromatography is to separate the components of a mixture for later use, and is thus a form of purification. Analytical chromatography is done normally with smaller amounts of material and is for establishing the presence or measuring the relative proportions of analytes in a mixture. The two are not mutually exclusive and both types (preparative and analytical) are important steps in the production and quality control characterization of biologics.

One of skill in the art will appreciate that several chromatography techniques are known in the art and an artisan will understand that specific chromatography types will be a direct function of the type of pharmaceutical or biopharmaceutical being produced. For example, chromatography techniques by bed shape include column chromatography, planar chromatography, paper and thin later (TLC) chromatography. In addition, other chromatography techniques such as displacement, gas, liquid, affinity, ion-exchange, size exclusion, expanded bed adsorption, reverse plane, hydrophobic interaction, simulated bed-moving, fast protein liquid, countercurrent, and chiral are used by an artisan to produce pharmaceutical or biopharmaceuticals.

Accordingly, in one embodiment, the invention comprises controlling, executing, and monitoring a chromatography system in a pharmaceutical or biopharmaceutical manufacturing process utilizing a "cloud" based MES of the present disclosure.

F.) pH Processes/Systems pH (potential of hydrogen) is a numeric scale used to specify the acidity or basicity of an aqueous solution. It is approximately the negative of the base 10 logarithm of the molar concentration, measured in units of moles per liter, of hydrogen ions. More precisely it is the negative of the base 10 logarithm of the activity of the hydrogen ion. Solutions with a pH less than 7 are acidic and solutions with a pH greater than 7 are basic. Pure water is neutral, at pH 7 (25° C.), being neither an acid nor a base. Contrary to popular belief, the pH value can be less than 0 or greater than 14 for very strong acids and bases respectively. pH measurements are important pharmaceutical and/or biopharmaceutical production since pH has a vital impact on the solubility, stability, permeability of a drug or biologic. For example, continuously monitoring pH will allow for determinations on uniform and stable production in relation to a product specification. In addition, continuously monitoring and adjusting pH will during biopharmaceutical manufacturing will optimize product yield whereby keeping costs of production steady.

Accordingly, in one embodiment, the invention comprises controlling, executing, and monitoring a pH system in a pharmaceutical or biopharmaceutical manufacturing process utilizing a "cloud" based MES of the present disclosure.

G.) Liquid Mixing Processes/Systems

In pharmaceutical manufacturing, liquid mixing is a unit operation that involves manipulation of a heterogeneous physical system with, the intent to make it more homogeneous. Mixing is performed to allow heat and/or mass transfer to occur between one or more streams, components, or phases. Modern pharmaceutical or biopharmaceutical manufacture almost always involves some form of liquid mixing. Some classes of chemical reactors are also mixers. With the right equipment, it is possible to mix a solid, liquid or gas into another solid, liquid or gas. The type of operation and equipment used during mixing depends on the state of materials being mixed (liquid, semi-solid, or solid) and the miscibility of the materials being processed.

(i) Liquid-Liquid Mixing Processes/Systems

Mixing of liquids occurs frequently in pharmaceutical and biopharmaceutical manufacture. The nature of liquids to blend determines the equipment used. Single-phase blending tends to involve low-shear, high-flow mixers to cause liquid engulfment, while multi-phase mixing generally requires the use of high-shear, low-flow mixers to create droplets of one liquid in laminar, turbulent or transitional flow regimes, depending on the Reynolds number of the flow. Turbulent or transitional mixing is frequently conducted with turbines or impellers; laminar mixing is conducted with helical ribbon or anchor mixers. Mixing of liquids that are miscible or at least soluble in each other occurs frequently in drug and biologic manufacturing processes. Generally, the momentum of the liquid being added is sometimes enough to cause enough turbulence to mix the two, since the viscosity of both liquids is relatively low. If necessary, paddle blending vessel can be used to complete the mixing process.

(ii) Liquid-Solid Mixing Processes/Systems

Liquid-solid mixing is typically done to suspend coarse free-flowing solids, or to break up lumps of fine agglomerated solids. In the first case, the particles can be lifted into suspension (and separated from one another) by bulk motion of the fluid; in the second, the mixer itself (or the high shear field near it) must destabilize the lumps and cause them to disintegrate. Suspension of solids into a liquid is done to improve the rate of mass transfer between the solid and the liquid. Examples include dissolving a solid reactant into a solvent, or suspending catalyst particles in liquid to improve the flow of reactants and products to and from the particles. The associated eddy diffusion increases the rate of mass transfer within the bulk of the fluid, and the convection of material away from the particles decreases the size of the boundary layer, where most of the resistance to mass transfer occurs. Axial-flow impellers are preferred for solid suspension, although radial-flow impellers can be used in a tank with baffles, which converts some of the rotational motion into vertical motion. When the solid is denser than the liquid (and therefore collects at the bottom of the tank), the impeller is rotated so that the fluid is pushed downwards; when the solid is less dense than the liquid (and therefore floats on top), the impeller is rotated so that the fluid is pushed upwards. The equipment preferred for solid suspension produces large volumetric flows but not necessarily high shear; high flow-number turbine impellers, such as hydrofoils, are typically used. Multiple turbines mounted on the same shaft can reduce power draw.

Very fine powders, such as some active ingredients, and components that have been spray dried may agglomerate or form lumps during transportation and storage. Starchy materials or those that form gels when exposed to solvent can form lumps that are wetted on the outside but dry on the inside. These types of materials are not easily mixed into liquid with the types of mixers preferred for solid suspension because the agglomerate particles must be subjected to intense shear to be broken up. In some ways, deagglomeration of solids is similar to the blending of immiscible liquids, except for the fact that coalescence is usually not a problem.

(iii) Liquid-Gas Mixing Processes 1 Systems

Liquids and gases are typically mixed for mass transfer to occur. For example, in the case of air stripping, gas is used to remove volatiles from a liquid. Typically, a packed column is used for this purpose, with the packing acting as a motionless mixer and the air pump providing the driving force. When a tank and impeller are used, the objective is typically to ensure that the gas bubbles remain in contact with the liquid for as long as possible. This is especially important if the gas is expensive, such as pure oxygen, or diffuses slowly into the liquid. Mixing in a tank is also useful when a slow chemical reaction is occurring in the liquid phase, and so the concentration difference in the thin layer near the bubble is close to that of the bulk. This reduces the driving force for mass transfer. If there is a relatively fast chemical reaction in the liquid phase, it is sometimes advantageous to disperse but not re-circulate the gas bubbles, ensuring that they are in plug flow and can transfer mass more efficiently.

Rushton turbines have been traditionally used do disperse gases into liquids, but newer options, such as the Smith turbine and Bakker turbine are becoming more prevalent. One of the issues is that as the gas flow increases, more and more of the gas accumulates in the low pressure zones behind the impeller blades, which reduces the power drawn by the mixer. Newer designs, such as the GDX impeller, have mitigated this problem.

At a commercial production scale for the manufacture of drugs or biologics, regardless of the type of medium being mixed (i.e. liquid-liquid, solid liquid, liquid-gas), efficient consistent mixing can be difficult to achieve. An artisan understands that a great deal of process development goes into designing and improving mixing processes. Generally, mixing at a production scale is done in batches, inline, or with help of static mixers. Some applications require the use of multi-shaft mixers, in which a combination of mixer types are used to completely blend the product. In addition to performing typical batch mixing operations, some mixing can be done continuously. However, given the high regulatory requirements of manufacturing drugs and biologics, having the ability to continuously mix at consistent reproducible quality level will be desired. One aspect of the invention achieves this need.

Accordingly, in one embodiment, the invention comprises controlling, executing, and monitoring a liquid mixing system in a pharmaceutical or biopharmaceutical manufacturing process utilizing a "cloud" based MES of the present disclosure.

H.) Water-Based Processes/Systems

Pharmaceutical and/or biopharmaceutical water systems are critical in parenteral aseptic manufacturing processes because of their influence on final product quality. Water of pharmaceutical and biopharmaceutical quality is mainly used as a part of the product in formulation processes and as a cleaning agent for vessels and accessories in direct contact with the drug product, active ingredients, inactive ingredients, components, and in-process materials during manufacture. Pharmaceutical water installations must adhere to technical design criteria, most of which are included in international regulatory guidelines.

(i) Chilled Water Systems

Pharmaceutical chillers are important parts of the drug-manufacturing industry. Nearly all drugs or biologics require chilled water in their manufacturing, from antibiotics to complex biologic medications. Chillers provide precise control over the water-chilling process. Pharmaceutical chillers come as central process chillers and compact process chillers. Central process chillers can handle 10 to 200 tons, and compact process chillers work well for 1 to 40 tons. Compact process chillers are smaller, which makes them ideal for small spaces. All pharmaceutical chillers feature components that include evaporators, pumps, refrigerant relief valves, cooling towers and pipes, condensers, compressors, filters, fans, and tanks. They come with either an air or water condenser and come in four (4) main types reciprocating, screw-driven, centrifugal, and absorption designs.

(ii) Clean-In-Place (CIP) Systems

Clean-in-place (CIP) is a method of cleaning the interior surfaces of pipes, vessels, process equipment, filters and associated fittings, without disassembly. Up to the 1950s, closed systems were disassembled and cleaned manually. The benefit to industries that use CIP is that the cleaning is faster, less labor-intensive, and poses less of a chemical exposure risk to humans. Depending on the cleaning needed, elevated temperature and chemical detergents are often employed to enhance cleaning effectiveness. An artisan will appreciate that critical parameters must be met and remain within the production specification for the duration of the product cycle. If the specification is not reached or maintained, cleaning will not be ensured and will have to be repeated. Critical parameters include temperature, flow rate/supply pressure, chemical concentration, chemical contact time, and final rinse conductivity.

(iii) Clean Steam Systems

Clean steam is used in the manufacture of pharmaceuticals and biopharmaceuticals in processes where steam or its condensate can come into contact with a pharmaceutical or biopharmaceutical. The main use of clean steam in pharmaceutical or biopharmaceutical manufacturing is for sterilization of products, or more usually, equipment. In a majority of cases, steam cleaning is encountered in the manufacture of injectable solutions, in biopharmaceutical manufacturing where a sterile environment must be created to grow a biological production organism (bacterial, yeast, or animal cell), and in the manufacture of sterile solutions, such as ophthalmic products.

(iv) Water-for-Injection (WFI) Systems

Water for injection (WFI) is water of extra high quality without significant contamination. A sterile version is used for making solutions that will be given by injection or will come in contact with human tissue before such use other substances generally must be added to make the solution more or less isotonic. A non-sterile version may be used in manufacturing with sterilization occurring later in the production process. WFI is generally made by distillation or reverse osmosis. It should contain less than a milligram (mg) of elements other than water per 100 ml. Versions with agents that stop bacterial growth are also available.

Based on the foregoing, it will be apparent to one of ordinary skill that consistent application of a water-based system in a pharmaceutical or biopharmaceutical manufacturing process will be advantageous. Accordingly, in one embodiment, the invention comprises controlling, executing, and monitoring a water-based system in a pharmaceutical or biopharmaceutical manufacturing process utilizing a "cloud" based MES of the present disclosure.

I.) Finishing and Packaging Processes/Systems

Finishing and packaging of pharmaceuticals are important aspects of the pharmaceutical manufacturing process given that the finished product is ultimately distributed to the consumer. The need for safe uniform packaging is apparent to one of skill in the art.

(I) Filling Systems

Aseptic filling of sterile drugs, also known as sterile filling, is one of the most critical processes in biopharmaceutical manufacturing. This is due to its highly technique driven processes and the potential safety impact to the end user, usually an already compromised patient. There are only indirect safeguards for the sterility of the filled drug after it is stoppered and capped in the cleanroom. Unlike terminal sterilized filled drugs, the stability of the aseptic filled drugs will be affected by steam autoclave, dry heat ovens, Ethylene Oxide, and irradiation, either Cobalt 60 Gamma or E Beam. Thus the need to utilize an aseptic process to fill certain biological and pharmaceutical drugs. Virtually any solution, powder, or suspension can be terminally sterilized prior to the aseptic fill/finish process. Typically sterile drugs are aseptic fill/finish in molded glass bottles, tubular glass vials, tubular glass syringes, and glass ampoules. Solutions can also be subsequently lyophilized in a sterile dryer to further stabilize drugs. The more unique the product or container system, the greater the technical or operational challenges. Accordingly, it is an object of the present invention to overcome these challenges.

Aseptic filling is an aseptic process that requires the close coordination and complex interaction between manufacturing personnel, sterilized drug or biologic product, the fill/finish equipment system, cleanroom and support facilities, and sterilized filling components. The aseptic fill/finish methods can vary between an early clinical phase hand fill, to small volume semi-automated filling to the fully automated high-volume over multiple day production batches.

The cleanrooms are controlled areas and in conjunction with the supporting utility systems and facility infrastructure, create the environmental envelop in which the aseptic fill/finish process operates. As with the other components of the aseptic processing, the cleanrooms area complex combination of physical rooms and areas, utilizing High Efficiency Particulate Air (HEPA) to create unidirectional air patterns, maintenance of positive pressure between rooms in conjunction with constant air changes, and sanitization processes. All of this operates with constant environmental monitoring (EM). All components and supplies that are required during the aseptic fill/finish operation must be either sterilized or sanitized. Sterilization is usually completed with pass-through steam autoclaves, dry-heat oven, or tunnel and sanitized cleanroom airlocks.

One of ordinary skill will understand that the filling components can also vary per the drug and production requirements. Tubular Type I glass vials are predominately used for Small Volume Parenterals (SVP) and sterile lyophilization and blown Type II glass bottles for Large Volume Parenterals (LVP). Tubular Type I glass stock is also predominately used for aseptic syringe production.

The stoppering of the vial provides the sterile seal of the drug from the environment and a crimp-seal cap ensures the long term integrity. The stopper also provides a barrier to gas and oxygen to the drug ensuring long term stability. Elastomeric closures (stoppers) that are used for parenteral solutions are formulated to ensure product stability and patient functionality. Two of the basic styles of closures are the "plug" for sterile solutions and the "leg" for sterile lyophilization. Some of the considerations should be given to size, type and number of needle punctures, water vapor transmission rate, ability to retain bound water, gas transmission, stoppering equipment of the filling line and potential extractables.

There are many ways to aseptically fill/finish sterile drugs, which includes the traditional solution filling of glass vials and syringes, sterile powder fills, sterile lyophilization, and blow-fill-seal. In addition, an artisan will appreciate that there are many considerations in the selection of aseptic filling equipment including solution volume, fill tolerance, production throughput, drug viscosity, drug foaming, gas blanketing, drug temperature, potent compounds, drug stability, and reactivity.

Sterile preparation of the vials and bottles is achieved by rinsing/washing to remove endotoxins. The glass vials and bottles are depyrogenation usually with hot air. This is accomplished in a batch mode with an oven, or a continuous process with a tunnel that connects the bottle washer to the filling station.

The solution filling process will include the transport of sterilized vials and bottles, orientation to the filling station, a means for check weighing, stoppering and crimping stations. For high speed lines, there will also be accumulation tables and vial load/loading stations.

Industry wide, there is an increased effort from pharmaceutical and biopharmaceutical manufacturers to improve consistency in aseptic processing and pharmaceutical or biopharmaceutical filling. This is deon in an effort to increase quality and decrease costs in the highly technical process. It is an object of the present invention to overcome these deficiencies.

Based on the foregoing, it will be apparent to one of ordinary skill that consistent application of a filling system in a pharmaceutical or biopharmaceutical manufacturing process will be advantageous. Accordingly, in one embodiment, the invention comprises controlling, executing, and monitoring a filling system in a pharmaceutical or biopharmaceutical manufacturing process utilizing a "cloud" based MES of the present disclosure.

(ii) Dry Heat Sterilizers

Dry heat sterilization is an important aspect of finishing and packaging in pharmaceutical or biopharmaceutical production. The dry heat sterilization process is accomplished by conduction; that is where heat is absorbed by the exterior surface of an item and then passed inward to the next layer. Eventually, the entire item reaches the proper temperature needed to achieve sterilization. The proper time and temperature for dry heat sterilization is 160° C. (320° F.) for 2 hours or 170° C. (340° F.) for 1 hour. Instruments should be dry before sterilization since water will interfere with the process. Dry heat destroys microorganisms by causing coagulation of proteins and thus in important for biologics. Generally speaking, there are two (2) types of hot air convection sterilizers: (i) Gravity convection and (ii) Mechanical convection. Additionally, one of ordinary skill in the art will appreciate that a plurality of instruments can be used in a dry heat sterilization process including a hot air oven and glass bead sterilizers.

Based on the foregoing, it will be apparent to one of ordinary skill that consistent application of a dry heat sterilizer system in a pharmaceutical or biopharmaceutical manufacturing process will be advantageous. Accordingly, in one embodiment, the invention comprises controlling, executing, and monitoring a dry heat sterilizer system in a pharmaceutical or biopharmaceutical manufacturing process utilizing a "cloud" based MES of the present disclosure.

(iii) Lypholizers

Lyophilization, otherwise known as freeze-drying is a dehydration process typically used to preserve a perishable material or make the material more convenient for transport. Freeze-drying works by freezing the material and then reducing the surrounding pressure to allow the frozen water in the material to sublime directly from the solid phase to the gas phase.

Pharmaceutical and biopharmaceutical companies use freeze-drying to increase the shelf life of the products, such as live virus vaccines, biologics and other injectables. By removing the water from the material and sealing the material in a glass vial, the material can be easily stored, shipped, and later reconstituted to its original form for injection. Another example from the pharmaceutical industry is the use of freeze drying to produce tablets or wafers, the advantage of which is less excipient (components or inactive ingredient(s) as the case may be) as well as a rapidly absorbed and easily administered dosage form. Freeze-dried pharmaceutical products are produced as lyophilized powders for reconstitution in vials and more recently in prefilled syringes for self-administration by a patient.

Examples of lyophilized biological products include many vaccines such as Measles Virus Vaccine Live, Typhoid Vaccine, Meningococcal Polysaccharide Vaccine Groups A and C Combined. Other freeze-dried biological products include Antihemophilic Factor VIII, Interferon alfa, anti-blood clot medicine Streptokinase, and Wasp Venom Allergenic Extract.

Many biopharmaceutical products based on therapeutic proteins such as monoclonal antibodies require lyophilization for stability. Examples of lyophilized biopharmaceuticals include blockbuster drugs such as Etanercept, Infliximab, Rituximab and Trastuzumab. Freeze-drying is also used in manufacturing of raw materials for pharmaceutical products. Active Pharmaceutical Product Ingredients (APIs) are lyophilized to achieve chemical stability under room temperature storage. Bulk lyophilization of APIs is typically conducted using trays instead of glass vials.

Generally speaking there are four (4) stages necessary to complete the lyophilization process: (i) pretreatment, (ii) freezing, (iii) primary drying, and (iv) secondary drying.

Pretreatment includes any method of treating the product prior to freezing. This may include concentrating the product, formulation revision (i.e., addition of components to increase stability, preserve appearance, and/or improve processing), decreasing a high-vapor-pressure solvent, or increasing the surface area. In many instances the decision to pretreat a product is demanded by cycle time or product quality considerations.

In a scaled commercial production process freezing is usually done using a freeze-drying machine. In this step, it is important to cool the material below its triple point, the lowest temperature at which the solid, liquid and gas phases of the material can coexist. This ensures that sublimation rather than melting will occur in the following steps. Larger crystals are easier to freeze-dry. To produce larger crystals, the product should be frozen slowly or can be cycled up and down in temperature. This cycling process is called annealing. Usually, the freezing temperatures are between −40° C. and −90° C. and more preferably between −50° C. and −80° C. The freezing phase is the most critical in the whole freeze-drying process, because the product can be spoiled if improperly done.

During the primary drying phase, the pressure is lowered, and enough heat is supplied to the material for the ice to sublime. The amount of heat necessary can be calculated using the sublimating molecules' latent heat of sublimation and other methods known in the art. In this initial drying phase, between 91-97% of the water in the material is sublimed. In a preferred embodiment, 93% to 95% of the water in the material is sublimated. In the case of pharmaceuticals or biopharmaceuticals, this phase may be slow (in the order of 2 or 3 days), because, if too much heat is added, the material's structure may be altered, which would obviate the product specification or fall outside the quality control parameters. In this phase, pressure is controlled through the application of partial vacuum. The vacuum speeds up the sublimation, making it useful as a deliberate drying process. Furthermore, a cold condenser chamber and/or condenser plates provide a surface(s) for the water vapor to re-solidify.

The secondary drying phase aims to remove unfrozen water molecules, since the ice was removed in the primary drying phase. This part of the freeze-drying process is governed by the material's adsorption isotherms. In this phase, the temperature is raised higher than in the primary drying phase, and can even be above 0° C., to break any physico-chemical interactions that have formed between the water molecules and the frozen material. Usually the pressure is also lowered in this stage to encourage desorption. After the freeze-drying process is complete, the vacuum is usually broken with an inert gas, such as nitrogen, before the material is sealed. At the end of the operation, the final residual water content in the product is extremely low, around 0.5% to 6%. In a preferred embodiment, the residual water content is between 1% to 4%.

Based on the foregoing, if will be apparent to one of ordinary skill that consistent application of a lyophilization system in a pharmaceutical or biopharmaceutical manufacturing process will be advantageous. Accordingly, in one embodiment, the invention comprises controlling, executing, and monitoring a lyophilizer system in a pharmaceutical or biopharmaceutical manufacturing process utilizing a "cloud" based MES of the present disclosure.

(iv) Vial Inspection Systems

A vial inspection system is an important aspect of finishing and packaging of pharmaceutical and biopharmaceutical manufacture. It is an important criteria for the quality control release and must be consistently applied in order to detect drug products that are outside of critical quality control parameters. Vial inspection systems come in a variety of forms, with some being manual (i.e. visually inspected by humans). Other automated or semi-automated vial inspection systems exists and use a wide range of technologies. For example, some systems utilize light scattering processes, photo equipment, or a hybrid of technologies to detect defects in both the drug products and defect on the vials.

Irrespective of the technology selected for automated inspection, several operational parameters (e.g., machine settings) and product properties play a key role in determining the performance of the system. Detailed characterization and optimization of these parameters are critical to developing a consistent vial inspection process. Each technology needs to be qualified for its ability to detect faulty containers and to ensure that non-defect containers will not be rejected. This qualification requires a series of experiments using standard defect sets to challenge the AIM. Careful selection of experimental conditions (i.e., defect sets and machine settings) is important to minimize the number of evaluations and still generate conclusive data for entire process space.

Given the importance of conforming to a quality control specification and the fact that vial inspection occurs near the end of the pharmaceutical or manufacturing process, it will be apparent to one of ordinary skill that consistent application of a vial inspection system in a pharmaceutical or biopharmaceutical manufacturing process will be advantageous. Accordingly, in one embodiment, the invention comprises controlling, executing, and monitoring a vial inspection system in a pharmaceutical or biopharmaceutical manufacturing process utilizing a "cloud" based MES of the present disclosure.

(v) Supply Chain Management

Proper supply chain management of packaged drugs or biologics is critical to provide quality drug products to end-users. This includes monitoring traditional areas of the supply chain including vial inspection, packaging, product protection, storage, and distribution. Specifically, from the point when the drug or biologic is packaged until it reaches the end-user (See, FIG. 16). In a preferred embodiment, the invention provides for a method of monitoring the manufacturing attributes of a pharmaceutical or biopharmaceutical produced by a process of the disclosure by serialization of the drug or biologic batches. This allows any entity in the drug or biologic supply chain to properly track and trace each vial of drug product associated with a particular batch, lot, or control number. The serialization of the drug or biologic using a "cloud" based MES of the present invention provides two advantageous purposes. First, it allows for easy tracking of quality attributes of a given batch, lot, or control number of drug or biologic. Given the complex chemical properties associated with pharmaceuticals or biopharmaceuticals, in the case of product recall, it would be easy to determine which vials need to be recalled. Second, it allows for easy tracking of drug or biologic origin, which makes detecting counterfeit propofol easy to achieve. In a preferred embodiment, the serialization of the present invention comprises an e-pedigree.

(vi) Track and Trace Systems

In the context of pharmaceutical or biopharmaceutical manufacture and distribution, tracking and tracing relates to the process of determining the current and past locations of a unique drug or biologic (or a pallet, or carton, as the case may be). In response to a growing number of recall incidents, a wave of software, hardware, consulting and systems vendors have emerged over the last few years to offer a range of traceability solutions and tools for industry. Radio-frequency identification and barcodes are two common technology methods used to deliver traceability. RFID is synonymous with track-and-trace solutions, and has a critical role to play in supply chains. RFID is a code-carrying technology, and can be used in place of a barcode to enable non-line of sight-reading. Deployment of RFID was earlier inhibited by cost limitations but the usage is now increasing. Barcoding is a common and cost-effective method used to implement traceability at both the item and case-level. Variable data in a barcode or a numeric or alphanumeric code format can be applied to the packaging or label. The secure data can be used as a pointer to traceability information and can also correlate with production data such as time to market and product quality.

Based on the foregoing, an artisan will appreciate that a disadvantage of the current state of the art does not allow for additional data to be inserted onto the drug or biopharmaceutical "tag" after it is placed into the supply chain. It is an object of the present invention to provide an advantage to track and trace systems in the pharmaceutical or biopharmaceutical supply chain. Accordingly, in one embodiment of the present invention, quality control and production data is included into the product "tag" for a certain drug or biologic produced with a "cloud" based MES of the present disclosure. One of ordinary skill in the art, will appreciate that continuous monitoring of quality control parameters in the supply chain will provide for more accurate quality control of drugs or biologics by the time it reaches the end user. For example, depending on the geographic location of the end-user and circumstances surrounding the need for treatment (i.e. a natural disaster, etc), delivery of the drugs or biopharmaceuticals could take weeks, months, etc.

Additionally, not all cold chain products are the same and the need for monitoring temperature and other quality parameters differs for each type of drug product.

In one embodiment, the invention provides for a method of monitoring quality of a drug product utilizing a "cloud" based MES of the instant disclosure whereby the drug product quality information is transmitted via wireless DCS of the invention and whereby the quality parameters are set forth by the quality control unit are transmitted via a "cloud" based storage database.

J.) Cell Culture Processes/Systems

Cell culture is the process by which cells are grown under controlled conditions, generally outside of their natural environment. Cell culture conditions can vary for each cell type, but artificial environments consist of a suitable vessel with substrate or medium that supplies the essential nutrients (amino acids, carbohydrates, vitamins, minerals), growth factors, hormones, and gases ($CO_2$, $O_2$), and regulates the physio-chemical environment (pH buffer, osmotic pressure, temperature). The cell culture process is an important step in the production of biopharmaceuticals.

(i) Cell Banking

A cell bank is a facility within a pharmaceutical or biopharmaceutical (or sometimes off-site) that stores cells of specific genome for the purpose of future use in a product or medicinal needs. They often contain expansive amounts of base cell material that can be utilized for various production runs. The advantages of cell banks, if properly monitored, is that the facilities will include a detailed description and history of the cells and thus initial quality control parameters will be readily determined by a quality control unit.

(ii) Bioreactor

A bioreactor refers generally to any manufactured or engineered device that supports a biologically active environment. Bioreactor design is a relatively complex engineering task, which is studied in the discipline of biochemical engineering. Under optimum conditions, the microorganisms or cells are able to perform their desired function with limited production of impurities. The environmental conditions inside the bioreactor, such as temperature, nutrient concentrations, pH, and dissolved gases (especially oxygen for aerobic fermentations) affect the growth and productivity of the organisms. The temperature of the fermentation medium is maintained by a cooling jacket, coils, or both. Particularly exothermic fermentations may require the use of external heat exchangers. Nutrients may be continuously added to the fermenter, as in a fed-batch system, or may be charged into the reactor at the beginning of fermentation. The pH of the medium is measured and adjusted with small amounts of acid or base, depending upon the fermentation. For aerobic (and some anaerobic) fermentations, reactant gases (especially oxygen) must be added to the fermentation. Since oxygen is relatively insoluble in water (the basis of nearly all fermentation media), air (or purified oxygen) must be added continuously. The action of the rising bubbles helps mix the fermentation medium and also "strips" out waste gases, such as carbon dioxide. In practice, bioreactors are often pressurized; this increases the solubility of oxygen in water. In an aerobic process, optimal oxygen transfer is sometimes the rate limiting step. Oxygen is poorly soluble in water—even less in warm fermentation broths—and is relatively scarce in air (20.95%). Oxygen transfer is usually helped by agitation, which is also needed to mix nutrients and to keep the fermentation homogeneous. Gas dispersing agitators are used to break up air bubbles and circulate them throughout the vessel. Bioreactors which produce biologics can take many forms including large commercial vessels to single-use disposable vessels. In addition, portable bioreactors are known in the art.

Based on the foregoing, it will be apparent to one of ordinary skill that consistent application of a cell culture system in a pharmaceutical or biopharmaceutical manufacturing process will be advantageous. Accordingly, in one embodiment, the invention comprises controlling, executing, and monitoring a cell culture system comprising a bioreactor system in a pharmaceutical or biopharmaceutical manufacturing process utilizing a "cloud" based MES of the present disclosure.

K.) Filtration/Purification Processes/Systems

Filtration and purification processes in pharmaceutical or biopharmaceutical production are important in several aspects of the manufacturing processes. This includes filtration and purification of active ingredients, inactive ingredients, components and in-process material. There are many different filtration methods utilizing a variety of equipment. One of ordinary skill will appreciate that different methods may be employed depending on the type of drug or biologic being produced as well as the equipment being used. In one embodiment of the invention a filtration/purification device includes devices for processes involved in viral inactivation, pure water filtration, aseptic filtration, chromatography, diafiltration, centrifugation.

It will be apparent to one of ordinary skill that consistent application of a filtration/purification system in a pharmaceutical or biopharmaceutical manufacturing process will be advantageous. Accordingly, in one embodiment, the invention comprises controlling, executing, and monitoring a filtration/purification system in a pharmaceutical or biopharmaceutical manufacturing process utilizing a "cloud" based MES of the present disclosure.

L.) Field Instrumentation Processes/Systems

The invention further comprises implementation of the "cloud" based MES and methods described herein into the field instrumentation component(s) utilized during the pharmaceutical or biopharmaceutical manufacturing process. For the purposes described herein "field instrumentation component(s)" includes but is not limited to, calibration tools, flow meters, intrinsic safety devices, leveling components, weighting components, process analyzers, thermometers, and valves. In one embodiment, the methods described herein are integrated into one field instrumentation component. However, one of ordinary skill in the art will appreciate that integration into every field instrumentation component will be preferred.

It will be apparent to one of ordinary skill that consistent application of a field instrumentation system in a pharmaceutical or biopharmaceutical manufacturing process will be advantageous. Accordingly, in one embodiment, the invention comprises controlling, executing, and monitoring a field instrumentation component in a pharmaceutical or biopharmaceutical manufacturing process utilizing a "cloud" based MES of the present disclosure.

M.) Operational Units/Processes/Systems

The invention further comprises implementation of the "cloud" based MES and methods described herein into the operational unit(s) utilized during the pharmaceutical or biopharmaceutical manufacturing process. For the purposes described herein, "operational unit(s)" includes but is not limited to, motors, drives, compressed air systems, HVAC, boilers, environmental controls, back-up generators. In one embodiment, the methods described herein are integrated into one operational unit. However, one of ordinary skill in the art will appreciate that integration into every operational unit will be preferred.

It will be apparent to one of ordinary skill that consistent application of an operational unit system in a pharmaceutical or biopharmaceutical manufacturing process will be advantageous. Accordingly, in one embodiment, the invention comprises controlling, executing, and monitoring an operational unit in a pharmaceutical or biopharmaceutical manufacturing process utilizing a "cloud" based MES of the present disclosure.

IX.) Kits/Articles of Manufacture

For use in basic input/output systems, quality control systems, pharmaceutical production, biopharmaceutical production, hardware calibrations, software calibrations, computer systems audits, computer system security certification, data validation, different software system analysis, quality control, and the manufacturing of drug products or biologic products described herein, kits are within the scope of the invention. Such kits can comprise a carrier, package, or container that is compartmentalized to receive one or more containers such as boxes, shrink wrap, and the like, each of the container(s) comprising one of the separate elements to be used in the method, along with a program or insert comprising instructions for use, such as a use described herein.

The kit of the invention will typically comprise the container described above and one or more other containers associated therewith that comprise materials desirable from a commercial and user standpoint, programs listing contents and/or instructions for use, and package inserts with instructions for use.

A program can be present on or with the container. Directions and or other information can also be included on an insert(s) or program(s) which is included with or on the kit. The program can be on or associated with the container.

The terms "kit" and "article of manufacture" can be used as synonyms.

The article of manufacture typically comprises at least one container and at least one program. The containers can be formed from a variety of materials such as glass, metal or plastic.

X.) MES System Security

One of ordinary skill in the art will appreciate that control system security for a "cloud" based MES and DCS of the invention is paramount. An artisan will understand that interconnected operations and MES systems of the present invention, while clearly advantageous, do create more threat vectors which can be compromised. Accordingly, one of ordinary skill in the art will appreciate that having limited user access, enriched physical access controls, and being detected for anomalous behavior is critical. It is understood that pharmaceutical and/or biopharmaceutical production and distribution is a critical infrastructure which must be secured in the case of threat or hazard. Accordingly, in one embodiment, the "cloud" based MES of the disclosure utilizes encryption to transmit production data over the "cloud" based DCS and distributed system.

In one embodiment, a "cloud" based MES comprises a symmetric-key algorithm for encryption to enhance transport layer security. One of skill in the art will appreciate that limiting the number of users in a "cloud" based MES of the present disclosure will enable encryption of plaintext and decryption of cipher text to a limited number of users over the "cloud" platform. In one embodiment, a symmetric-key algorithm includes but is not limited to Twofish, Serpent, AES, Blowfish, CASTS, RC4, 3DES, Skipjack, or IDEA. One of ordinary will in the art will further appreciate that a modified or custom symmetric-key algorithm may be preferred.

In addition to data encryption, another embodiment of the present invention comprises limited user access to the primary pharmaceutical or biopharmaceutical control and execution via the Soft PLC of the instant disclosure. By limiting access to the actual control and execution of the manufacturing process, one of ordinary skill will limit the number of potential threats.

One aspect of the present invention allows for users to be validated prior to gaining access to the system. This can be done at the manufacturing plant level or at the end user device level if accessing data over the "cloud" based DCS of the disclosure. Once validated, a user can then begin accessing the MES. A user audit trail creates a historic record of the users activities with the MES system using techniques known in the art. In addition, data analytics of the invention can actively monitor for anomalous activity and alert the system or other users of possible deviations in the production process.

Accordingly, in one embodiment, the invention comprises a "cloud" based MES for controlling, executing, and monitoring a pharmaceutical or biopharmaceutical manufacturing process utilizing a combination of system security protocols which comprise data encryption, limited user access, and anomalous detection via analytics. One of ordinary skill will appreciate that a multi-layered approach will create the strongest path to system security.

EXAMPLES

Various aspects of the invention are further described and illustrated by way of the several examples that follow, none of which is intended to limit the scope of the invention.

Example 1: Utilizing a "Cloud" Based MES to Control, Execute, and Monitor a Powder Blending Process for Pharmaceutical or Biopharmaceutical Manufacture In one embodiment, a "cloud" based MES of the invention is integrated into a pharmaceutical or biopharmaceutical powder blending system whereby the powder blending system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the powder blending system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical powder blending environment and the MES monitors the powder blending system in real-time during pharmaceutical or biopharmaceutical production. The data compiled as a result of the pharmaceutical or biopharmaceutical powder blending process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical powder blending system or systems on a device-by-device basis. As previously set forth, the quality control parameters of a drug or biologic as well as the production boundaries necessary to produce said drug or biologic of all devices used in the drug or biologic manufacture for the purposes of the pharmaceutical or biopharmaceutical powder blending processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical powder blending process and will monitor to ensure that the pharmaceutical or biopharmaceutical powder blending system(s) data is integrated into subsequent drug or biologic manufacturing processes.

In addition, the invention comprises a "cloud" based MES of the invention for controlling and executing a pharmaceutical or biopharmaceutical powder blending process whereby the process is used to produce an active ingredient, inactive ingredient, component, or in-process material. The MES controls and executes the aforementioned powder blending process in real-time, near real-time, or live and in the event that a control parameter (which is determined by a quality control unit), falls outside a predetermined value, the MES will initiate corrective action of the aforementioned powder blending process to mitigate a failure. Such corrective action comprises modifying or stopping the aforementioned powder blending process. (See, FIG. 5).

In one embodiment, the control, execution, monitoring and analysis of the pharmaceutical or biopharmaceutical powder blending systems and processes achieves a step of integration into a MES whereby manufacturing productivity and product quality are increased. Costs are streamlined over time and an IIoT paradigm is achieved.

Example 2: Utilizing a "Cloud" Based MES to Control, Execute, and Monitor a Granulation Process for Pharmaceutical or Biopharmaceutical Manufacture In one embodiment, a "cloud" based MES of the invention is integrated into a pharmaceutical or biopharmaceutical granulation system (exemplified either wet or dry) whereby the granulation system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the granulation system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical granulation system environment and the MES monitors the granulation system in real-time during pharmaceutical or biopharmaceutical production. The data compiled as a result of the pharmaceutical or biopharmaceutical granulation process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical granulation system or systems (wet or dry) on a device-by-device basis (for the purpose of this example, dry granulation includes but is not limited to further blending and roller compaction and wet granulation includes but is not limited to further drying). As previously set forth, the quality control parameters of a drug or biologic as well as the production boundaries necessary to produce said drug or biologic of all devices used in the drug or biologic manufacture for the purposes of the pharmaceutical or biopharmaceutical granulation processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical granulation process and will monitor to ensure that the pharmaceutical or biopharmaceutical granulation system(s) data is integrated into subsequent drug or biologic manufacturing processes.

In addition, the invention comprises a "cloud" based MES of the invention for controlling and executing a pharmaceutical or biopharmaceutical granulation process whereby the process is used to produce an active ingredient, inactive ingredient, component, or in-process material. The MES controls and executes the aforementioned granulation process in real-time, near real-time, or live and in the event that a control parameter (which is determined by a quality control unit), falls outside a predetermined value, the MES will initiate corrective action of the aforementioned granulation process to mitigate a failure. Such corrective action comprises modifying or stopping the aforementioned granulation process. (See, FIG. 6).

In one embodiment, the control, execution, monitoring and analysis of the pharmaceutical or biopharmaceutical granulation systems and processes achieves a step of integration into a MES whereby manufacturing productivity and product quality are increased. Costs are streamlined over time and an IIoT paradigm is achieved.

Example 3: Utilizing a "Cloud" Based MES to Control, Execute, and Monitor a Crystallization Process for Pharmaceutical or Biopharmaceutical Manufacture In one embodiment, a "cloud" based MES of the invention is integrated into a pharmaceutical or biopharmaceutical crystallization system whereby the crystallization system(s) is used to produce, a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the crystallization system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical crystallization system environment and the MES monitors the crystallization system in real-time during pharmaceutical or biopharmaceutical production. The data compiled as a result of the pharmaceutical or biopharmaceutical crystallization process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical crystallization system or systems on a device-by-device basis (for the purpose of this example, crystallization includes two (2) steps, however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical crystallization processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical crystallization process and will monitor to ensure that the pharmaceutical or biopharmaceutical crystallization system(s) data is integrated into subsequent drug or biologic manufacturing processes.

In addition, the invention comprises a "cloud" based MES of the invention for controlling and executing a pharmaceutical or biopharmaceutical crystallization process whereby the process is used to produce an active ingredient, inactive ingredient, component, or in-process material. The MES controls and executes the aforementioned crystallization process in real-time, near real-time, or live and in the event that a control parameter (which is determined by a quality control unit), falls outside a predetermined value, the MES will initiate corrective action of the aforementioned crystallization process to mitigate a failure. Such corrective action comprises modifying or stopping the aforementioned crystallization process. (See, FIG. 7).

In one embodiment, the control, execution, monitoring and analysis of the pharmaceutical or biopharmaceutical crystallization systems and processes achieves a step of integration into a MES whereby manufacturing productivity and product quality are increased. Costs are streamlined over time and an IIoT paradigm is achieved.

Example 4: Utilizing a "Cloud" Based MES to Control, Execute, and Monitor a Tablet Press Process for Pharmaceutical or Biopharmaceutical Manufacture In one embodiment, a "cloud" based MES of the invention is integrated into a pharmaceutical or biopharmaceutical tablet press system whereby the tablet press system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the tablet press system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical tablet press system environment and the MES monitors the tablet press system in real-time during pharmaceutical or biopharmaceutical production. The data compiled as a result of the pharmaceutical or biopharmaceutical tablet press process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical tablet press system or systems on a device-by-device basis (for the purpose of this example, tablet press includes a compression modality, however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical tablet press processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical tablet press process and will monitor to ensure that the pharmaceutical or biopharmaceutical tablet press system(s) data is integrated into subsequent drug or biologic manufacturing processes.

In addition, the invention comprises a "cloud" based MES of the invention for controlling and executing a pharmaceutical or biopharmaceutical tablet press process whereby the process is used to produce an active ingredient, inactive ingredient, component, or in-process material. The MES controls and executes the aforementioned tablet press process in real-time, near real-time, or live and in the event that a control parameter (which is determined by a quality control unit), falls outside a predetermined value, the MES will initiate corrective action of the aforementioned tablet press process to mitigate a failure. Such corrective action comprises modifying or stopping the aforementioned tablet press process. (See, FIG. 8).

In one embodiment, the control, execution, monitoring and analysis of the pharmaceutical or biopharmaceutical tablet press systems and processes achieves a step of integration into a MES whereby manufacturing productivity and product quality are increased. Costs are streamlined over time and an IIoT paradigm is achieved.

Example 5: Utilizing a "Cloud" Based MES to Control, Execute, and Monitor a Chromatography Process for Pharmaceutical or Biopharmaceutical Manufacture In one embodiment, a "cloud" based MES of the invention is integrated into a pharmaceutical or biopharmaceutical chromatography system whereby the chromatography system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the chromatography system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical chromatography system environment and the MES monitors the chromatography system in real-time during pharmaceutical or biopharmaceutical production. The data compiled as a result of the pharmaceutical or biopharmaceutical chromatography process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical chromatography system or systems on a device-by-device basis (for the purpose of this example, chromatography includes buffer, solvent, and WFI feed(s), however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical chromatography processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical chromatography process and will monitor to ensure that the pharmaceutical or biopharmaceutical chromatography system(s) data is integrated into subsequent drug or biologic manufacturing processes.

In addition, the invention comprises a "cloud" based MES of the invention for controlling and executing a pharmaceutical or biopharmaceutical chromatography process whereby the process is used to produce an active ingredient, inactive ingredient, component, or in-process material. The MES controls and executes the aforementioned chromatography process in real-time, near real-time, or live and in the event that a control parameter (which is determined by a quality control unit), falls outside a predetermined value, the MES will initiate corrective action of the aforementioned chromatography process to mitigate a failure. Such; corrective action comprises modifying or stopping the aforementioned chromatography process. (See, FIG. 9).

In one embodiment, the control, execution, monitoring and analysis of the pharmaceutical or biopharmaceutical chromatography systems and processes achieves a step of integration into a MES whereby manufacturing productivity and product quality are increased. Costs are streamlined over time and an IIoT paradigm is achieved.

Example 6: Utilizing a "Cloud" Based MES to Control, Execute, and Monitor a pH Process for Pharmaceutical or Biopharmaceutical Manufacture In one embodiment, a "cloud" based MES of the invention is integrated into a pharmaceutical or biopharmaceutical pH system whereby the pH system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the pH system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical pH system environment and the MES monitors the pH system in real-time during pharmaceutical or biopharmaceutical production. The data compiled as a result of the pharmaceutical or biopharmaceutical pH process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical pH system or systems on a device-by-device basis (for the purpose of this example, pH includes three (3) pH probes/sensor(s), however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical pH processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical pH process and will monitor to ensure that the pharmaceutical or biopharmaceutical pH system(s) data is integrated into subsequent drug or biologic manufacturing processes.

In addition, the invention comprises a "cloud" based MES of the invention for controlling and executing a pharmaceutical or biopharmaceutical pH process whereby the process is used to produce an active ingredient, inactive ingredient, component, or in-process material. The MES controls and executes the aforementioned pH process in real-time, near real-time, or live and in the event that a control parameter (which is determined by a quality control unit), falls outside a predetermined value, the MES will initiate corrective action of the aforementioned pH process to mitigate a failure. Such corrective action comprises modifying or stopping the aforementioned pH process. (See, FIG. 10).

In one embodiment, the control, execution, monitoring and analysis of the pharmaceutical or biopharmaceutical pH systems and processes achieves a step of integration into a MES whereby manufacturing productivity and product quality are increased. Costs are streamlined over time and an IIoT paradigm is achieved.

Example 7: Utilizing a "Cloud" Based MES to Control, Execute, and Monitor a Liquid Mixing Process for Pharmaceutical or Biopharmaceutical Manufacture In one embodiment, a "cloud" based MES of the invention is integrated into a pharmaceutical or biopharmaceutical liquid mixing system whereby the liquid mixing system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the liquid mixing system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical liquid mixing system environment and the MES monitors the liquid mixing system in real-time during pharmaceutical or biopharmaceutical production. The data compiled as a result of the pharmaceutical or biopharmaceutical liquid mixing process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical liquid mixing system or systems on a device-by-device basis. As previously set forth, the quality control parameters of a drug or biologic as well as the production boundaries necessary to produce said drug or biologic of all devices used in the drug or biologic manufacture for the purposes of the pharmaceutical or biopharmaceutical liquid mixing processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical liquid mixing process and will monitor to ensure that the pharmaceutical or biopharmaceutical liquid mixing system(s) data is integrated into subsequent drug or biologic manufacturing processes.

In addition, the invention comprises a "cloud" based MES of the invention for controlling and executing a pharmaceutical or biopharmaceutical liquid mixing process whereby the process is used to produce an active ingredient, inactive ingredient, component, or in-process material. The MES controls and executes the aforementioned liquid mixing process in real-time, near real-time, or live and in the event that a control parameter (which is determined by a quality control unit), falls outside a predetermined value, the MES will initiate corrective action of the aforementioned liquid mixing process to mitigate a failure. Such corrective action comprises modifying or stopping the aforementioned liquid mixing process. (See, FIG. 11).

In one embodiment, the control, execution, monitoring and analysis of the pharmaceutical or biopharmaceutical liquid mixing systems and processes achieves a step of integration into a MES whereby manufacturing productivity and product quality are increased. Costs are streamlined over time and an IIoT paradigm is achieved.

Example 8: Utilizing a "Cloud" Based MES to Control, Execute, and Monitor a Water-Based Process for Pharmaceutical or Biopharmaceutical Manufacture In one embodiment, a "cloud" based MES of the invention is integrated into a pharmaceutical or biopharmaceutical water-based system whereby the water-based system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the water-based system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical water-based system environment and the MES monitors the water-based system in real-time during pharmaceutical or biopharmaceutical production. The data compiled as a result of the pharmaceutical or biopharmaceutical water-based process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical water-based system or systems on a device-by-device basis. (for the purpose of this example, water-based comprises a WFI system, however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical water-based processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical water-based process and will monitor to ensure that the pharmaceutical or biopharmaceutical water-based system(s) data is integrated into subsequent drug or biologic manufacturing processes.

In addition, the invention comprises a "cloud" based MES of the invention for controlling and executing a pharmaceutical or biopharmaceutical water-based process whereby the process is used to produce an active ingredient, inactive ingredient, component, or in-process material. The MES controls and executes the aforementioned water-based process in real-time, near real-time, or live and in the event that a control parameter (which is determined by a quality control unit), falls outside a predetermined value, the MES will initiate corrective action of the aforementioned water-based process to mitigate a failure. Such corrective action comprises modifying or stopping the aforementioned water-based process. (See, FIG. 12).

In one embodiment, the control, execution, monitoring and analysis of the pharmaceutical or biopharmaceutical water-based systems and processes achieves a step of integration into a MES whereby manufacturing productivity and product quality are increased. Costs are streamlined over time and an IIoT paradigm is achieved.

Example 9: Utilizing a "Cloud" Based MES to Control, Execute, and Monitor a Finishing and Packaging Process for Pharmaceutical or Biopharmaceutical Manufacture In one embodiment, a "cloud" based MES of the invention is integrated into a pharmaceutical or biopharmaceutical finishing and packaging system whereby the finishing and packaging system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the finishing and packaging system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical finishing and packaging system environment and the MES monitors the finishing and packaging system in real-time during pharmaceutical or biopharmaceutical production. The data compiled as a result of the pharmaceutical or biopharmaceutical finishing and packaging process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical finishing and packaging system or systems on a device-by-device basis. (for the purpose of this example, finishing and packaging comprises filling equipment, however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical finishing and packaging processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical finishing and packaging process and will monitor to ensure that the pharmaceutical or biopharmaceutical finishing and packaging system(s) data is integrated into subsequent drug or biologic manufacturing processes.

In addition, the invention comprises a "cloud" based MES of the invention for controlling and executing a pharmaceutical or biopharmaceutical finishing and packaging process whereby the process is used to produce an active ingredient, inactive ingredient, component, or in-process material. The MES controls and executes the aforementioned finishing and packaging process in real-time, near real-time, or live and in the event that a control parameter (which is determined by a quality control unit), falls outside a predetermined value, the MES will initiate corrective action of the aforementioned finishing and packaging process to mitigate a failure. Such corrective action comprises modifying or stopping the aforementioned finishing and packaging process. (See, FIG. 13).

In one embodiment, the control, execution, monitoring and analysis of the pharmaceutical or biopharmaceutical finishing and packaging systems and processes achieves a step of integration into a MES whereby manufacturing productivity and product quality are increased. Costs are streamlined over time and an IIoT paradigm is achieved.

Example 10: Utilizing a "Cloud" Based MES to Control, Execute, and Monitor a Cell Culture Process for Pharmaceutical or Biopharmaceutical Manufacture In one embodiment, a "cloud" based MES of the invention is integrated into a pharmaceutical or biopharmaceutical cell culture system whereby the cell culture system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the cell culture system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical cell culture system environment and the MES monitors the cell culture system in real-time during pharmaceutical or biopharmaceutical production. The data compiled as a result of the pharmaceutical or biopharmaceutical cell culture process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical cell culture system or systems on a device-by-device basis. (for the purpose of this example, cell culture comprises a bioreactor, however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical cell culture processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical cell culture process and will monitor to ensure that the pharmaceutical or biopharmaceutical cell culture system(s) data is integrated into subsequent drug or biologic manufacturing processes.

In addition, the invention comprises a "cloud" based MES of the invention for controlling and executing a pharmaceutical or biopharmaceutical cell culture process whereby the process is used to produce an active ingredient, inactive ingredient, component, or in-process material. The MES controls and executes the aforementioned cell culture process in real-time, near real-time, or live and in the event that a control parameter (Which is determined by a quality control unit), falls outside a predetermined value, the MES will initiate corrective action of the aforementioned cell culture process to mitigate a failure. Such corrective action comprises modifying or stopping the aforementioned cell culture process. (See, FIG. 14).

In one embodiment, the control, execution, monitoring and analysis of the pharmaceutical or biopharmaceutical cell culture systems and processes achieves a step of integration into a MES whereby manufacturing productivity and product quality are increased. Costs are streamlined over time and an IIoT paradigm is achieved.

Example 11: Utilizing a "Cloud" Based MES to Control, Execute, and Monitor a Field Instrumentation Component for Pharmaceutical or Biopharmaceutical Manufacture In one embodiment, a "cloud" based MES of the invention is integrated into a pharmaceutical or biopharmaceutical field instrumentation component whereby the field instrumentation component(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the field instrumentation component(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical field instrumentation component(s) environment and the MES monitors the field instrumentation component(s) in real-time during pharmaceutical or biopharmaceutical production. The data compiled as a result of the pharmaceutical or biopharmaceutical field instrumentation component(s) is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical field instrumentation component(s) on a device-by-device basis (for the purposes described herein "field instrumentation component(s)" includes but is not limited to, calibration tools, flow meters, intrinsic safety devices, leveling components, weighting components, process analyzers, thermometers, and valves, however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical field instrumentation component(s) are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical field instrumentation component(s) and will monitor to ensure that the pharmaceutical or biopharmaceutical field instrumentation component(s) data is integrated into subsequent drug or biologic manufacturing processes.

In addition, the invention comprises a "cloud" based MES of the invention for controlling and executing a pharmaceutical or biopharmaceutical field instrumentation component(s) whereby the process is used to produce an active ingredient, inactive ingredient, component, or in-process material. The MES controls and executes the aforementioned field instrumentation component(s) in real-time, near real-time, or live and in the event that a control parameter (which is determined by a quality control unit), falls outside a predetermined value, the MES will initiate corrective action of the aforementioned field instrumentation component(s) to mitigate a failure. Such corrective action comprises modifying or stopping the aforementioned field instrumentation component(s).

In one embodiment, the control, execution, monitoring and analysis of the pharmaceutical or biopharmaceutical field instrumentation component(s) and processes achieves a step of integration into a MES whereby manufacturing productivity and product quality are increased. Costs are streamlined over time and an IIoT paradigm is achieved.

Example 12: Utilizing a "Cloud" Based MES to Control, Execute, and Monitor an Operational Unit for Pharmaceutical or Biopharmaceutical Manufacture In one embodiment, a "cloud" based MES of the invention is integrated into a pharmaceutical or biopharmaceutical operational unit(s) whereby the operational unit(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the operational unit(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical operational unit(s) environment and the MES monitors the operational unit(s) in real-time during pharmaceutical or biopharmaceutical production. The data compiled as a result of the pharmaceutical or biopharmaceutical operational unit(s) is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical operational unit(s) on a device-by-device basis (for the purposes described herein, "operational unit(s)" includes but is not limited to, motors, drives, compressed air systems, HVAC, boilers, modular cleanrooms, environmental controls, and back-up generators, however further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical operational unit(s) are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical operational unit(s) and will monitor to ensure that the pharmaceutical or biopharmaceutical operational unit(s) data is integrated into subsequent drug or biologic manufacturing processes.

In addition, the invention comprises a "cloud" based MES of the invention for controlling and executing a pharmaceutical or biopharmaceutical operational unit(s) whereby the process is used to produce an active ingredient, inactive ingredient, component, or in-process material. The MES controls and executes the aforementioned operational unit(s) in real-time, near real-time, or live and in the event that a control parameter (which is determined by a quality control unit), falls outside a predetermined value, the MES will initiate corrective action of the aforementioned operational unit(s) to mitigate a failure. Such corrective action comprises modifying or stopping the aforementioned operational unit(s).

In one embodiment, the control, execution, monitoring and analysis of the pharmaceutical or biopharmaceutical operational unit(s) and processes achieves a step of integration into a MES whereby manufacturing productivity and product quality are increased. Costs are streamlined over time and an IIoT paradigm is achieved.

Example 13: Utilizing a "Cloud" Based MES to Control, Execute, and Monitor a Pharmaceutical or Biopharmaceutical Manufacture Hardware Device of Device(s)

In one embodiment, a "cloud" based MES of the invention is integrated into a pharmaceutical or biopharmaceutical hardware device or device(s) whereby the hardware device(s) are used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the device(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical device(s) environment and the MES monitors the device(s) in real-time during pharmaceutical or biopharmaceutical production. The data compiled as a result of the pharmaceutical or biopharmaceutical device(s) is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical device(s) on a device-by-device basis (for the purposes described herein, a pharmaceutical or biopharmaceutical hardware device or device(s) include but are not limited to powder blending systems, granulation systems, crystallization systems, tablet presses, chromatography systems, pH systems, liquid mixing systems, water-based systems, finishing and packaging systems, cell culture systems, filtration/purification systems, centrifugation systems, vial inactivation systems, field instrumentation components and operational units, blenders, bioreactors, capping machines, separation systems, chilled water/circulating systems, glycol systems, modular coldrooms, clean steam systems, cleanin-place (CIP) devices, compressed air systems, D.I./R.O. water systems, dry heat sterilizers, ovens, fermentation equipment, freezers, filling equipment, HVAC/environmental control systems, incubators, environmentally controlled chambers, labelers, lyophilizers, freeze dryers, dryers, mixing tanks, neutralization systems, plant steam and condensate systems, process tanks, pressure tanks, vessels, refrigerators, separation/purification equipment, specialty gas systems, steam generators, pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, carboys, etc.), single use bioreactors, and modular production devices, however further device(s) may be utilized as understood in the art and depending on the drug or biologic that is being manufactured). As previously set forth, the quality control parameters of a drug or biologic as well as the production boundaries necessary to produce said drug or biologic of all devices used in the drug or biologic manufacture for the purposes of the pharmaceutical or biopharmaceutical hardware device(s) are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical hardware device(s) and will monitor to ensure that the pharmaceutical or biopharmaceutical hardware device(s) data is integrated into subsequent drug or biologic manufacturing processes.

In addition, the invention comprises a "cloud" based MES of the invention for controlling and executing a pharmaceutical or biopharmaceutical hardware device(s) whereby the process is used to produce an active ingredient, inactive ingredient, component, or in-process material. The MES controls and executes the aforementioned hardware device(s) in real-time, near real-time, or live and in the event that a control parameter (which is determined by a quality control unit), falls outside a predetermined value, the MES will initiate corrective action of the aforementioned hardware device(s) to mitigate a failure. Such corrective action comprises modifying or stopping the aforementioned hardware device(s).

In one embodiment, the control, execution, monitoring and analysis of the pharmaceutical or biopharmaceutical hardware device(s) and processes achieves a step of integration into a MES whereby manufacturing productivity and product quality are increased. Costs are streamlined over time and an IIoT paradigm is achieved:

Example 14: Utilizing a "Cloud" Based MES to Control, Execute, and Monitor a Pharmaceutical or Biopharmaceutical Manufacture Software Device of Device(s)

In one embodiment, a "cloud" based MES of the invention is integrated into a pharmaceutical or biopharmaceutical software device or device(s) whereby the software device(s) are used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the device(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical device(s) environment and the MES monitors the device(s) in real-time during pharmaceutical or biopharmaceutical production. The data compiled as a result of the pharmaceutical or biopharmaceutical device(s) is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical software device(s) on a device-by-device basis (for the purposes described herein, a pharmaceutical or biopharmaceutical software device or device(s) include but are not limited to user-independent audit trails, time-stamped audit trails, data security systems, confidentiality systems, limited authorized system access, electronic signatures, bar codes scanners/readers, dedicated systems, add-on systems, control files, "cloud" based application servers, "cloud" based storage servers, WAN's, LAN's, Graphical User Interface ("GUI"), downloadable smart device applications (Apps), product serialization systems (i.e. track and trace systems), and e-pedigree systems, etc., however further device(s) may be utilized as understood in the art and depending on the drug or biologic that is being manufactured). As previously set forth, the quality control parameters of a drug or biologic as well as the production boundaries necessary to produce said drug or biologic of all devices used in the drug or biologic manufacture for the purposes of the pharmaceutical or biopharmaceutical software device(s) are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical software device(s) and will monitor to ensure that the pharmaceutical or biopharmaceutical software device(s) data is integrated into subsequent drug or biologic manufacturing processes.

In addition, the invention comprises a "cloud" based MES of the invention for controlling and executing a pharmaceutical or biopharmaceutical software device(s) whereby the process is used to produce an active ingredient, inactive ingredient, component, or in-process material. The MES controls and executes the aforementioned software device(s)

in real-time, near real-time, or live and in the event that a control parameter (which is determined by a quality control unit), falls outside a predetermined value, the MES will initiate corrective action of the aforementioned software device(s) to mitigate a failure. Such corrective action comprises modifying or stopping the aforementioned software device(s).

In one embodiment, the control, execution, monitoring and analysis of the pharmaceutical or biopharmaceutical software device(s) and processes achieves a step of integration into a MES whereby manufacturing productivity and product quality are increased. Costs are streamlined over time and an IIoT paradigm is achieved.

Example 15: Integration of "Cloud" Based MES to Control, Execute, and Monitor a Comprehensive Pharmaceutical or Biopharmaceutical Manufacture Process on a Plant-Wide Basis In one embodiment, a "cloud" based MES of the invention is integrated into a pharmaceutical or biopharmaceutical plant, whereby a "smart factory" is attained. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into all device(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical environment and the MES monitors the device(s) in real-time during pharmaceutical or biopharmaceutical production. The data compiled as a result of the pharmaceutical or biopharmaceutical process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical device(s) on a process by process basis. As previously set forth, the quality control parameters of a drug or biologic as well as the production boundaries necessary to produce said drug or biologic of all devices used in the drug or biologic manufacture for the purposes of the pharmaceutical or biopharmaceutical are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical process and will monitor to ensure that the pharmaceutical or biopharmaceutical process data is integrated into subsequent drug or biologic manufacturing processes (FIG. 15).

In addition, the invention comprises a "cloud" based MES of the invention for controlling and executing a plurality of pharmaceutical or biopharmaceutical process whereby the process is used to produce an active ingredient, inactive ingredient, component, or in-process material. The MES controls and executes the aforementioned processes in real-time, near real-time, or live and in the event that a control parameter (which is determined by a quality control unit), falls outside a predetermined value, the MES will initiate corrective action of the aforementioned processes to mitigate a failure. Such corrective action comprises modifying or stopping the aforementioned processes.

In one embodiment, the control, execution, monitoring and analysis of the pharmaceutical or biopharmaceutical processes achieves a step of plant-wide integration into a MES whereby manufacturing productivity and product quality are increased. Costs are streamlined over time and an IIoT paradigm is achieved.

Example 16: Integration of "Cloud" Based MES to Control, Execute, and Monitor a Comprehensive Track and Trace Program for a Drug or Biologic Proper supply chain management of packaged drugs or biologics is critical to provide quality drugs or biologic to end-users. This includes monitoring traditional areas of the supply chain including vial inspection, packaging, product protection, storage, and distribution. Specifically, from the point when the drug product is packaged (See, Section entitled "Finishing and Packaging Processes/Systems") until it reaches the end-user.

In one embodiment, a "cloud" based MES of the invention is integrated into a pharmaceutical or biopharmaceutical finishing and packaging system whereby the finishing and packaging system(s) is used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the finishing and packaging system(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical finishing and packaging system environment and the MES monitors the finishing and packaging system in real-time during pharmaceutical or biopharmaceutical production. The data compiled as a result of the pharmaceutical or biopharmaceutical finishing and packaging process is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into the pharmaceutical or biopharmaceutical finishing and packaging system or systems on a device-by-device basis. (for the purpose of this example, finishing and packaging systems comprise filling equipment, dry heat sterilizers, aseptic filling systems, lypholizers, labelers, and vial inspection systems, however, further processes may be utilized as understood in the art). As previously set forth, the quality control parameters of a drug or biologic as well as the production boundaries necessary to produce said drug or biologic of all devices used in the drug or biologic manufacture for the purposes of the pharmaceutical or biopharmaceutical finishing and packaging processes are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical finishing and packaging process and will monitor to ensure that the pharmaceutical or biopharmaceutical finishing and packaging system(s) data is integrated into subsequent drug or biologic manufacturing processes.

In a preferred embodiment, a "cloud" based MES of the invention provides for a method of monitoring the manufacturing and/or quality control attributes of a drug or biologic by serialization of the drug or biologic batches. This allows any entity in the drug or biologics supply chain to properly track and trace each vial (or other dosage form) of drug or biologic associated with a particular batch, lot, or control number. The serialization of the drug or biologic of the present invention provides two advantageous purposes. First, it allows for easy tracking of quality attributes of a given batch, lot, or control number of a drug or biologic by a plurality of end users in a remote network. Given the complex chemical properties associated with drugs or biologics, in the case of product recall, it would be easy to determine which vials (or other dosage forms) need to be recalled. Second, it allows for easy tracking of drug or biologic origin, which makes detecting counterfeit drugs or biologics easy to achieve. In a preferred embodiment, the serialization of the present invention comprises an e-pedigree (FIG. 16).

In one embodiment, the control, execution, monitoring and analysis of the pharmaceutical or biopharmaceutical supply chain systems and processes achieves a step of integration into a MES whereby manufacturing productivity and product quality are increased. Costs are streamlined over time and an IIoT paradigm is achieved.

Example 17: Integration of "Cloud" Based MES to Control, Execute, and Monitor a Quality Control Program for the Manufacture of a Drug or Biologic In one embodiment, a "cloud" based MES of the invention is integrated into a pharmaceutical or biopharmaceutical manufacturing process and provides an enhancement to quality control used to produce a drug or biologic. One of ordinary skill will understand that a "cloud" based MES of the invention provides an improvement to computer technology in the field of manufacturing quality control in that a "cloud" based MES of the instant example allows for more accurate and reliable transformation of active ingredients, inactive ingredients, components, and in-process materials into a finished drug or biologic. Accordingly, the MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the device(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical process or device(s) environment and the MES monitors the process or device(s) in real-time during pharmaceutical or biopharmaceutical production. The product specification(s) and quality control acceptance criteria will be determined by a quality control unit and will provide for adequate ranges of acceptability to accept a batch of drug or biologic. During production, the data compiled as a result of the pharmaceutical or biopharmaceutical device(s) is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

As previously set forth, the quality control parameters of a drug or biologic as well as the production boundaries necessary to produce said drug or biologic are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined pharmaceutical or biopharmaceutical process and will monitor to ensure that the pharmaceutical or biopharmaceutical quality control data is integrated into subsequent drug or biologic manufacturing processes.

In addition, the invention comprises a "cloud" based MES of the invention for controlling and executing a pharmaceutical or biopharmaceutical quality control process whereby the process is used to produce an active ingredient, inactive ingredient, component, or in-process material (See, FIGS. 5-15). The MES controls and executes the aforementioned production process in real-time, near real-time, or live and in the event that a control parameter (which is determined by a quality control unit), falls outside a predetermined value, the MES will initiate corrective action of the aforementioned software device(s) to mitigate a failure. Such corrective action comprises modifying or stopping the aforementioned software device(s). One of ordinary skill in the art will appreciate that a corrective action allows a batch which may be nonconforming to a product specification to transform into a conforming product specification prior to the end of the production run. In this case, the production run is a success. It is understood that in the event that a corrective action does not bring the production run into a conforming product specification, then the production run is stopped and analysis of the adverse event occurs.

In one embodiment, the control, execution, monitoring and analysis of the pharmaceutical or biopharmaceutical quality control process achieves a step of integration into a "cloud" based MES whereby manufacturing productivity and product quality are increased. Costs are streamlined over time and an IIoT paradigm is achieved.

Example 18: Integration of "Cloud" Based MES to Control, Execute, and Monitor a Portable Pharmaceutical or Biopharmaceutical Manufacturing Plant In one embodiment, a "cloud" based MES of the invention is integrated into a portable pharmaceutical or biopharmaceutical plant used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the device(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical device(s) environment and the MES monitors the device(s) in real-time during pharmaceutical or biopharmaceutical production. The data compiled as a result of the pharmaceutical or biopharmaceutical device(s) is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into a portable pharmaceutical or biopharmaceutical plant on a device-by-device basis. As previously set forth, the quality control parameters of a drug or biologic as well as the production boundaries necessary to produce said drug or biologic of all devices used in the drug or biologic manufacture for the purposes of the pharmaceutical or biopharmaceutical software device(s) are determined by the quality control unit. The analysis of the software and hardware occurs using any of the methods disclosed herein. The MES controls, executes, monitors, and processes the data and stores the data using the methods disclosed herein. The data is stored for comparative analysis to previous batches or runs to provide a risk-based assessment in case of failure. Using the historical analysis will provide a more streamlined production of pharmaceuticals or biopharmaceuticals in a portable plant.

In addition, the invention comprises a "cloud" based MES of the invention for controlling and executing a portable pharmaceutical or biopharmaceutical plant whereby the process is used to produce an active ingredient, inactive ingredient, component, or in-process material in a remote setting. One of ordinary skill in the art will appreciate that portable production of drugs or biologics in a remote location offers several advantages. First, in the case of natural disaster (e.g. earthquake, flooding, hurricanes, etc.) emergency responders will be able to provide needed medicines to persons who need it, in the event that access to the location is compromised (e.g. a hurricane on an island, etc.). Second, by utilizing a "cloud" based MES to control, execute, and monitor a portable pharmaceutical or biopharmaceutical manufacturing plant, a central location in a remote location can assess quality control of medicines produced by a portable pharmaceutical or biopharmaceutical manufacturing plant. This will ensure that the medicines being produced can be utilized to the persons who need them and that the drugs or biologics produced conform to the product specification.

The MES controls and executes the aforementioned portable production plant in real-time, near real-time, or live and in the event that a control parameter (which is determined by a quality control unit), falls outside a predetermined value, the MES will initiate corrective action of the aforementioned software device(s) to mitigate a failure. Such corrective action comprises modifying or stopping the aforementioned software device(s).

In one embodiment, the control, execution, monitoring and analysis of a portable pharmaceutical or biopharmaceutical plant achieves a step of integration into a MES whereby manufacturing productivity and product quality are increased. Costs are streamlined over time and an IIoT paradigm is achieved.

Example 19: Integration of "Cloud" Based MES to Control, Execute, and Monitor Multiple Pharmaceutical or Biopharmaceutical Manufacturing Systems/Processes at Different Geographical Locations In one embodiment, a "cloud" based MES of the invention is integrated into a plurality of pharmaceutical or biopharmaceutical product lines used to produce a drug or biologic. The MES comprises a single layer architecture whereby the SCADA and ERP layers are not separate and distinct layers, as is common in the art. Rather, a MES of the example possess, among other things, attributes of a SCADA and ERP (See, FIG. 4). Furthermore, the MES is integrated to a "cloud" based distributed control system, whereby the "cloud" based distributed system comprises a fully connected wireless network topography to reduce network latency. In addition, the "cloud" based distributed control system comprises a plurality of local and remote application and storage servers used to manage, execute, store, and process data over the "cloud" based distributed control system (See, FIG. 1). The data will be transmitted as taught in the present disclosure.

Additionally, the MES will be integrated into the device(s) via Soft PLC or other wireless controller apparatus known in the art. The MES will execute and control the Soft PLC from a server housed in the "cloud" based distributed control system. Furthermore, a MES of the invention is integrated with an active MWSN of the invention which is active to a pharmaceutical or biopharmaceutical device(s) environment and the MES monitors the device(s) in real-time during pharmaceutical or biopharmaceutical production. The data compiled as a result of the pharmaceutical or biopharmaceutical device(s) is transmitted to the "cloud" based distributed control system and analyzed using the method disclosed herein. Data and process analytics of the present disclosure are performed and the results are transmitted to a plurality of end users for review and assessment (See, FIG. 2). One of ordinary skill in the art will appreciate that an end user can be local or remotely based and a review or assessment includes, but is not limited to, quality control, product release, product serialization, business forecasting, inventory management, and production design and validation.

The MES is integrated into a plurality of pharmaceutical or biopharmaceutical product lines on a device-by-device basis. As previously set forth, the quality control parameters of a drug or biologic as well as the production boundaries necessary to produce said drug or biologic of all devices used in the drug or biologic manufacture for the purposes of an individual pharmaceutical or biopharmaceutical product line is determined by the quality control unit. The analysis of the software and hardware occurs using any of the methods disclosed herein.

In addition, the invention comprises a "cloud" based MES of the invention for controlling and executing a plurality of pharmaceutical or biopharmaceutical product lines whereby each individual product line is used to produce an active ingredient, inactive ingredient, component, or in-process material in either the same plant or a remote setting or a combination of both. One of ordinary skill in the art will appreciate that controlling, executing, and monitoring a plurality of drug or biologic product lines offers several advantages. First, it allows for monitoring several synergistic processes which are used in producing a different or the same drugs or biologics (generally with the same chemical or physical properties), this in turn creates a larger base of data for analysis and analytics. Second, by utilizing a "cloud" based MES to control, execute, and monitor a plurality of pharmaceutical or biopharmaceutical product lines, greater control of raw materials and inventory is achieved. This is especially true if the production occurs in disparate locations on the globe.

The MES controls and executes the aforementioned plurality of production lines in real-time, near real-time, or live and in the event that a control parameter (which is determined by a quality control unit), falls outside a predetermined value, the MES will initiate corrective action of the aforementioned product line to mitigate a failure. Such corrective action comprises modifying or stopping the aforementioned product lines.

In one embodiment, the control, execution, monitoring and analysis of a plurality of pharmaceutical or biopharmaceutical production lines achieves a step of integration into a MES whereby manufacturing productivity and product quality are increased. Costs are streamlined over time and an IIoT paradigm is achieved.

The present invention is not to be limited in scope by the embodiments disclosed herein, which are intended as single illustrations of individual aspects of the invention, and any that are functionally equivalent are within the scope of the invention. Various modifications to the models, methods, and life cycle methodology of the invention, in addition to those described herein, will become apparent to those skilled in the art from the foregoing description and teachings, and are similarly intended to fall within the scope of the invention. Such modifications or other embodiments can be practiced without departing from the true scope and spirit of the invention.

The invention claimed is:

1. A cloud-based manufacturing execution system (MES), comprising,
   a) a single layer non-transitory computer readable medium having computer executable instructions adapted for use to control a hardware or software device used in biopharmaceutical manufacturing, and wherein said single layer non-transitory computer readable medium initiate activation of a software based PLC, and wherein the single layer non-transitory computer readable medium having computer executable instructions eliminates a one (1) to one (1) mapping layer with said software based PLC;
   b) a storage server; and
   c) a remote application server.

2. The system of claim 1, wherein the storage server further comprising a historic record of the biopharmaceutical manufacturing process.

3. The system of claim 1, wherein the remote application server of claim 1, further comprising a cloud based wireless distributed control system.

4. The system of claim 3, wherein the wireless distributed control system further comprises a fully connected network topography.

5. The system of claim 1, wherein the hardware device is selected from the group consisting of powder blending systems, granulation systems, crystallization systems, tablet presses, chromatography systems, pH systems, liquid mixing systems, water-based systems, finishing and packaging systems, cell culture systems, filtration/purification systems, centrifugation systems, vial inactivation systems, field instrumentation components and operational units, blenders, bioreactors, capping machines, separation systems, chilled water/circulating systems, glycol systems, modular coldrooms, clean steam systems, clean-in-place (CIP) devices, compressed air systems, DI/RO water systems, dry heat sterilizers, ovens, fermentation equipment, freezers, filling equipment, HVAC/environmental control systems, incubators, environmentally controlled chambers, labelers, lyophilizers, freeze dryers, dryers, mixing tanks, neutralization systems, plant steam and condensate systems, process tanks, pressure tanks, vessels, refrigerators, separation/purification equipment, specialty gas systems, steam generators, pure steam systems, steam sterilizers, stopper washers, solvent recovery systems, tower water systems, waste inactivation systems, "kill" systems, vial inspection systems, vial washers, water for injection (WFI) systems, pure water systems, washers (glass, tank, or carboys), single use bioreactors, and modular production devices.

6. The system of claim 1, wherein the software device is selected from the group consisting of user-independent audit trails, time-stamped audit trails, data security systems, confidentiality systems, limited authorized system access, electronic signatures, bar codes scanners/readers, dedicated systems, add-on systems, control files, "cloud" based application servers, "cloud" based storage servers, WAN's, LAN's, Graphical User Interface ("GUI"), downloadable smart device applications (Apps), product serialization systems (i.e. track and trace systems), and e-pedigree systems.

7. The system of claim 1, wherein the system is interfaced with a mobile wireless sensor network (MWSN).

8. The system of claim 1, wherein the non-transitory computer readable medium having computer executable instructions comprises predictive analytics.

9. The system of claim 1, wherein said system controls and monitors a track and trace program.

10. The system of claim 1, wherein said system controls and monitors a quality control program.

11. The system of claim 1, wherein said system controls and monitors a portable biopharmaceutical manufacturing plant.

12. An article of manufacture comprising the non-transitory computer readable medium having computer executable instructions of claim 1.

13. A single layer non-transitory computer readable medium having computer executable instructions to perform a method comprising,
  a) initiate activation of a software based programmable logic controller, whereby the software based programmable logic controller comprises an embedded system and further comprising a microcontroller interfaced with a pharmaceutical manufacturing hardware device, wherein said software based programmable logic controller and microcontroller are integrated into a manufacturing execution system (MES) and a pharmaceutical manufacturing hardware device adapted for use in manufacturing a pharmaceutical, and wherein the single layer non-transitory computer readable medium having computer executable instructions eliminates a one (1) to one (1) mapping layer with said software based programmable logic controller;
  b) compiling data generated during the pharmaceutical manufacturing, wherein the data relates to a pharmaceutical product specification;
  c) transmitting the data over a distributed control system whereby the data is analyzed against the product specification;
  d) taking corrective action on said pharmaceutical manufacturing, whereby the corrective action comprises stopping or modifying the pharmaceutical manufacturing.

14. The non-transitory computer readable medium of claim 13, wherein the pharmaceutical manufacturing process produces an active ingredient.

15. The non-transitory computer readable medium of claim 13, wherein the pharmaceutical manufacturing process produces an inactive ingredient.

16. The non-transitory computer readable medium of claim 13, wherein the pharmaceutical manufacturing process comprises a bioreactor.

17. An article of manufacture comprising the non-transitory computer readable medium having computer executable instructions of claim 14.

* * * * *